(12) United States Patent
Du

(10) Patent No.: US 11,587,272 B2
(45) Date of Patent: *Feb. 21, 2023

(54) INTELLIGENT INTERACTIVE AND AUGMENTED REALITY CLOUD PLATFORM

(71) Applicant: Eliza Y Du, Cupertino, CA (US)

(72) Inventor: Eliza Y Du, Cupertino, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/169,202

(22) Filed: Feb. 5, 2021

(65) Prior Publication Data

US 2021/0192819 A1    Jun. 24, 2021

Related U.S. Application Data

(63) Continuation of application No. 15/727,414, filed on Oct. 6, 2017, now Pat. No. 10,957,083, which is a continuation-in-part of application No. 15/367,124, filed on Dec. 1, 2016, now Pat. No. 10,616,199, and a continuation-in-part of application No. 15/479,269, filed on Apr. 4, 2017, now Pat. No. 10,580,040, and a continuation-in-part of application No. 15/479,277, filed on Apr. 4, 2017, now Pat. No. 10,949,882, and a continuation-in-part of application No. 15/665,295, filed on Jul. 31, 2017, now Pat. No. 10,162,308, and a continuation-in-part of application No. 15/675,635, filed on Aug. 11, 2017, now Pat. No. 10,657,690.

(60) Provisional application No. 62/373,822, filed on Aug. 11, 2016, provisional application No. 62/373,864, filed on Aug. 11, 2016.

(51) Int. Cl.
*G06F 3/01* (2006.01)
*G06T 11/60* (2006.01)
*G06N 20/00* (2019.01)
*G06F 16/951* (2019.01)
*G06F 16/00* (2019.01)
*G06T 11/00* (2006.01)

(52) U.S. Cl.
CPC ............... *G06T 11/60* (2013.01); *G06F 3/01* (2013.01); *G06F 3/011* (2013.01); *G06F 3/015* (2013.01); *G06F 3/017* (2013.01); *G06F 16/00* (2019.01); *G06F 16/951* (2019.01); *G06N 20/00* (2019.01); *G06T 11/00* (2013.01)

(58) Field of Classification Search
CPC ...... H04L 63/10; H04L 63/102; H04L 63/104
See application file for complete search history.

(56) References Cited

U.S. PATENT DOCUMENTS

| 2001/0003712 | A1* | 6/2001 | Roelofs | G06F 3/011 463/36 |
| 2010/0125799 | A1* | 5/2010 | Roberts | G06F 3/011 715/757 |
| 2013/0018659 | A1* | 1/2013 | Chi | G06F 3/167 704/275 |
| 2013/0046206 | A1* | 2/2013 | Preminger | A61B 5/16 600/595 |

(Continued)

*Primary Examiner* — Olugbenga O Idowu

(57) ABSTRACT

Disclosed herein are methods and systems for an intelligent, interactive, and augmented reality (AR) cloud platform. The platform can be implemented in many applications, such as providing real-time intelligent and interactive control between user input data and the resulting AR data, providing real-time and effective AR-based communication, or providing real-time control of physical devices in a remote network.

20 Claims, 21 Drawing Sheets

(56) References Cited

U.S. PATENT DOCUMENTS

| | | | |
|---|---|---|---|
| 2013/0198625 A1* | 8/2013 | Anderson | G06F 3/016 |
| | | | 715/701 |
| 2015/0277555 A1* | 10/2015 | Morishita | G06T 19/20 |
| | | | 345/156 |
| 2016/0104452 A1* | 4/2016 | Guan | A63F 13/35 |
| | | | 345/633 |
| 2018/0095605 A1* | 4/2018 | Flores | G06F 3/011 |
| 2018/0308377 A1* | 10/2018 | Pena-Rios | G09B 5/02 |

* cited by examiner

INTELLIGENT INTERACTIVE AND AUGMENTED REALITY CLOUD PLATFORM

CROSS-REFERENCE TO RELATED APPLICATION

This application is a continuation of U.S. patent application Ser. No. 15/727,414 filed on Oct. 6, 2017 and entitled "Intelligent Interactive And Augmented Reality Based User Interface Platform", which claims priority to U.S. Provisional Patent Application No. 62/373,822, filed on Aug. 11, 2016 and entitled "An Intelligent Augmented Reality (IAR) Platform-based Communication System;" U.S. Provisional Patent Application No. 62/373,864, filed on Aug. 11, 2016 and entitled "An Intelligent User Interface Platform;" U.S. patent application Ser. No. 15/367,124 filed on Dec. 1, 2016, U.S. Pat. No. 10,616,199 issued on Apr. 7, 2020, and entitled "Methods and Systems for Personalized, Interactive and Intelligent Searches;" U.S. patent application Ser. No. 15/479,269 filed on Apr. 4, 2017 with U.S. Pat. No. 10,580,040 issued on Mar. 3, 2020 and entitled "Methods and Systems for Real-Time Image and Signal Processing in Augmented Reality based Communications;" U.S. patent application Ser. No. 15/479,277 filed on Apr. 4, 2017 and entitled "Real-Time and Context Based Advertisement with Augmented Reality Enhancement;" and to U.S. patent application Ser. No. 15/665,295 filed on Jul. 31, 2017 with U.S. Pat. No. 10,162,308 issued on Dec. 25, 2018 and entitled "Methods and Systems for Photorealistic Human Holographic Augmented Reality Communication with Interactive Control in Real-Time;" U.S. patent application Ser. No. 15/675,635 filed on Aug. 11, 2017 with U.S. Pat. No. 10,657,690 issued on May 19, 2020 and entitled "An Intelligent Augmented Reality (IAR) Platform-Based Communication System;" each of which is hereby incorporated by reference herein in its entirety.

TECHNICAL FIELD

The disclosure relates to methods and systems for an intelligent, interactive, and augmented reality (AR) cloud platform. More specifically, the disclosure relates to methods and systems for providing real-time intelligent and interactive control between user input data and the resulting AR data, for providing real-time and effective AR-based communication, and for providing real-time control of physical devices over network connections.

BACKGROUND

The current generation of real-time augmented reality (AR) based systems and methods (especially those for communication) are severely defective due to incomplete or superficial analysis and understanding of input data, poor data integration speed and quality, and lack of interactive controls between a user, AR-based data, and the physical world. Ways for overcoming these defects are needed.

SUMMARY

In one aspect, disclosed herein is a method for providing interactive and intelligent user controls to a computer device. The method comprises the steps of: conducting, at the computer device, a comprehensive interpretation of real-time input data of a user, wherein at least a portion of the input data comprise visual input data of the user that is combined with augmented reality (AR) related input data to create real-time AR data in which the user is immersed into an AR world, where the visual input data are collected in real-time of the user using a camera associated with the computer device, and where the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combinations thereof; executing, at the computer device, a user input command based on one or more results of the comprehensive interpretation and additional information accessible by the computer device using artificial intelligence; and in response to executing the user input command at the computer device, causing one or more events to occur.

In some embodiments, the additional information accessible by the computer device comprises user biometric data, user personal data, other people's information that the user has permission to access, existing search records, information stored in the computer device, system information of the computer device, information that is extracted through real-time network communication at the time when the search query is modified, or any combinations thereof.

In some embodiments, the causing one or more events to occur comprises: presenting data content associated with the input command in real-time to the user at the computer device or another device; changing the content of the real-time AR data, wherein the real-time AR data are created in real-time based on the visual input data and AR-related input data; or causing a physical device communicably connected to the computer device to change a status.

In some embodiments, the input data further comprise audio input data or sensory input data. In some embodiments, the sensory input data comprise bio-status data of the user, behavior data of the user, environmental data, or status data of an object in the proximity of the user. In some embodiments, the sensory input data comprise data selected from the group consisting of bio-status data of the user, heartbeat data, blood pressure data, body temperature data, orientation data, environmental temperature data, motion data, pressure data, altitude data, proximity data, acceleration data, gyroscopic data, geolocation data, global positioning system (GPS) data, and combinations thereof.

In some embodiments, the physical device forms a part of the internet of things (IoT) network. In some embodiments, the status of the physical device comprises a binary status, a continuous value adjustment status, or a discrete value adjustment status. In some embodiments, the status of the physical device comprises one selected from the group consisting of an on-off status, an open and close status, a yes and no status, a temperature status, a motion status, a height status, a weight status, a size status, an intensity status, a sound level status, and combinations thereof. In some embodiments, the physical device comprises a piece of furniture, a vehicle, an appliance, an electronic appliance, a building, a sensor, a fixture, a toy, or another computer device.

In some embodiments, the physical device comprises one selected from the group consisting of a door, a window, a light, a refrigerator, a piece of furniture, a fixture, a curtain, a shutter, a computer, a computer device, a vacuum cleaning, a heater, an air conditioner, an A/C system, a swimming pool, a car, a garage door, a faucet, a bicycle, a scooter, a television, a speaker, an audio player, a video player, a fan, a gaming device, a toy, a clock, a tooth brusher, a paper shredder, an adjustable desk or chair, a camera, a sensor, or combinations thereof.

In some embodiments, a method as disclosed herein further comprises: providing, at the computer device, the real-time AR data based on real-time user input data and the AR-related input data, the user input data comprising the visual input data, the real-time AR data comprising one or more advertisement elements, the one or more advertisement elements being determined according to a comprehensive content matching mechanism; where the comprehensive content matching mechanism is based on one or more factors comprising advertisement content, information extracted from the user input data, knowledge learned from the extracted information, a user interactive control, a user preference, context or combinations thereof.

In some embodiments, the context comprises date and time information, communication context, content context, advertiser context, geolocation context, presentation context, or combinations thereof, and wherein the advertiser context comprises advertiser-specified content matching criteria including favored or disfavored presentation forums or pricing information.

In some embodiments, the computer device further receives additional data corresponding to a real-life event, and the real-time AR data comprise at least a visual representation associated with the real-life event.

In some embodiments, a method as disclosed herein further comprises: providing, at the computer device operated by a first user, real-time AR data of a second user who is not accessible by the computer device, where the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof; and representing at least a portion of the real-time AR data of the second user with a plurality sets of data parameters suitable for presenting the real-time AR data of the second user on the computer device, where each set of data parameters comprises text, one or more codes, one or more numbers, one or more matrixes, one or more images, one or more audio signals, one or more sensor signals; or combinations thereof.

In such embodiments: the input data of the second user are collected at a second device and comprise visual data of the second user and optionally one or more of audio data, sensor data, or a combination thereof, the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input.

In one aspect, disclosed herein is a system for providing real-time augmented reality (AR) data. The system comprises: one or more processors; and a nontransitory computer readable medium. The nontransitory computer-readable medium includes one or more sequences of instructions that, when executed by the one or more processors, cause the one or more processors to perform operations that comprise: conducting, at the computer device, a comprehensive interpretation of real-time input data of a user, where at least a portion of the input data comprise visual input data of the user that is combined with augmented reality (AR) related input data to create real-time AR data in which the user is immersed into an AR world, where the visual input data are collected in real-time of the user using a camera associated with the computer device, and where the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combinations thereof; executing, at the computer device, a user input command based on one or more results of the comprehensive interpretation and additional information accessible by the computer device using artificial intelligence; and in response to executing the user input command at the computer device, causing one or more events to occur.

In some embodiments, the additional information accessible by the computer device comprises user biometric data, user personal data, other people's information that the user has permission to access, existing search records, information stored in the computer device, system information of the computer device, information that is extracted through real-time network communication at the time when the search query is modified, or any combinations thereof.

In some embodiments, the causing one or more events to occur comprises: presenting data content associated with the input command in real-time to the user at the computer device or another device; changing the content of the real-time AR data, wherein the real-time AR data are created in real-time based on the visual input data and AR-related input data; or causing a physical device communicably connected to the computer device to change a status.

In some embodiments, the input data further comprise audio input data or sensory input data. In some embodiments, the sensory input data comprise bio-status data of the user, behavior data of the user, environmental data, or status data of an object in the proximity of the user. In some embodiments, the sensory input data comprise data selected from the group consisting of bio-status data of the user, heartbeat data, blood pressure data, body temperature data, orientation data, environmental temperature data, motion data, pressure data, altitude data, proximity data, acceleration data, gyroscopic data, geolocation data, global positioning system (GPS) data, and combinations thereof.

In some embodiments, the physical device forms a part of the internet of things (IoT) network. In some embodiments, the status of the physical device comprises a binary status, a continuous value adjustment status, or a discrete value adjustment status. In some embodiments, the status of the physical device comprises one selected from the group consisting of an on-off status, an open and close status, a yes and no status, a temperature status, a motion status, a height status, a weight status, a size status, an intensity status, a sound level status, and combinations thereof. In some embodiments, the physical device comprises a piece of furniture, a vehicle, an appliance, an electronic appliance, a building, a sensor, a fixture, a toy, or another computer device.

In some embodiments, the physical device comprises one selected from the group consisting of a door, a window, a light, a refrigerator, a piece of furniture, a fixture, a curtain, a shutter, a computer, a computer device, a vacuum cleaning, a heater, an air conditioner, an A/C system, a swimming pool, a car, a garage door, a faucet, a bicycle, a scooter, a television, a speaker, an audio player, a video player, a fan, a gaming device, a toy, a clock, a tooth brusher, a paper shredder, an adjustable desk or chair, a camera, a sensor, or combinations thereof.

In some embodiments, the operations as disclosed herein further comprise: providing, at the computer device, the real-time AR data based on real-time user input data and the AR-related input data, the user input data comprising the visual input data, the real-time AR data comprising one or more advertisement elements, the one or more advertisement elements being determined according to a comprehensive content matching mechanism; where the comprehensive content matching mechanism is based on one or more factors comprising advertisement content, information extracted from the user input data, knowledge learned from the extracted information, a user interactive control, a user preference, context or combinations thereof.

In some embodiments, the context comprises date and time information, communication context, content context, advertiser context, geolocation context, presentation context, or combinations thereof, and wherein the advertiser context comprises advertiser-specified content matching criteria including favored or disfavored presentation forums or pricing information.

In some embodiments, the computer device further receives additional data corresponding to a real-life event, and the real-time AR data comprise at least a visual representation associated with the real-life event.

In some embodiments, the operations as disclosed herein further comprise: providing, at the computer device operated by a first user, real-time AR data of a second user who is not accessible by the computer device, where the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof; and representing at least a portion of the real-time AR data of the second user with a plurality sets of data parameters suitable for presenting the real-time AR data of the second user on the computer device, where each set of data parameters comprises text, one or more codes, one or more numbers, one or more matrixes, one or more images, one or more audio signals, one or more sensor signals; or combinations thereof.

In such embodiments: the input data of the second user are collected at a second device and comprise visual data of the second user and optionally one or more of audio data, sensor data, or a combination thereof, the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input.

In one aspect, disclosed herein is a non-transitory computer-readable medium including one or more sequences of instructions that, when executed by one or more processors, cause the processors to perform operations. In some embodiments, the operations comprise: conducting, at the computer device, a comprehensive interpretation of real-time input data of a user, where at least a portion of the input data comprise visual input data of the user that is combined with augmented reality (AR) related input data to create real-time AR data in which the user is immersed into an AR world, where the visual input data are collected in real-time of the user using a camera associated with the computer device, and where the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combinations thereof; executing, at the computer device, a user input command based on one or more results of the comprehensive interpretation and additional information accessible by the computer device using artificial intelligence; and in response to executing the user input command at the computer device, causing one or more events to occur.

In some embodiments, the additional information accessible by the computer device comprises user biometric data, user personal data, other people's information that the user has permission to access, existing search records, information stored in the computer device, system information of the computer device, information that is extracted through real-time network communication at the time when the search query is modified, or any combinations thereof.

In some embodiments, the causing one or more events to occur comprises: presenting data content associated with the input command in real-time to the user at the computer device or another device; changing the content of the real-time AR data, wherein the real-time AR data are created in real-time based on the visual input data and AR-related input data; or causing a physical device communicably connected to the computer device to change a status.

In some embodiments, the input data further comprise audio input data or sensory input data. In some embodiments, the sensory input data comprise bio-status data of the user, behavior data of the user, environmental data, or status data of an object in the proximity of the user. In some embodiments, the sensory input data comprise data selected from the group consisting of bio-status data of the user, heartbeat data, blood pressure data, body temperature data, orientation data, environmental temperature data, motion data, pressure data, altitude data, proximity data, acceleration data, gyroscopic data, geolocation data, global positioning system (GPS) data, and combinations thereof.

In some embodiments, the physical device forms a part of the internet of things (IoT) network. In some embodiments, the status of the physical device comprises a binary status, a continuous value adjustment status, or a discrete value adjustment status. In some embodiments, the status of the physical device comprises one selected from the group consisting of an on-off status, an open and close status, a yes and no status, a temperature status, a motion status, a height status, a weight status, a size status, an intensity status, a sound level status, and combinations thereof. In some embodiments, the physical device comprises a piece of furniture, a vehicle, an appliance, an electronic appliance, a building, a sensor, a fixture, a toy, or another computer device.

In some embodiments, the physical device comprises one selected from the group consisting of a door, a window, a light, a refrigerator, a piece of furniture, a fixture, a curtain, a shutter, a computer, a computer device, a vacuum cleaning, a heater, an air conditioner, an A/C system, a swimming pool, a car, a garage door, a faucet, a bicycle, a scooter, a television, a speaker, an audio player, a video player, a fan, a gaming device, a toy, a clock, a tooth brusher, a paper shredder, an adjustable desk or chair, a camera, a sensor, or combinations thereof.

In some embodiments, the operations as disclosed herein further comprise: providing, at the computer device, the real-time AR data based on real-time user input data and the AR-related input data, the user input data comprising the visual input data, the real-time AR data comprising one or more advertisement elements, the one or more advertisement elements being determined according to a comprehensive content matching mechanism; where the comprehensive content matching mechanism is based on one or more factors comprising advertisement content, information extracted from the user input data, knowledge learned from the extracted information, a user interactive control, a user preference, context or combinations thereof.

In some embodiments, the context comprises date and time information, communication context, content context, advertiser context, geolocation context, presentation context, or combinations thereof, and wherein the advertiser context comprises advertiser-specified content matching criteria including favored or disfavored presentation forums or pricing information.

In some embodiments, the computer device further receives additional data corresponding to a real-life event, and the real-time AR data comprise at least a visual representation associated with the real-life event.

In some embodiments, the operations as disclosed herein further comprise: providing, at the computer device operated by a first user, real-time AR data of a second user who is not accessible by the computer device, where the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof; and representing at least a portion of the real-time AR data of the second user with a plurality sets of data parameters suitable for presenting the real-time AR data of the second user on the computer device, where each set of data parameters comprises text, one or more codes, one or more numbers, one or more matrixes, one or more images, one or more audio signals, one or more sensor signals; or combinations thereof.

In such embodiments: the input data of the second user are collected at a second device and comprise visual data of the second user and optionally one or more of audio data, sensor data, or a combination thereof, the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

Like reference symbols in the various drawings indicate like elements.

DETAILED DESCRIPTION

Overview

Figure 1A:
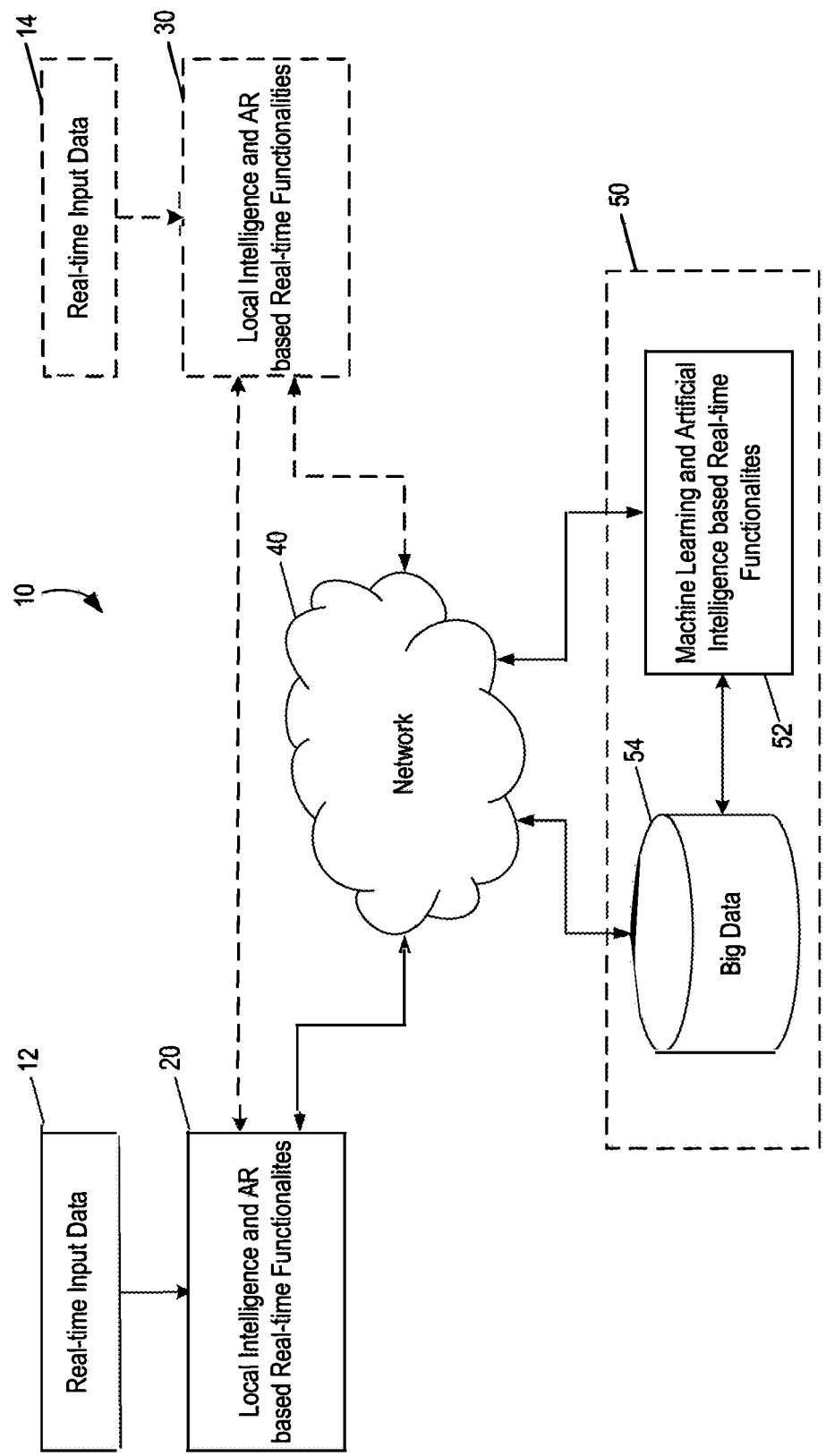
FIG. 1A depicts a sample system based on an example intelligent and interactive AR-based platform.

As disclosed herein, the term "real-time" refers to functionalities being performed without little or no delay in time. For example, image processing occurs in real-time when an image undergoes noise reduction as soon as or shortly after the image has been captured. Similarly, image extraction occurs in real-time as soon as or shortly after the captured image has undergone one or more processing steps. For example, image processing can occur at the same time when additional images are being collected. Here, the term processing can be any analysis or manipulation done to the images. As disclosed herein, a process or a portion thereof is real-time so long as there is no undue delay. Where there is a delay, in some embodiments, the delay can be within seconds or milliseconds or microseconds or nanoseconds. In some embodiments, the delay may be caused by hardware limitations on computer processing speed, or data transfer speed, or network communication capacity.

As disclosed herein, the terms "real life object" and "object" are sometimes used interchangeably. Here, the real life object can include a person. In some embodiments, the real life object can be an object such as a table, or an animal such as a dog. In some embodiments, the real life object can be the user of the AR-based system. In some embodiments, the real life object is an operator of the computer device and controls one or more of the functionalities including image capture. In some embodiments, the real life object is the subject of which/whom data are captured using a data collection device such as a camera, a microphone, a sensor and etc.

As disclosed herein, the terms "actual environment" and "scene" can be used interchangeably. They refer to information other than the real life object, in particular, the physical surrounding wherein the object is located. In some embodiments, when a specific person is the intended object, other people captured in images or videos can be treated as part of the actual environment or scene.

As disclosed herein, the term "images" can be used to refer to separate photos taken at discontinuous time points or image frames in a video. Unless otherwise specified, the terms "images" and "video" can be used interchangeably. A video is effectively a collection of multiple images that are captured continuously. For some image capture devices, all images have the same type (e.g., commercially available digital cameras); some image capture devices, it can capture multiple image types, such as Microsoft Kinect can capture depth images, near-infrared images, and color images at the same time.

As disclosed herein, the term "raw data" refer to unorganized, objective facts, figures, or signals that are collected using a data collection device or equipment such as a camera, a microphone, a sensor, and etc. The facts, figures, or signals are associated with a thing or an event; and they are quantifiable, and can be repeatedly measured, stored, and transferred. In some embodiments, the data collection device can be an independent apparatus or tool such as an audio recorder. In some embodiments, the data collection device can be a component of a larger device such as a camera on a computer or a smart phone device. As disclosed herein, the terms "raw data," "user input data," "elements," "facts," "figures," "signals," and "measurements" can be used interchangeably unless otherwise specified. For example, visual data, audio data, and sensor data are all forms of raw data. As discussed herein, processed raw data such as raw data that have undergone de-noise operation are still considered raw data.

Raw data are collected using devices that can detect and capture one or more aspects of the phenomenon or event. Data collection can take place at different levels. For example, for visual data, a device can detect and measure magnitudes and/or changes in intensity and color (including hue, tint, shade, saturation, brightness, chroma, and etc.) of visible light signals. More sophisticated equipment will be able to detect and measure properties such as reflection, refraction, dispersion, internal reflection, interference, diffraction, light scattering, and polarization. These properties often reflect how light interacts with its environment. Still more, light signals invisible to the naked eyes can be detected and captured by special devices such as an infrared camera. As disclosed herein, in some embodiments, raw data can be processed before any further processing to enhance properties such as quality, efficiency, accuracy, and effectiveness.

As disclosed herein, raw data can be processed to derive information and then knowledge. For example, information can be extracted from raw data while knowledge can be learned from the extracted information.

In contrast, the term "data" will be more broadly construed to include raw data and anything derived from raw data such as information, knowledge, AR data, or combinations thereof. In addition, as disclosed herein, the term "data" also include but are not limited to material stored locally on a computer device, material received from another computer device via a network connection, or material that can be retrieved from the Internet. For example, data can include image, audio, video, sensor, text, spatial, geographical, or any other material associated with the real life object. Data also include metadata or other embedded information that reflect a state of the real life object. They can further include data that are indirectly associated with the real life object, for example, information such as images or videos that reflect the geolocation of the real life object. As disclosed herein, "signals" and "data" can include internal and/or external data. Here, internal data refer to those collected during the real-time capture of the real life object in its actual environment (also referred to as a scene in an image), including visual, audio and other types of information. External data refer to content beyond those collected in real-time, including but not limited to data already stored on a local user device, data from another user device (accessible via network connection), data stored on a server (e.g., including advertisement elements stored on an advertisement provisioning server), or data retrieved in real-time using network collection. Most examples disclosed herein refer to images, which, however, should not in any way limit the scope of the invention.

As disclosed herein, the term "information" can be used to refer to as contextualized, categorized, calculated and condensed data. Information can be extracted from raw data, for example, through organization and by applying relevance, purpose, context and etc. For example, temperature readings themselves can provide little or no value. However, if the reading is linked with a particular purpose and relevance, the raw data can provide information. For example, an ambient temperature measurement and a body temperature measurement having the same value will provide different meanings. For example, an ambient temperature will reflect a weather condition while a body temperature can reflect a health condition.

For example, information can be extracted from a visual characteristic, an audio characteristic, a sensor characteristic, or combinations thereof. For example, a visual characteristic includes but is not limited to a spatial characteristic, a size characteristic, an edge characteristic, a shape characteristics, a motion characteristics, a color characteristic, an exposure characteristic, a brightness characteristic, a shadow characteristic, a highlight characteristic, a contrast characteristic, a light illuminance and reflectance characteristic, a temporal characteristic, or a transparency characteristic, a depth characteristic, a material characteristic, or a combinations thereof. In some embodiments, the visual characteristic comprises a three-dimensional spatial characteristic.

In some embodiments, an audio characteristic includes but is not limited to a pitch/tone characteristic, a frequency characteristic, a magnitude/amplitude characteristic, a speed characteristic, a speech pattern characteristic, an acoustic characteristic, a noise characteristic (e.g., ambient noises or other environmental noises), a delay characteristic, a distortion characteristic, a phase characteristic, or a combination thereof.

In some embodiments, a sensor characteristic can include a sensitivity characteristic, a frequency characteristic, a magnitude/amplitude characteristic, or a combination thereof.

In some embodiments, information can be associated with an object or a scene from the raw data.

As disclosed herein, information can be extracted at different levels, depending on the quality and quantity of the raw data, or depending on one or more criteria for the extraction. For example, a simple ultrasound device (such as a Doppler) can be used to measure the heart rate of a fetus, while a sophisticated ultrasound machine can allow a doctor to "visualize" the structure of the fetal heart. As such, information extracted from data obtain by the sophisticated ultrasound machine will be at a much deeper and more complete level.

In some embodiments, one or more criteria are applied when extracting information from raw data. Exemplary criteria include but are not limited to a user preference, a system setting, a characteristic of an object or scene from the raw data, an integration parameter, an interactive user control, at least one criterion based on big data, or a combination thereof. In some embodiments, a Big Data-based criterion can also be applied.

As disclosed herein, the term "knowledge" can be used to refer to know-how, experience, insight, understanding, and contextualized information. Knowledge is often actionable. For example, an ambient temperature of 100° F. would be deemed hot while 110° F. would be deemed dangerously hot. When it is hot, a person may take precaution to drink more water and stay in shade when outside. When it is dangerously hot, a person may avoid the outdoor entirely.

Obtaining knowledge involves applying complex cognitive processes such as perception, synthesis, extraction, association, reasoning and communication to information or information. In general, knowledge have more value than information because they provide the basis for understanding, explaining and drawing insights about something or some event, which can be used to formulate policy and actions.

In some embodiments, the same information in different context can provide different knowledge. For example, an adult will be considered to have a fever if readings of the person's body temperature reaches 100.4° F. or above. However, a toddler will not be considered to have a fever if readings of the child's body temperature reaches 101.4° F. or above. Once the cause of a "fever" is diagnosed, a doctor may prescribe medicine to a patient to treat either the symptoms or the causes.

As disclosed herein, knowledge can be obtained via cumulative learning from information. In some embodiments, the information can be associated with multiple time points. In some embodiments, the time points are consecutive. In some embodiments, the time points are nonconsecutive. In some embodiments, knowledge is learned from more than one type of information such as two or more types, three or more types, four or more types, five or more types, or six or more types. In some embodiments, ten or more types of information can be used.

In some embodiments, a secondary characteristic can also be associated with an object or a scene from the raw data.

As disclosed herein, knowledge can also be learned at different levels, depending on the quantity and quality of the available information (which are ultimately determined the quality and quantity of the raw data). In the same example using Doppler versus a sophisticated ultrasound machine, which a doctor may be able to use a Doppler to decipher irregular fetal heartbeats (knowledge). Using a sophisticated ultrasound machine, a trained physician will be able to determine whether irregular heartbeats correspond to any structural defects in the heart of an unborn fetus (knowledge). The knowledge from more sophisticated analysis can be relied upon for making a decision as to whether a heart surgery should be performed to save a baby with severe congenital heart defects as soon as she is born.

In some embodiments, one or more criteria are applied when learning knowledge from information. Here, the criteria used can be the same or different from those used when extracting the information. Exemplary criteria include but are not limited to a user preference, a system setting, a characteristic of an object or scene from the raw data, an integration parameter, an interactive user control, at least one criterion based on big data, or a combination thereof.

As disclosed herein, the term "augmented reality input data" or "AR input data" refer to data or information that differs from those captured in real-time. For example, AR input data can include a virtual environment, an altered version of the real-time captured data, a person or object, or any other data that is being captured in real-time via other cameras. Here, a virtual environment can include any type of previously generated data.

As disclosed herein "secondary signals" are signals or data in other than those reflecting the real life object itself. Secondary signals can also include internal or external data. In some embodiments, secondary signals include non-visual signals such as audio sound track or external audio files. In some embodiments, secondary signals include advertisement elements that can be incorporated with the extracted real life object, the virtual environment, or the final integrated images or videos.

As disclosed herein, the terms "photorealistic holographic AR communication" or "holographic AR communication" or "AR communication" refer to a communication system and/or method that is capable of extracting real life objects (including human objects), immersing them into virtual environment, and allowing real life objects to interact with virtual objects based on one or more system settings, one or more user preferences, and/or one or more user interactive control information.

Exemplary System Embodiments

FIG. 1A depicts an exemplary system based on one or more intelligent augmented reality cloud platform. Exemplary system 10 includes a user device 20 and user device 30, connected to a remote intelligence server 50 via internet 40. Both user device 20 and user device 30 can be configured to capture real-time input data (e.g., element 12 and element 14).

Figure 1B:
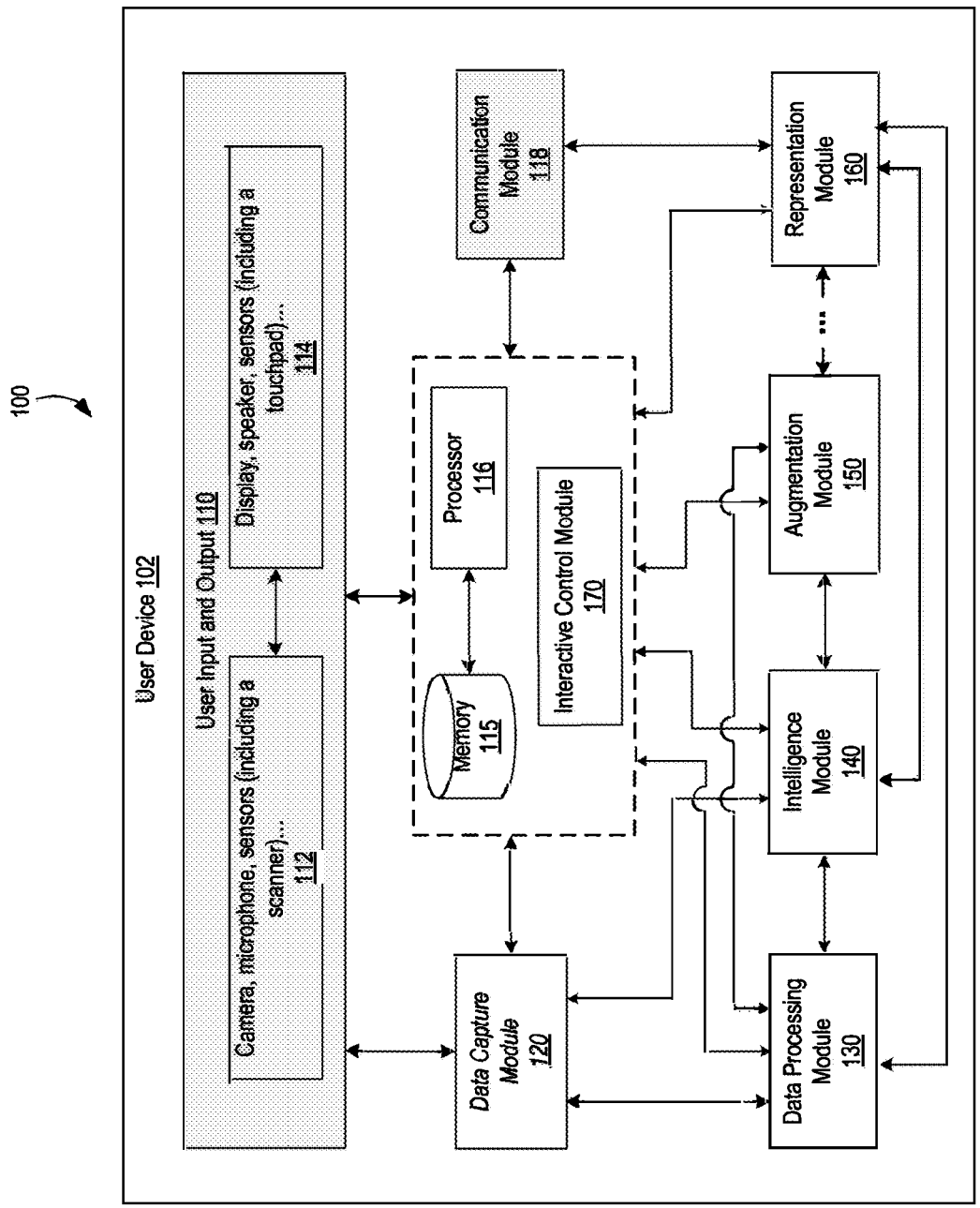
FIG. 1B depicts an exemplary intelligent and interactive AR-based platform.

As disclosed herein, user device 20 and user device 30 can be configured to include functionalities that are needed to carry out a particular task. For example, such tasks include but are not limited to comprehensive analysis and interpretation of input data, user authentication, data integration with AR-related input data, AR-based advertisement (e.g., implemented using content-matching), and AR-based intelligent communications. Exemplary functional modules that can be implemented to perform these tasks are depicted in FIG. 1B.

For tasks not related to communications, user device 30 can be optional. In some embodiments, even remote intelligence server 50 can be optional. In such embodiments, user device 20 alone can be configured to include all functionalities that are needed to carry out a particular task. However, it can be advantageous to include remote intelligence server 50 due to its high computing power and storage capacity. In such embodiments, functionalities for performing the task at issue can be divided between user device 20 and remote intelligence server 50. The division can include any combinations with one exception: data acquisition always takes place on a local device and will not be performed by a remote server.

For communication-related tasks, an exemplary system includes at least two user devices (e.g., user devices 20 and 30) and remote intelligence server 50. Again, functionalities for performing the communication task can be divided between a user device (e.g., user device 20 or user device 30) and remote intelligence server 50. The division can include any combinations with one exception: data acquisition must take place on a local device and will not be performed by a remote server.

In the following, real-time communications based on a multi-leveled real-time learning and processing of data is illustrated as an example.

As disclosed herein and unless otherwise specified, the term "data" can be broadly construed to encompass raw data, information, knowledge, AR input data, and beyond. Also, as disclosed herein and unless otherwise specified, learning and processing or just processing are broadly construed to cover all forms of treatment or distillation of data, information, knowledge and beyond. Exemplary treatment and/or distillation include but are not limited to quality improvement, error correction, discovery, digestion, dissection, fusion, analysis, abstraction, understanding, interpretation, manipulation, modification, argumentation, perception, synthesis, extraction, identification, association, reasoning, reducing, organizing, application, format conversion, transfer, communication, and etc.

As disclosed herein, each user device (e.g., elements 20 and 30) is equipped with functionalities for carrying out learning based on artificial intelligence and augmented reality (AR) based learning and processing of raw data, information, and knowledge.

In some embodiments, data learning and processing can be applied to one or more of raw data, information and knowledge individually in any possible combinations.

Results from learning and processing of data, information, and knowledge can be transferred between user device 20 and user device 30, and/or one or both of user device 20 and user device 30 and intelligence server 50.

For example, user device 20 acquires, processes, and augments data (e.g., audio, video, and sensor data) and sends the processed data to intelligence server 50 or user device 30 via wired or wireless network communication. In some embodiments, user device 20 sends the processed data directly to device 30 (e.g., via infrared transmission). In some embodiments, raw data can be transfer in addition to or in lieu of processed data.

In some embodiments, one or both of the devices 20 and 30 have their own local intelligence and AR processing module to augment data locally. In some embodiments, one or both of the devices 20 and 30 have their own have some intelligence analysis and processing functionalities. In some embodiments, one or both of the devices 20 and 30 have their own can also utilize a remote Big Data database (e.g., on intelligence server 50) to perform more and deeper form of learning and processing based on artificial intelligence to obtain more complete and deeper level of information, knowledge, and beyond. In some embodiments, the learning and processing can take place in the reverse direction. For example, based on the learned information and/or knowledge, intelligence server 50 can use or modify existing data or create new data incorporating the information and/or knowledge.

In some embodiments, data, information, or knowledge from either or both devices 20 and 30 can be saved in the Big Data database and also be sent to intelligence server 50 for additional learning and processing based on artificial intelligence.

In some embodiments, intelligence server 50 can process data with the intelligence information based on a Big Data database (e.g., saved locally on the server to accessible via network communication) to digest information/knowledge automatically and provide the digested information/knowledge as intelligence data to both the device that has sent the original raw or processed data (e.g., device 20) and a receiving device (e.g., device 30) based on the user preference and system setting respectively.

In some embodiments, the data sent to a sender device or a receiver device can be different due to their different user preference and system settings.

In some embodiments, a receiver device (e.g., device 30) can receive data, raw or process, from one or both of device 20 and intelligence server. Receiver device 30 can further process the received data, including, for example, interpreting and converting the received data to forms and format suitable for receiver device 30, augmenting the data with learned information and/or knowledge, and outputting the resulting data in various forms. In some embodiments, the output data will be presented based on a user's preference and/or system setting such as displaying visual data, playing audio data, and controlling corresponding sensors.

In some embodiments, device 30 can function as a sender device and transfer data to device 20 and intelligence server 50. In some embodiments, the systems and methods disclosed herein can be applied to facilitate an interactive two-way/multiple-way communication system.

In some embodiments, all aspects of data processing (e.g., raw data processing, information extraction, knowledge learning, AR-based data augmentation, representation of AR data, data compression, and etc.) can take place in one device via a secure processor and a secure channel, with a secured storage including encryption to ensure data security. In some embodiments, part of the data processing can take place via a secure processor, secure channel, with secure storage including encryption to ensure security while other parts of the data processing can take place via a processor, channel and storage with regular security level. In some embodiments, all aspects of data processing can take place via a processor, channel and storage with regular security level.

As disclosed herein, intelligence server 50 offers numerous advantages. For example, functionalities for carrying out artificial intelligence and AR based learning and processing of data can take place with enhanced efficiency and speed at server 50. In addition, such data learning and processing can implement big data stored on database 52 on server 50.

As disclosed herein, a computer device (e.g., device 20 or 30) includes, as an integral component or being communicatively connected to, a camera and optionally a microphone, or one or more sensors. In some embodiments, the camera is an integral part of the user device such as a computer, a cell phone, or video recorder. In some embodiments, the camera is an external hardware component that can be connected to the user device. In some embodiments, the user device is a network-enabled camera. Preferably, the camera is a depth camera. In some embodiment, the image/audio capturing device includes a set of cameras. As disclosed herein, the user device should be equipped with a CPU/GPU processor, a camera, a microphone, a display, a speaker, a communication unit, and storage. It includes but is not limited to a desktop computer, a laptop computer, a smartphone device, a personal digital assistant, a network-enabled camera, a tablet, an AR glass, an AR hamlet, a VR glass, a smart TV, and etc. The camera includes but is not limited to a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. A microphone can be any device that is capable of detecting and capturing audio signals. A sensor can be any component, module, or subsystem that can detect events or changes in its environment and send the signals to another device (e.g., a computer processor). Exemplary signals include but are not limited to those associated with heartbeat, blood pressure, orientation, temperature, motion, altitude, pressure, proximity, acceleration, gyroscope, and etc. As disclosed herein, methods and systems for generating real-time AR data are described by way of example. However, one of skill in art would understand that the methods and systems can be applied to other types of data. Additionally, other types of data can be processed, separately or in combination with images data to create the AR-based data as disclosed herein. An example is combination of sound data with image data. Another example is combination of sensor data with image data. As disclosed herein, sensor data comprise vibration data, temperature data, pressure data, orientation data, proximity data, and etc.

Exemplary implementations of functionalities for carrying out artificial intelligence based learning and AR based processing of data are described in detail in connection with FIG. 1B.

In one aspect, disclosed herein is an intelligent augmented reality cloud platform that is capable of performing numerous tasks, including, for example, comprehensive analysis and interpretation of input data, user authentication, data integration with AR-related input data, AR-based advertisement (e.g., implemented using content-matching), and AR-based intelligent communications. In particular, most of the tasks can be accomplished using real-time extracted information based on AR data augmentation, and/or real-time learned knowledge.

FIG. 1B depicts an exemplary computer system for an intelligent augmented reality user interface device 100.

Exemplary embodiment 100 achieve the functionalities by implementing, on computer device 102, user input and output (I/O) module 110, memory or database 115, processor 116, network communication module 118, optional data capture or acquisition module 120, data processing module 130, intelligence module 140, augmentation module 150 and representation module 160, interactive control module 170, and any other functional modules that may be needed for carrying out a particular task (e.g., an error correction or compensation module, a data compression module, and etc.). As disclosed herein, user I/O module 110 can further include input sub-module 112 such as a camera, a microphone, sensors (e.g., a scanner) and output sub-module 114 such as a display, a speaker, and sensors (e.g., a touchpad).

Also disclosed herein, a particular task can be performed by implementing one or more functional modules. In particular, each of the enumerated modules itself can, in turn, include multiple sub-modules. For example, data processing module 130 can include a module for data quality evaluation, a module for extracting and separating data based on content (e.g., extracting a real-life object from its environment) or based on data type (e.g., separating visual data from audio data), a module for combining multiple data type (e.g., image data with audio data and/or sensor data).

Figure 2A:
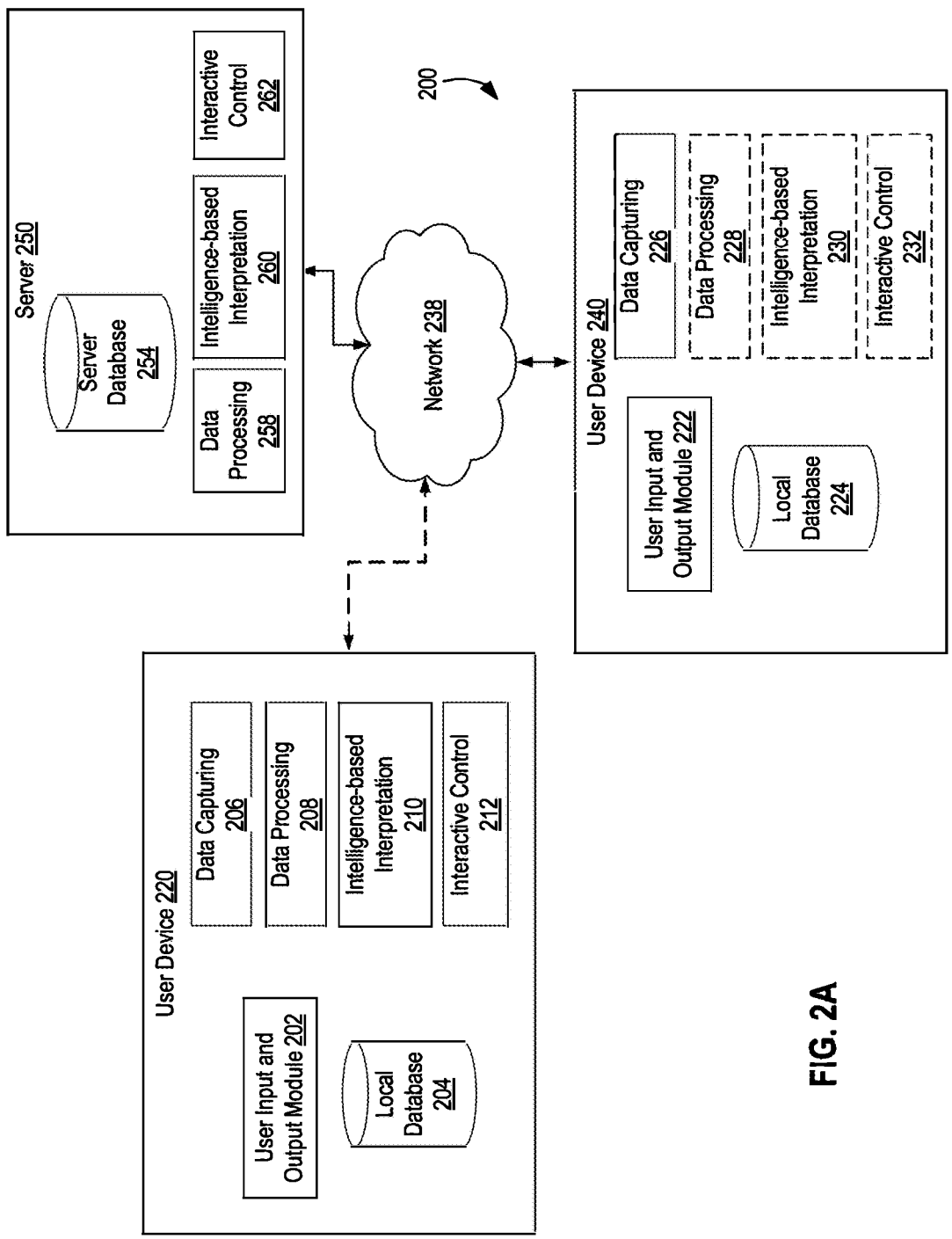
FIG. 2A depicts an example system for intelligent, comprehensive, interactive and real-time input data processing.

As disclosed herein, the functionalities associated with computer device 102 can be expanded to those illustrated in FIG. 2A, including but not limited to device 220, device 240 or server 250. As disclosed herein, computer device 102 can be a local user device or a server device: a local user device is required to be equipped with a data capture module while a server device usually does not include a data capture component. As disclosed herein, a data capture module can be either as an integral component of a user device or a separate functional component communicably connected with the user device.

In some embodiments, user I/O module 110 can capture visual audio and sensor data, for example, via input sub-module 112. For example, I/O module 110 can receive a gesture input, a body movement, or a voice input from a user to initiate the methods for generating AR-based real-time image data. In some embodiments, such input can be used to change the course of the methods by specifying in real-time user preference or selecting a system preference. In some embodiments, I/O module 110 is also configured to detect and track eye movement, facial expression and etc. Also, for example, I/O module 110 receives touch input from a touch sensitive display of device 102. In other embodiments, I/O module 110 can be coupled to other input devices, such as a camera, a keyboard, mouse, a monitor, touch sensitive screen, a speaker and etc., and receive user input from these devices. In some embodiments, I/O module 110 includes a camera, a keyboard, mouse, a monitor, touch sensitive screen, a speaker and etc. as an integral part of I/O module 110 or device 102. In some embodiments, device 102 can receive multiple types of user input. In some embodiments, I/O module 110 or device 102 further includes one or more sensor devices for collecting information such as heartbeat, blood pressure, orientation, pressure, proximity, acceleration, or allowing a user to receive a physical experience such as touching (e.g., a user can receive a remote handshake in real time).

In some embodiments, I/O module 110 can also present audio, visual, motion, and/or haptic output to the user; for example, via output sub-module 114. For example, I/O module 110 displays integrated images or videos on a monitor a user of device 102. In some embodiments, I/O module 110 can present GUIs that enable or support the functionality of one or more of the real-time image and signal processing methods/systems described herein, including but not limited to data capture or acquisition module 120, data processing module 130, intelligence module 140, augmentation module 150 and representation module 160, interactive control module 170, and any other functional modules that may be needed for carrying out a particular task (e.g., an error correction or compensation module, a data compression module, and etc.). In some embodiments, the user input and output module includes a plurality of menu commands, each corresponding to the functionality of one or more of the query processing modules.

In some embodiments, I/O module 110 allows a user to locate information that is needed for image processing. In embodiments, menu options can be provided such that a user can select one or more options to initiate one or more functions. For example, a user can click an icon to start image capturing process. Also for example, multiple categories of virtual environment images can be provided via menu options.

In some embodiments, a user may use I/O module 110 to request information that is available either on the local device 102 or can be obtained via network connection from a remote service device or another user device. For example, I/O module 110 can allow a user to use voice command to request AR input data such as a certain type of virtual environment (e.g., images of a European medieval castle). Once the images are delivered (either locally or via network connection), a user can request that the images be processed to construct a virtual environment.

In some embodiments, user I/O module 110 can be used to manage various functional modules. For example, a user can request via user I/O module 122 to change AR input data such as the virtual environment while a real-time communication is in process. A user can do so by select a menu option or type in a command discretely without interrupting the communication.

When methods/systems disclosed herein are used for image or video processing and editing, a user can use any type of input to direct and control the process via I/O module 110.

In some embodiments, computer device 102 includes a user input and output module (I/O module) 110. For example, I/O module 110 can receive user input to device 102 and present output from device 102, using text, audio, video, motion, and/or haptic output mechanisms. As disclosed herein, user I/O module 110 can further include input sub-module 112 such as a camera, a microphone, sensors (e.g., a scanner) and output sub-module 114 such as a display, a speaker, and sensors (e.g., a touchpad).

In some embodiments, a camera of input module 112 can include but is not limited to, for example, a high resolution camera that can acquire high resolution HD or beyond HD quality images and videos, a near infrared (NIR) camera that can acquire images and videos in the NIR frequencies, an infrared camera that can acquire images/videos in infrared frequencies; a thermal camera that can acquire images/videos in long wave, a 3D camera that can acquire 3D images/videos, a multiple spectrum camera that can acquire multiple spectrum images/videos, a RGB camera that can acquire color images/videos, a high speed camera that can acquire images/videos in very high frame rate, and etc. In some embodiments, a camera as disclosed herein include one or more lights can be controlled properly to provide proper illumination and light to the cameras in use. In some embodiments, other kinds of image acquisition devices/methods can be included in the platform.

In some embodiments, a microphone of input sub-module 112 can include but is not limited to a microphone that can acquire audio data in different frequencies, a microphone that can acquire sound from 40 Hz to 20K Hz, an ultra-low sound device that can acquire sound lower than 40 Hz, an ultrasound device/method that can acquire sound higher than 20K Hz, and etc. One of skill in the art can understand that functionalities of input module 112 can be flexible and acquire other kinds of sound signals.

In some embodiments, a speaker of input sub-module 112 can enable different speaker sound capabilities. Exemplary speakers include but are not limited to a regular sound device/method that can generate sound in the frequency range of 40 Hz to 20K Hz, such as voice, music, noise, alarm, etc.; a 3D sound device/method that can generate 3D sound effect; a high resolution sound device that can generate high resolution sound quality; an ultrasound device that can generate ultrasound (20 KHz or above); an ultra-low frequency sound device that can generate ultra-low frequency sound (below 40 Hz); and etc. One of skill in the art can understand that functionalities of input module 112 can be flexible to include other kinds of sound signal output devices.

In some embodiments, a display of output sub-module 114 can include a variety of special UI devices, including but not limited to a two-way mirror that can have 3 status: the reflection status to reflect the lights/objects/background, the transparent status to show displays, and the partial reflection and partial transparent status to have partial reflection and partial display; a 2D display that can display 2D images/videos; a 3D display that can display 3D images/videos; interface lights that light up with different light intensity and color in flashing or stationary status.

In some embodiments, user I/O module 110 can include a variety of sensors, including but not limited to, for example, vibration devices that produce vibration with different frequencies; movement devices that can control the mechanical movement of the system, such as rotation, forward/backward movement, vertical movement, and combination of these movements; touch device that enable users input information/command through touching a pad or screen; a tap device that enable users input information/command through tapping the system; and etc.

As disclosed herein, user I/O module 110 can communicate and control one or more cameras, one or more microphones, one or more speakers, one or more gesture input devices, one or more biometrics input/output devices; and etc.

One of skill in the art can understand that functionalities of input module 110 can be flexible to include other kinds of sound user interface devices.

In some embodiments, device 102 further comprises a memory or database 115. For example, memory or database 115 can store captured user input data such as images, audio data and sensor data, partially or fully processed images (e.g., extracted real life object and images for virtual environment), or partially or fully integrated images. In some embodiments, memory or database 115 can store user specific information; for example, a user can store information of one or more preferred virtual environment for generating AR-based real-time data. In some embodiments, memory or database 115 can store information retrieved from another device (e.g., a user device or a server). In some embodiments, memory or database 115 can store information retrieved in real-time from internet searches.

In some embodiments, memory or database 115 can send data to and receives data from one or more of the functional modules, including but not limited to data capturing module 120, data processing module 130, intelligence module 140, augmentation module 150, representation module 160, and interactive control module 170.

In some embodiments, device 102 comprises data capturing module 120. For example, data capturing module 120 can include an image capturing device such as a camera. In some embodiments, the camera is depth enabled. In some embodiments, two or more cameras are used. In some embodiments, a built-in or an external microphone can be used for audio collection. In some embodiments, data capturing module 126 captures multiple images. In some embodiments, data capturing module 126 can capture multiple images and fuse them together for example to create an animated image. In some embodiments, data capturing module 120 captures a video continuously. In some embodiments, data capturing module 120 captures sensor data by using one or more sensors associated with device 102. In some embodiments, data capturing module 120 can include sensors, including but not limited to one or more sensor devices for collecting information such as heartbeat, blood pressure, orientation, pressure, proximity, acceleration, and combinations thereof.

As disclosed herein, data capturing module 120 captures input data of a user (e.g., images, sound or sensor data of a real life object in the actual environment where the real life object is physically located). In some embodiments, the user is not the real life object, but controls device 102 to capture images of an object that is accessible to signal capturing module 126. For example, the real life object can be a celebrity who is being photographed by a user operating data capturing module 126.

Any devices or functional components suitable for data collection can be used as data capturing module 120 (either as an integral part of a user device or communicably connected with the user device). Exemplary devices or functional components include but are not limited to, for example, those disclosed in connection to input sub-module 112 of user I/O module 110 of computer device 102 (FIG. 1B).

The methods and systems disclosed herein are advantageous because they do not require a real life object to be in a specific type of environment to aid image processing.

In some embodiments, device 102 comprises a data processing module 130. Data processing module 130 can receive the real-time data, from I/O module 110, data capture module 120, or memory or database 115. In some embodiments, data processing module 128 can perform standard data processing algorithms such as noise reduction or signal enhancement. In some embodiments, data processing module 128 can performs data discovery and extract information from the data received in real-time. For example, data in each type can be analyzed to identify information such as human feature patterns (e.g., face, iris, body, gesture and etc.), voice patterns, bio-status, or any other physical or non-physical features of an object.

In some embodiments, data processing module 130 can evaluate and analyze each type of real-time data separately (e.g., visual, audio or sensor). In some embodiments, data processing module 130 can evaluate and analyze multiple types of real-time data at the same time (e.g., visual and sensor data can be used to detect onset of a heart attack).

In some embodiments, device 102 comprises an intelligence module 140. Intelligence module 140 can receive processed data from data processing module 130, or memory or database 115. In some embodiments, intelligence module 140 can performs deep data discovery: for example, extracting information from the data received in real-time and learning knowledge based on the extracted information.

As disclosed herein, information can be extracted by contextualizing, categorizing, calculating and condensing data. In some embodiments, information extraction can also take place according to one or more criteria comprising a user preference, a system setting, an integration parameter, a characteristic of an object or a scene of the raw data, an interactive user control, or a combination thereof. Each of the criteria can be seen as a way of organizing and contextualizing raw data. In some embodiments, at least one criterion is based on Big Data.

As disclosed herein, the extracted information can be represented by information data. In some embodiments, the information data can include text, one or more codes, one or more numbers, one or more matrixes, or combinations thereof. In some embodiments, the information data can include one or more images, one or more audio signals, one or more sensor signals; or combinations thereof. Here, the images, audio signal and sensor signals can be, and preferably are, different from those included in the raw data from which the information is extracted.

In some embodiments, real-time information extraction is triggered once data capture is initiated. In some embodiments, information extraction is achieved through organizing data. For example, when the raw data comprise multiple types of data (e.g., visual, audio or sensor data of an object or a scene), data organization can be achieved by separating the data according to its data type. In some embodiments, each type of data is further separated based on the content of the data; for example, data corresponding to an object can be organized separately from the data corresponding to a scene. For example, real-time information extraction of an object comprises identifying boundaries between the object and its environment, for example, based on their differences in relative locations within the image, contrast, light, color, thermal properties, and etc. In some embodiments, image data are collected using a depth-enabled camera and the depth information is used to divide the object into background and foreground before extracting information from either. In some embodiments, extraction module 128 can extract information through real-time object recognition and data separation. For example, object recognition comprises separating a person from the environment. In some embodiments, object recognition includes detecting different body parts of a person. In some embodiments, object recognition also includes associating certain characteristics with body parts of the person, which can facilitate extraction of information relating to motion, size.

In some embodiments, intelligence module 140 extracts information by further organizing (e.g., separating), in real-time, the data into one or more sub-categories associated with an object and its environment based on one or more characteristics. For example, the portion of the same object that shares the same or similar visual characteristics (e.g., color, darkness level) can be organized together. In some embodiments, information extraction utilizes a comprehensive characteristic-based mechanism, including artificial intelligence based mechanisms. For example, the comprehensive characteristic-based mechanism can recognize one or more characteristics of a person, an object and the environment, and their differences. Exemplary characteristics can include and is not limited to a visual characteristic such as a spatial characteristic, a size characteristic, a shape characteristic, a motion characteristic, a color characteristic, a light illuminance and reflectance characteristic, a temporal characteristic, or a transparency characteristic, a depth characteristic, a material characteristic, or combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, raw data are organized according to a user preference or a system setting; for example, through elimination of irrelevant data or focusing on one or more types of data. In some embodiments, user preferences can be set up to specify the type of data for information extraction, irrelevant data may be removed or ignored to facilitate information extraction from the relevant data. For example, if a doctor is interested in medical data relating to a heart condition, information extraction will focus on data such as color of the face, pulse/heartbeat, breathing data, blood pressure, and etc. In another example, if the doctor is interested in information about the skin condition of the patient, information extraction can be carried out only for skin-related data.

In some embodiments, information extraction can be performed with interactive user controls. For example, in a remote diagnosis session based on the methods/systems of the current disclosure, the doctor may request a certain type of information. For example, the doctor may request a heart rate be calculated based on heartbeat data captured by one or more sensors.

In some embodiments, the system/method disclosed herein can include system settings specifying data types that are relevant to each other under a certain pre-defined context. Data of the specified data types can be selected and processed for information extraction.

By applying various analytic tools, data representing different objects and scene can be organized and put into context. For example, by comparing positional data of an object from different images obtained at different time points, it is possible to extract positional or motion information of the object. In some embodiments, it may be possible to calculate or compare relative speed when multiple objects are present in the raw data.

In some embodiments, intelligence module 140 extracts information from one type of data. In some embodiments, extraction module 128 extracts information from multiple types of data. For example, physical appearance of a person can be combined with body temperature reading for additional information extraction. In some embodiments, the multiple types of data can be fused prior to information extraction.

In some embodiments, information extraction process as disclosed herein can be completed in one round or in multiple rounds. In some embodiments, a round of rough information extraction can be performed first before one or more additional rounds of fine extraction are carried out. For example, rough extraction can provide information such as heart rate, while a deeper level of information extraction can lead to information of one or more complete cardiac cycles: such as that of the inflow phase, isovolumetric contraction, outflow phase and isovolumetric relaxation. A still-deeper level of information extraction would include extracting information associated with A-V valve closure, aortic valve opening, isovolumetric contraction, ejection, isovolumetric relaxation, rapid inflow, A-V valve opening. Exemplary information can include aortic pressure, atrial pressure, ventricular pressure, ventricular volume. In some embodiments, information is extracted from electrocardiogram and phonocardiogram. As noted, the level at which information can be extracted can be limited by the analytical methods that are available, the quantity, type and quality of the raw data.

In some embodiments, intelligence module 140 can extract real-time information using pre-learned information. For example, pre-existing patterns of objects and scene can be used as starting points before further real-time information learning. In some embodiments, information extraction can take place multiple times on different devices. For example, an initial information extraction can take place on a local device which limited computing power. The initial information extraction can be crude and limited in depth. The extracted information and raw data can be transferred to another computer device with more computing power and better access to a more comprehensive database (e.g., including Big Data) where further information extraction takes place. Exemplary embodiments of multi-stage information extraction processes are illustrated in FIGS. 3 through 5.

In some embodiments, information extraction can be performed based on machine learning and pattern recognition methods; e.g., deep learning, neural network, feature point based approaches, principal component analysis (PCA), linear discriminant analysis (LDA), etc.

In some embodiments, intelligence module 140 can learn or derive knowledge based on analysis of information that has been extracted from raw data.

In some embodiments, knowledge is learned by understanding and contextualizing information. In some embodiments, such contextualizing can be achieved by organizing relevant information into categories. This added level of organization can aid understanding of data. For example, in the example where a patient has high risk of an impending heart attack, the doctor can learn this knowledge by organizing the relevant information together. For example, the patient showed alarming signs such as a flushed face, fast heart rate, very high blood pressure, fast and short breath, slow movement, and etc.

Like information extraction, knowledge learning can also take place according to one or more criteria comprising a user preference, a system setting, an integration parameter, a characteristic of an object or a scene of the raw data, an interactive user control, or a combination thereof. For example, a method/system specifically designed for medical diagnosis can have one or more pre-determined categories for each disease that can be possibly identified based on non-invasive data such as visual data, audio data, and sensor data. For example, a category for heart disease would inform the method/system to focus on certain types of information such as face color, breathing pattern, heart rate, blood pressure values, and etc. In some embodiments, the method/system also provides reference standards against which the obtained information will be compared and results from the comparison can lead to learned knowledge. In some embodiments, at least one criterion is based on Big Data.

As disclosed herein, the learned knowledge can be represented by knowledge data. In some embodiments, the knowledge data can include text, one or more codes, one or more numbers, one or more matrixes, or combinations thereof. In some embodiments, the knowledge data can include one or more images, one or more audio signals, one or more sensor signals; or combinations thereof. Here, the images, audio signal and sensor signals can be, and preferably are, different from those included in the raw data from which the knowledge is indirectly derived.

In some embodiments, knowledge learning comprises organizing (e.g., separating), in real-time, available information into one or more sub-categories associated with an object and its environment based on one or more characteristics. For example, information reflecting visual characteristics of an object can be organized into one category. In some embodiments, knowledge learning utilizes a comprehensive characteristic-based mechanism, in addition to using, for example, artificial intelligence based mechanisms to facilitate learning. For example, the comprehensive characteristic-based mechanism can recognize one or more characteristics of a person, an object and the environment, and their differences. Exemplary characteristics can include but are not limited to a visual characteristic such as a spatial characteristic, a size characteristic, a shape characteristic, a motion characteristic, a color characteristic, a light illuminance and reflectance characteristic, a temporal characteristic, or a transparency characteristic, a depth characteristic, a material characteristic, or combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, knowledge learning can be performed with interactive user controls. For example, in a remote diagnosis session based on the methods/systems of the current disclosure, the doctor may request the system to look into the possibility whether a person has a certain type of disease or condition. In some embodiments, upon receiving such user directions, the system can group together relevant information that may be helpful for diagnosing the particular disease or condition.

In some embodiments, knowledge is derived from one type of information. In some embodiments, knowledge can be derived from multiple types of information. Most medical diagnoses take place at the knowledge level. Using the same example above, additional information, such as the maximum value of the fever, duration of the fever, exposure to heat and germs, or hydration state can lead to different diagnoses and varied treatments.

In some embodiments, information extraction can be performed based on machine learning and pattern recognition methods; e.g., deep learning, neural network, feature point based approaches, principal component analysis (PCA), linear discriminant analysis (LDA), etc.

In some embodiments, device 102 comprises an augmentation module 150. As disclosed herein, augmentation module 150 can generate real-time AR data by integrating the raw data, AR input data, information input, and knowledge input. In some embodiments, the integration takes place according to one or more criteria comprising a user preference, a system setting, an integration parameter, a characteristic of an object or a scene of the raw data, an interactive user control, or a combination thereof.

As disclosed herein, data augmentation can take place as many different levels. Information embodiments, data can be augmented based on one or more of information (real-time learned or existing), knowledge (real-time learned or existing), a user preference, a system setting, or additional input data. Here, data can include raw, processed, or other such as those pre-existing on a device, retrieved in real-time via network communication, or data created in real-time, combinations thereof.

In some embodiments, extracted object information is combined with augmented reality (AR) input data to generate real-time AR data. As disclosed, the AR input data include virtual reality information or information that is processed from the data captured. In the case of image data, the combination process is also called image integration. In some embodiments, user device 120 comprises a separate argumentation module. For example, integration can occur on a pixel-by-pixel basis for both efficiency and accuracy.

In some embodiments, real-time extracted information can be used to generate the real-time AR data. In some embodiments, real-time learned knowledge can also be used to generate the real-time AR data. For example, in the example where the word "Hawaii" is emphasized during a friendly conversation about travel destination. The emphasis on "Hawaii" combined with facial expression and body movements allows the system to conclude that the user is excited about going to Hawaii. Such a conclusion (knowledge) promotes the system to create real-time AR data that include content relating to Hawaii.

In some embodiments, a user preference can define a particular type of AR input data that a user likes. For example, a person may choose a virtual quite tea house when conducting a business meeting, but select a beach setting when talking to families or friends. In some embodiments, the integration criteria are entirely defined automatically by the system based on the extracted real life object (e.g., the user) and the AR input data (e.g., a system-selected virtual environment).

In some embodiments, a user can provide real-time interactive control through voice or gesture input to redefine or modify the relations between the extracted real life object (e.g., the user) and AR input data (e.g., a virtual environment) during the integration process.

Additional exemplary methods of generating real-time AR data can be found in, for example, U.S. patent application Ser. No. 15/479,269 filed on Apr. 4, 2017 and entitled "Methods and Systems for Real-Time Image and Signal Processing in Augmented Reality based Communications;" U.S. patent application Ser. No. 15/479,277 filed on Apr. 4, 2017 and entitled "Real-Time and Context Based Advertisement with Augmented Reality Enhancement;" U.S. patent application Ser. No. 15/665,295 filed on Jul. 31, 2017 and entitled "Methods and Systems for Photorealistic Human Holographic Augmented Reality Communication with Interactive Control in Real-Time;" each of which is hereby incorporated by reference herein in its entirety.

In some embodiments, device 102 comprises a representation module 160, which can also be referred to as "data representation module 160" or "module 160." As disclosed herein, representation module 160 can represent one or more types of data using data parameters. For example, data parameters can include text, one or more codes, one or more numbers, one or more matrixes, one or more images, one or more audio signals, one or more sensor signals; or combinations thereof. For example, a particular AR input data (e.g., a specific virtual environment) can be represented with a numerical code. A user's expression can be represented as a series of numbers or matrixes. A user's gesture can be represented by gesture model parameters using a gesture model that is specific to the user.

As disclosed herein, different data parameters can be used to represent the same information. The specific form of the data parameters can be determined by a number of factors, including but not limited to cultural background, language differences, personal habits, individual variations, and etc. For example, a typical first-time greeting in a user from the US can be represented by the word "Hello" or "Hi," followed up the phrase "nice to meet you" and a friendly wave to another user at a remote communication device. The same greeting for a user in the UK can include the phrase "how do you do?" and a friendly nod. Here, the data parameters representing the greetings include audio signals for the verbal greeting and images of the hand or head movement.

In some embodiments, significantly different data parameters may be used to represent AR data based on cultural differences. For example, a user from the US communicates with a user from Japan in a formal business meeting using methods/systems according to the current disclosure. The user in Japan represents a traditional corporation, so the user in the US instructs the system to tailor the communication according to Japanese custom. Alternatively, the system can automatically establish settings to facilitate a formal meeting based on context and background information that is provided to the system. Here, the information: the word "Hello" or "Hi," the phrase "nice to meet you," the friendly wave, and optional background information can be used to derive data at the knowledge level; for example, the system can automatically learn about the context and purpose of the meeting. Subsequently, real-time AR data can be generated based on such information and knowledge. In the real-time AR data, the knowledge and information can be represented by data parameters that are different from those associated with the input data. For example, the system can use an avatar representing the user in the US to create an animation of the user greeting the Japanese user by bowing according to standard Japanese custom. Here, the real-time AR data significantly different from the raw data input: completely different form of data parameters are chosen to represent the same information and knowledge.

Representation module 160 can represent data at any level into a suitable format for a particular device, including but not limited to including fully or partly augmented data, information data, knowledge data, AR input data, and etc. For example, augmented data can be separated into multiple files before being compressed for data transmission. In some embodiments, representation module 160 can include data construction or reconstruction functions, which can change the data parameter form or type of a particular data, for example, to suit a particular type of hardware design (e.g., 3D display to 2D display or vice versa) or to present the data better to a particular audience (e.g., people with visual, audio and other forms of disabilities).

In some embodiments, also included in computer device 102 is an interactive control module 170. As disclosed herein, interactive control module 170 can receive instructions from any number of the other functional modules such as data processing module 130, intelligence module 140, augmentation module 150, representation module 160, communication module 118, and more. Interactive control module 170 identifies one or more actions to be taken, which can then be executed by processor 116 via user I/O module 110. For example, a user can modify or change a previously entered gesture command by entering a new gesture. A user can also change the content of the real-time AR data via interactive control module 170. For example, during a real-time AR-based communication session, a user can choose a different virtual reality environment. Also, a user can change a portion of the real-time AR data through interactive controls.

In a non-communication setting, a user can also interact with virtual content in real-time via the intelligent AR-cloud platform. This can be particularly useful in the setting of gaming or education. For example, a user can use gesture input, sometimes combined with audio and sensor data, to enter different locations within a virtual environment. For example, in a virtual tour of ancient Rome, a user can point to a certain direction to change the course of the tour, making it possible for different people to have different touring experience based on their own interests. Also, for example, when arriving at a new location, a user can press different virtual buttons to request additional information. Also, for example, in an application for music composition, a user can use gesture to identify virtual representation of music notes to compile music. As the music is being composed, it can be played to the user and the user can choose the edit and revise previously composed music. AR-related data make it possible to present information to handicapped people. For example, light color, intensity and duration can be used to represent music notes in a composition, which will enable a deaf person to compose via interactive control through interactive control module 170 of the intelligent AR-based user interface.

As disclosed herein, interactive controls can take place at different levels. In some embodiments, interactive controls can take place from within the real-time AR data. For example, in the context of conducting a conference meeting, image and audio data of a presenting user will be collected and integrated with other presentation materials. For example, the presenting user can be shown standing in front of a chart or a table and point to different parts of the chart or table to highlight different points. In some embodiments, the presenting user can use hand gesture to adjust the size of the table to, for example, enlarge a part of the chart or table for better readability. Here, real-time AR data including a larger chart or table can be generated according to the hand gesture. In some embodiments, the presenting user can use a voice command to achieve the same effect in real-time. In some embodiments, one or more hand gesture and/or one or more voice commands can be used in combination to interactively modify the content of the real-time AR data from within the real-time AR data.

In some embodiments, interactive controls can take place beyond the real-time AR data and yet be reflected in the real-time AR data. For example, a user can use a gesture, a voice command or a combination thereof to execute a command to open a door in a remote location. Here, the door in a remote location when it is not accessible by the device that is collecting input data from the user. As disclosed herein, the door is connected to the device accessible to the user via network communication, for example, as one of the physical devices within the Internet of Things (IoT). The door is also equipped with the capacity to receive and respond to data that are communicated to the door. For example, a loaded spring based mechanism can be used to unlock the door in response to a change in an electric current flowing through a controller for the loaded spring. In its natural state, the spring expands and pushes a bolt to lock the door. When a user command for opening a door (interpreted from one or more gestures and/or one or more voice commands) is communicated via network communication to a local IoT where the door is located, the door opening command is transformed into an electric pulse, which can turn on an electromagnetic mechanism to pull the spring-loaded door bolt in the retracted position, thereby opening the door. Once the electric current is terminated, the spring-loaded bolt can return to the extended position and lock the door.

The method/system disclosed herein can be used to cause any physical device that is communicably connected to a computer device to change its status. The computer device achieves such by implementing an interactive AR platform such as device 102 of FIG. 1B. As disclosed herein, a physical device comprises a door, a light, a refrigerator, a curtain, a shutter, a computer, a vacuum cleaning, a heater, an air conditioner, an A/C system, a swimming pool, a car, a garage door, a faucet, a bicycle, a scooter, a television, an audio player, a video player, a fan, a gaming device, a clock, a tooth brusher, a paper shredder, an adjustable desk or chair, a camera, a sensor, or combinations thereof. A status of the physical device can be status comprises an on-off status, an open and close status, a temperature status, a motion status, a height status, a weight status, a size status, an intensity status, a sound level status, or combinations thereof.

In some embodiments, as a door opens in real life, real-time AR data can include a representation of the real life event. The representation can be realistic, animated, metaphoric, or unrelated except in timing. For example, the real-time AR data can depict a door opening, either as a video or in an animation. In some embodiments, the real-time AR data changes its content concurrently as the door opens in real life. In some embodiments, the real-time AR data can depict a symbolic visual representation concurrently as the door opens in real life. For example, the real-time AR data can show a new scene representing the beginning of a new world. The real-time AR data can also show water running down a dam as the door opens in real-time.

In some embodiments, a real life event can occur first and be reflected in the real-time AR data. In an example similar to the one described above, a door opens in real life. The door is a part of an IoT including many other physical devices. In some embodiments, data concerning the open and close status of the door can be sent via network communication to a computer device (e.g., device 102 of FIG. 1B). The data can be represented in a different format or data type (e.g., via representation module 160). The different format or data type can be combined with other user input data, AR-related input data to create real-time AR data. The real-time AR data can include a representation of the door-opening event in real life. The representation can be realistic, animated, metaphoric, or unrelated except in timing.

As disclosed herein, network communication module 118 can be used to facilitate communications between the user device and any other system or device through a wired or wireless network connection. Any communication protocol/device can be used, including without limitation a modem, an Ethernet connection, a network card (wireless or wired), an infrared communication device, a wireless communication device, and/or a chipset (such as a Bluetooth™ device, an 802.11 device, a WiFi device, a WiMax device, cellular communication facilities, etc.), a near-field communication (NFC), a Zigbee communication, a radio frequency (RF) or radio-frequency identification (RFID) communication, a PLC protocol, a 3G/4G/5G/LTE based communication, and/or the like. For example, a user device having an intelligent and interactive AR-cloud platform can communicate with another user device with the same platform, a regular user device without the same platform (e.g., a regular smart phone), a remote server, a physical device of a remote or local IoT local network, a wearable device, a user device communicably connected to a remote server, and etc.

In some embodiments, the physical device of a remote or local IoT comprises one selected from the group consisting of a door, a window, a light, a refrigerator, a piece of furniture, a fixture, a curtain, a shutter, a computer, a computer device, a vacuum cleaning, a heater, an air conditioner, an A/C system, a swimming pool, a car, a garage door, a faucet, a bicycle, a scooter, a television, a speaker, an audio player, a video player, a fan, a gaming device, a toy, a clock, a tooth brusher, a paper shredder, an adjustable desk or chair, a camera, a sensor, or combinations thereof.

For example, a user device can communicate with a physical device to change its status. In some embodiments, the status of the physical device comprises a binary status, a continuous value adjustment status, or a discrete value adjustment status. In some embodiments, the status of the physical device comprises one selected from the group consisting of an on-off status, an open and close status, a yes and no status, a temperature status, a motion status, a height status, a weight status, a size status, an intensity status, a sound level status, and combinations thereof. In some embodiments, the physical device comprises a piece of furniture, a vehicle, an appliance, an electronic appliance, a building, a sensor, a fixture, a toy, or another computer device.

The functional modules described herein are provided by way of example. It will be understood that different functional modules can be combined to create different utilities. It will also be understood that additional functional modules or sub-modules can be created to implement a certain utility.

The intelligent AR-cloud platform as disclosed herein has numerous applications in drastically different contexts, in particular real-time applications. Different applications are made possible by implementing combinations of different functional modules. Exemplary applications include but are not limited to intelligent and interactive searches; interactive display screens or billboards for immersive and non-intrusive content display/experience (e.g., for education or advertisement); real-time image and signal processing and integration of AR input data (in both communication and non-communication context); context-based and real-time advertisement; and photorealistic human holographic AR-based communication with interactive real-time control.

Figure 1C:
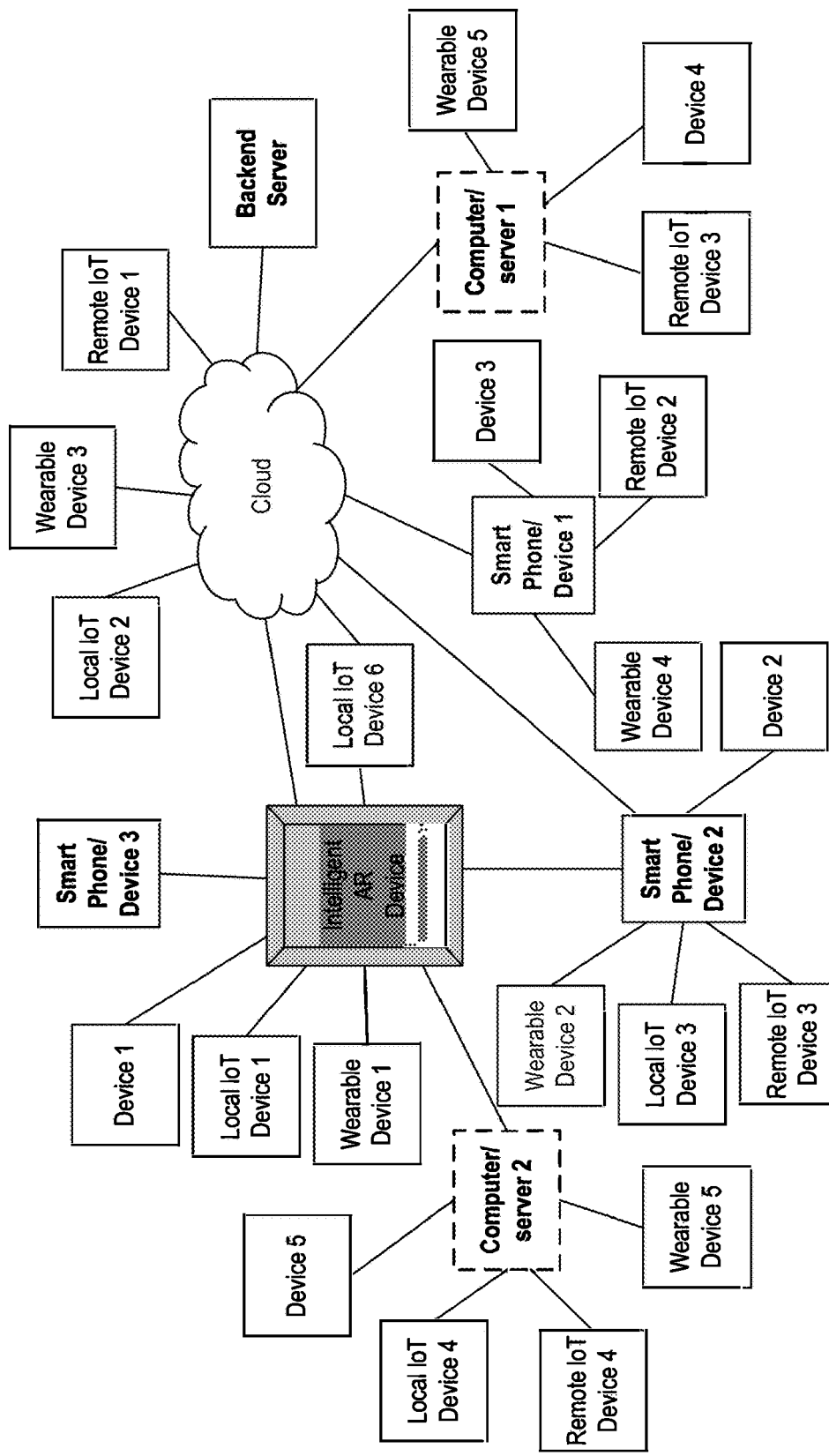
FIG. 1C depicts a sample network including an intelligent platform device.

FIG. 1C illustrates how an intelligent device based on the current systems and methods can interact with numerous devices, for example, via local or remote network connections. For example, the intelligent platform device can connect to devices on a local Internet of Things (IoT) network, either directly or via a local computer, a smartphone device, or the like. Also, for example, the intelligent platform device can connect to a remote IoT network via internet connection via one or more intermediate devices such as a computer, a smartphone, or the like. In some embodiments the intelligent platform device can directly connect to a remote IoT network via internet connection.

Figure 1D:
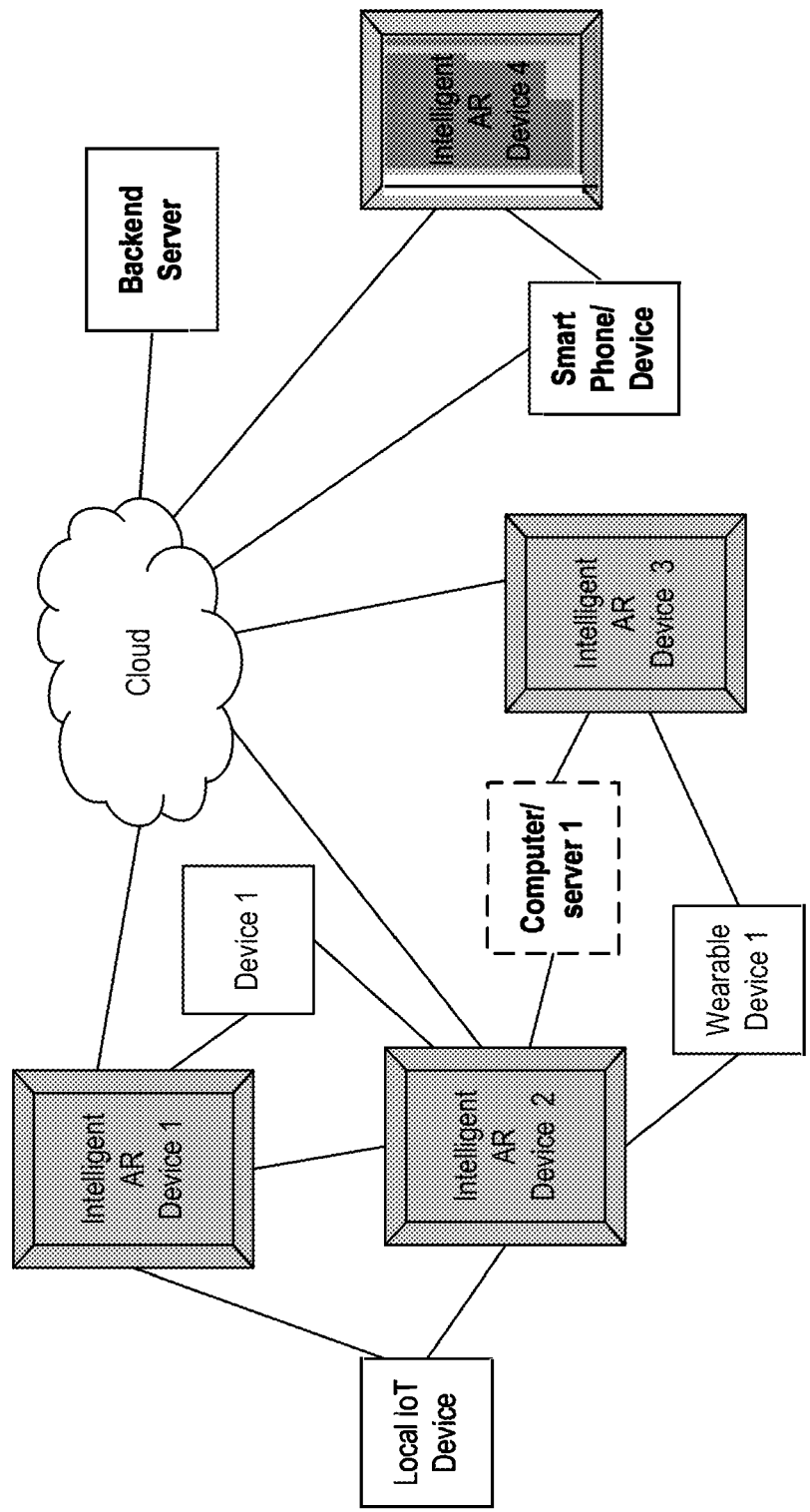
FIG. 1D depicts a sample network including multiple intelligent platform devices.

FIG. 1D illustrates how multiple intelligent devices can interact with each other, either directly or via a network connection and one or more intermediate devices. In some embodiments, an intelligent device can be associated with one or more dedicated functionalities (e.g., video conferencing, household functions, smart car-associated applications, health-related applications). In some embodiments, the same intelligent device can be associated multiple types of functionalities.

Additional details and examples of these and similar applications can be found in U.S. patent application Ser. No.

15/367,124 filed on Dec. 1, 2016 and entitled "Methods and Systems for Personalized, Interactive and Intelligent Searches;" U.S. patent application Ser. No. 15/479,269 filed on Apr. 4, 2017 and entitled "Methods and Systems for Real-Time Image and Signal Processing in Augmented Reality based Communications;" U.S. patent application Ser. No. 15/479,277 filed on Apr. 4, 2017 and entitled "Real-Time and Context Based Advertisement with Augmented Reality Enhancement;" and to U.S. patent application Ser. No. 15/665,295 filed on Jul. 31, 2017 and entitled "Methods and Systems for Photorealistic Human Holographic Augmented Reality Communication with Interactive Control in Real-Time;" U.S. patent application Ser. No. 15/675,635 filed on Aug. 11, 2017 and entitled "An Intelligent Augmented Reality (IAR) Platform-Based Communication System;" each of which is hereby incorporated by reference herein in its entirety.

Exemplary Embodiment: Intelligent and Comprehensive Interpretation of Input Data In one aspect, disclosed herein are methods and systems for comprehensive interpretation of input data. Comprehensive interpretation can take place at many levels, including but not limited to, for example, the use of multiple types of input data (e.g., visual, audio, and sensor data); selective processing of input data at multiple levels (e.g., via removal of input data concerning irrelevant people and focusing on one or more users of interest; separating user data from environmental or contextual data based on context, information extracted from a subset of the data and knowledge learned based on the extracted information, an interactive user control, and selecting data based on criteria such as a user preference, a system setting, an integration parameter, a characteristic of an object or a scene of the raw data, an interactive user control, or combinations thereof), and deep understanding of raw, partially or fully processed data (e.g., based on numerous criteria such as a user preference, a system setting, an integration parameter, a characteristic of an object or a scene of the raw data, an interactive user control, or combinations thereof).

FIG. 2A illustrates an exemplary system 200 for carrying out the functionalities for performing comprehensive iterative and interactive interpretation/analysis of user input data (e.g., images, video, audio and/or sensor data). Here, multiple user devices (e.g., 220 and 240) are connected to a server device 250 via network 238. Processing of user input data can take place on one or more of the devices illustrated. For example, user device 220 can perform all necessary functionalities locally as a standalone device. User device 240 represents a device that depends on one or more other devices (e.g., server 250 or a user device such as user device 220. As discussed herein, functionalities necessary to perform a certain application are shared between user device 240 and the one or more other devices in any combinations with one limitation: data capture or acquisition usually take place at a user device that is accessible to a user.

In some embodiments, user input data further comprise audio input data or sensory input data. In some embodiments, the sensory input data comprise bio-status data of the user, user behavior data of the user, environmental data, or status data of an object in the proximity of the user. As disclosed herein, exemplary bio-status data include but are not limited to heartbeat data, blood pressure data, body temperature data, user pulse data, user orientation data, breathing pattern data, and etc. Exemplary user behavior data include but are not limited to acceleration data, motion data, gyroscopic data, pressure data, proximity data, and etc. Exemplary environmental data include but are not limited to environmental temperature, humidity, wind speed, altitude, geolocation data, global positioning system (GPS) data, and etc. As disclosed herein, an object in the proximity of the user can be a physical object or another person. Exemplary data of the object include but are not limited to behavior data or user bio-status data. As disclosed herein, in some embodiments, the system and method can automatically identify a person as the user of the system and thus focus on input data associated with the particular user. The criteria for identifying the user from one or more objects in the proximity of the user can include, for example, how active, physically or emotionally the user in comparison to the one or more objects. In some embodiments, the activity level can be determined based on sensory data. In some embodiments, the system and method can identify one user at a time based on relative activity; i.e., the system and method can automatically switch from one person to another person.

In some embodiments, the sensory input data comprise data selected from the group consisting of bio-status data of the user, heartbeat data, blood pressure data, body temperature data, orientation data, environmental temperature data, motion data, pressure data, altitude data, proximity data, acceleration data, gyroscopic data, geolocation data, global positioning system (GPS) data, and combinations thereof.

User device 220 depicts a local device (e.g., a device that is accessible to a user or a real life object) equipped with multiple functionalities. In particular, user device 220 comprises a user input and output (I/O) module 202, a local database 204, and multiple functional modules (e.g., modules 206, 208, 210, 212 and etc.) for capturing user input data (e.g., images, sounds and sensor data of a real life object in a scene), separating the real life object from its surrounding, extracting information/knowledge concerning the real life object or scene based on real-time learning and analysis, and providing real-time interactive control of the local device based on the comprehensive and real-time interpretation of the user input data. As disclosed herein, the comprehensive and real-time interpretation can be a user preference, a system setting, a characteristic of an object or scene from the raw data, selected data from which information has been extracted, selected information from which knowledge has been learned, or any other applicable criteria.

In some embodiments, user device 220 can perform all necessary functionalities locally as a standalone device. In some embodiments, functionalities necessary to perform a certain application are shared between user device 240 and the one or more other devices (e.g., a remote server or another user device). As disclosed herein, the functionalities can be shared in any combinations with one limitation: data capture or acquisition usually take place at a user device that is accessible to a user.

In some embodiments, user device 220 includes a user input and output module (I/O module) 202. For example, I/O module 202 can receive user input data to user device 220 and present output from user device 220, using text, audio, video, motion, and/or haptic output mechanisms. For example, I/O module 202 can receive a gesture input, a body movement, or a voice input from a user to initiate the methods for generating AR-based real-time image data. In some embodiments, such input can be used to change the course of the methods by specifying in real-time user preference or selecting a system preference. In some embodiments, I/O module 202 is also configured to detect and track eye movement, facial expression and etc. Also, for example, I/O module 202 receives touch input from a touch sensitive display of user device 220. In other embodiments, I/O module 202 can be coupled to other input devices, such as a camera, a keyboard, mouse, a monitor, touch sensitive screen, a speaker and etc., and receive user input from these devices. In some embodiments, I/O module 202 includes a camera, a keyboard, mouse, a monitor, touch sensitive screen, a speaker and etc. as an integral part of I/O module 202 or user device 220. In some embodiments, user device 220 can receive multiple types of user input. In some embodiments, I/O module 202 or user device 220 further includes one or more sensor devices for collecting information such as heartbeat, blood pressure, orientation, pressure, proximity, acceleration, or allowing a user to receive a physical experience such as touching (e.g., a user can receive a remote handshake in real time).

In some embodiments, I/O module 202 can also present audio, visual, motion, and/or haptic output to the user. For example, I/O module 202 displays integrated images or videos on a monitor a user of device 220. In some embodiments, I/O module 202 can present GUIs that enable or support the functionality of one or more of the real-time image and signal processing methods/systems described herein, including but not limited to data capturing module 206, data processing module 208, intelligence-based interpretation module 210, and interactive control module 212. In some embodiments, the user input and output module includes a plurality of menu commands, each corresponding to the functionality of one or more of the functional modules needed for processing user input data.

In some embodiments, I/O module 202 allows a user to locate information that is needed for input data processing. In embodiments, menu options can be provided such that a user can select one or more options to initiate one or more functions. For example, a user can click an icon or use a gesture to start data capturing process.

In some embodiments, a user may use I/O module 202 to request information that is available either on the local user device 220 or can be obtained via a network connection from service device 250 or another user device 240. For example, I/O module 202 can allow a user to use voice or gesture command to request additional data useful for better understanding of the input data, such as locally stored data (e.g., user preference, system setting, context, local user log data, and etc.) or data accessible via network communication (e.g., trending data associated with the user's geolocation, big data concerning a particular subject matter or population).

In some embodiments, a user may use I/O module 122 to manage various functional modules. For example, a user can request via user I/O module 122 to set user preference if the user device is likely to be used by the same user. A user can do so by selecting a menu option or type in a command discretely without interrupting the communication.

When methods/systems disclosed herein are used for processing and editing of input data (e.g., image, audio, or sensor data), a user can use any type of input to direct and control the process via user I/O module 202.

Any devices or functional components suitable as part of a user interface can be used as user I/O module 122 (either as an integral part of a user device or communicably connected to the user device). Exemplary devices or functional components include but are not limited to, for example, those disclosed in connection with input sub-module 112 and output sub-module 114 of user I/O module 110 of computer device 102 (FIG. 1B).

In some embodiments, user device 220 further comprises a local database 204. As disclosed herein, "local database 204," and "database 204" can be used interchangeably. For example, local database 204 can store captured user input data such as images, audio data and sensor data, partially or fully processed images (e.g., extracted real life object, and images for a virtual environment), or partially or fully integrated images. In some embodiments, database 204 can store user specific information; for example, previous input data and data concerning frequent users of the device may be stored in local database 204. In some embodiments, database 204 can store information retrieved from another device (e.g., a user device or a server). In some embodiments, memory or database 204 can store information retrieved in real-time from internet searches.

In some embodiments, local database 204 sends data to and receives data from one or more of the functional modules, including but not limited to data capturing module 206, data processing module 208, intelligence-based interpretation module 210, and interactive control module 212.

In some embodiments, user device 220 comprises data capturing module 206. As disclosed herein, "data capturing module 206," "capturing module 206," and "module 206" can be used interchangeably. For example, data capturing module 206 can include an image capturing device such as a camera. In some embodiments, the camera is depth enabled. In some embodiments, two or more cameras are used. In some embodiments, a built-in or an external microphone can be used for audio collection. In some embodiments, data capturing module 206 captures multiple images. In some embodiments, data capturing module 206 can capture multiple images and fuse them together for example to create an animated image. In some embodiments, data capturing module 206 captures a video continuously. In some embodiments, data capturing module 206 captures sensor data by using one or more sensors associated with device 220.

As disclosed herein, data capturing module 206 captures input data from a user (e.g., real-time images, sound or sensor data of a real life object in the actual environment where the real life object is physically located).

Any devices or functional components suitable for data collection can be used as data capturing module 206 (either as an integral part of a user device or communicably connected to the user device). Exemplary devices or functional components include but are not limited to, for example, those disclosed in connection with input sub-module 112 of user I/O module 110 of computer device 102 (FIG. 1B).

In some embodiments, user device 220 comprises a data processing module 208. Data processing module 208 can receive the real-time data, from I/O module 202, data capture module 206, or local database 204. In some embodiments, data processing module 208 can perform standard data processing algorithms such as noise reduction or signal enhancement. In some embodiments, data processing module 208 can perform initial data discovery and extract information from the data received in real-time. For example, data in each type can be analyzed to identify information such as human feature patterns (e.g., face, iris, body, gesture and etc.), voice patterns, bio-status, or any other physical or non-physical features of an object.

In some embodiments, data processing module 208 can separate user input data based on data type. In some embodiments, data processing module 208 can combine and integrate multiple types of data. In some embodiments, data processing module 208 can evaluate and analyze each type of real-time data separately (e.g., visual, audio or sensor). In some embodiments, data processing module 208 can evaluate and analyze multiple types of real-time data at the same time (e.g., visual and sensor data can be used to detect an onset of a heart attack).

In some embodiments, user specific information in the user input data can be separated from non-user related data based on one or more criteria, including differences between characteristics of the user and its environment. For example, data processing module 208 can identify boundaries between the user and its environment, for example, based on their differences in relative locations within the image, contrast, light, color, thermal properties, and etc. In some embodiments, image data are collected using a depth-enabled camera and the depth information is used to separate the user input data into background and foreground.

In some embodiments, data processing module 208 can perform real-time object recognition, thereby separating a user (considered as a real-life object) from its environment. In some embodiments, object recognition includes detecting different body parts of a person. In some embodiments, object recognition also includes associating certain characteristics with body parts of the person. For example, hands of a person can often associate with movements and tend to interact with other objects/people and the environment. As such, outlines of the hands are more likely to form boundaries of a person, in contrast to other body parts such as face, chest, or torso. As disclosed herein, object recognition can track user movement and facilitate gesture identification, thereby facilitating comprehensive interpretation of user input data.

In some embodiments, data processing module 208 can perform segmentation analysis. For example, segmentation can segment objects/user from the real-life environment in real-time according to one or more pre-set criteria.

In some embodiments, data processing module 208 can perform real-time data processing using pre-learned information. For example, pre-existing patterns of objects and scene can be used as starting points before further real-time learning.

In some embodiments, a comprehensive characteristic-based mechanism is used to recognize one or more differences between a particular characteristic of the user (e.g., a real-life object) and that of the environment. For example, a characteristic can include and is not limited to a visual characteristic of the user or the actual environment captured in the video clip, a real-time learned characteristic of the real life object or the actual environment, or a pre-learned feature relating to the user or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. The learning method can include linear regression, decision tree, support vector machine, K-nearest neighbors, K-means, Bayes network, logistic regression, feature point-based learning, neural network, hidden Markov chain, or combinations thereof. The learning can be supervised, partially supervised, or unsupervised.

In some embodiments, the object learning, object recognition, and segmentation functions are highly related and can take place concurrently and iteratively. In particular, the results from one of the real-time learning can affect the outcome of another. As disclosed herein, a real-time adaptive data processing process is developed to optimize analysis and understanding of the user input data.

In some embodiments, data processing module 208 can selectively identify the part of the input data that are relevant to only one or more users of interests. For example, an interactive display screen or billboard for immersive and non-intrusive content display/experience (e.g., for education or advertisement) can be placed where many people (e.g., potential users) can be present at the same time. The interactive display screen or billboard can be mounted for public display. For an effective experience, input data from only very few people may be relevant. In some embodiment, input data from only one people may be relevant.

As disclosed herein, data processing module 208 can intelligently and selectively identify the most relevant user input data according to one or more criteria. For example, through object and pattern recognition, data processing module 208 can identify and keep track of the movements of multiple users in parallel over a period of time. In some embodiments, the user with the most active movement profile will be identified as the most relevant user. Input data of the particular user will be separated from those of other people and subject to further analysis at intelligence module 210.

In some embodiments, data processing module 208 can access user activity histories stored in database 204 and the people who have appeared in front of the display screen or billboard can be selected over people who are experiencing the display screen or billboard for the first time.

In some embodiments, especially in the context of advertisement, data processing module 208 can identify and select people who are likely within the target population of a particular product and/or service that is being advertised. For example, when an interactive display screen or billboard is used for advertising a particular cosmetic line, data processing module 208 can identify and select a person as the user based on factors such as whether the person is wearing makeup and whether the person is wearing fashion-conscious clothing. For example, when a display screen or billboard is used for advertising business suits, data processing module 208 can identify and select a person who is wearing business attires over those who do not. In some embodiments, data processing module 208 can identify and select a target user based on one or more pre-set criteria. For example, when a display screen or billboard is used for interactive learning and play in elementary school and kindergarten, a system preference can be set such that data processing module 208 can identify and select only user input data from children of a certain age group based on, for example, height, facial structure, gate, and other physical characteristics.

In some embodiments, non-visual data can be used to facilitate selectively identifying relevant user input data. For example, multiple people are present before an interactive display screen or billboard and visual and audio data of these people are collected. In addition to analyzing visual data and determining whether one or more people in this group may be the relevant user, non-visual data can also be used to facilitate selection. For example, the interactive display screen or billboard is used for advertising a particular cosmetic line and among the group of people present; two people are identified as being a potential target for the cosmetic advertisement based on image data processing. When audio data are processed, one of the two people expresses strong dislike of the cosmetic product line. Based on the additional information, data processing module 208 will separate the user data of the other person from the data collected and subject them for further analysis and manipulation. For example, the person who can potentially purchase the particular cosmetic product line will be immersed into a virtual environment with subtly embedded elements in connection with the particular cosmetic product line.

In some embodiments, user device 120 comprises a real-time intelligence-based interpretation module 210. As disclosed herein, "intelligence-based interpretation module 210," "intelligence module 210," "interpretation module 210," and "module 210" can be used interchangeably. Intelligence module 210 receives initially processed input data from data processing module 208 and performs comprehensive analysis and learning of the user input data. In some embodiments, raw data are also received instead of initially processed input data. In such embodiments, data processing module 208 can be by-passed. In some embodiments, both raw data and initially processed input data are received at intelligence module 210.

In some embodiments, intelligence module 210 performs real-time information extraction from the initially processed input data and/or raw data, for example, using an information extraction sub-module. As disclosed herein, information extraction can take place based on one or more criteria comprising a user preference, a system setting, an integration parameter, a characteristic of an object or a scene of the raw data, an interactive user control, or a combination thereof. As disclosed herein, information can be extracted by contextualizing, categorizing, calculating and condensing data. In some embodiments, information extraction can also take place according to one or more criteria comprising a user preference, a system setting, an integration parameter, a characteristic of an object or a scene of the raw data, an interactive user control, or a combination thereof. Each of the criteria can be seen as a way of organizing and contextualizing raw data. In some embodiments, at least one criterion is based on Big Data.

As disclosed herein, the extracted information can be represented by information data. In some embodiments, the information data can include text, one or more codes, one or more numbers, one or more matrixes, or combinations thereof. In some embodiments, the information data can include one or more images, one or more audio signals, one or more sensor signals; or combinations thereof. Here, the images, audio signals, and sensor signals can be, and preferably are, different from those included in the raw data from which the information is extracted.

In some embodiments, real-time information extraction is triggered once data capture is initiated. In some embodiments, information extraction is achieved through organizing data. For example, when the raw data comprise multiple types of data (e.g., visual, audio or sensor data of an object or a scene), data organization can be achieved by separating the data according to its data type. In some embodiments, each type of data is further separated based on the content of the data; for example, data corresponding to an object can be organized separately from the data corresponding to a scene. For example, real-time information extraction of an object comprises identifying boundaries between the object and its environment, for example, based on their differences in relative locations within the image, contrast, light, color, thermal properties, and etc. In some embodiments, image data are collected using a depth-enabled camera and the depth information is used to separate the image data into background data and foreground data before extracting information from either. In some embodiments, extraction module 128 can extract information through real-time object recognition and data separation. For example, object recognition comprises separating a person from the environment. In some embodiments, object recognition includes detecting different body parts of a person. In some embodiments, object recognition also includes associating certain characteristics with body parts of the person, which can facilitate extraction of information relating to motion, size.

In some embodiments, intelligence module 210 (or a submodule thereof) can extract information by further organizing (e.g., separating), in real-time, the data into one or more sub-categories associated with an object and its environment based on one or more characteristics. For example, the portion of the same object that shares the same or similar visual characteristics (e.g., color, darkness level) can be organized together. In some embodiments, information extraction utilizes a comprehensive characteristic-based mechanism, including artificial intelligence based mechanisms. For example, the comprehensive characteristic-based mechanism can recognize one or more characteristics of a person, an object and the environment, and their differences. Exemplary characteristics can include and is not limited to a visual characteristic such as a spatial characteristic, a size characteristic, a shape characteristic, a motion characteristic, a color characteristic, a light illuminance and reflectance characteristic, a temporal characteristic, or a transparency characteristic, a depth characteristic, a material characteristic, or combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, raw data are organized according to a user preference or a system setting; for example, through elimination of irrelevant data or focusing on one or more types of data. In some embodiments, user preferences can be set up to specify the type of data for information extraction, irrelevant data may be removed or ignored to facilitate information extraction from the relevant data. For example, if a doctor is interested in medical data relating to a heart condition, information extraction will focus on data such as color of the face, pulse/heartbeat, breathing data, blood pressure, and etc. In another example, if the doctor is interested in information about the skin condition of the patient, information extraction can be carried out only for skin-related data.

In some embodiments, information extraction can be performed with interactive user controls. For example, in a remote diagnosis session based on the methods/systems of the current disclosure, the doctor may request a certain type of information. For example, the doctor may request a heart rate be calculated based on heartbeat data captured by one or more sensors.

In some embodiments, the system/method disclosed herein can include system settings specifying data types that are relevant to each other under a certain pre-defined context. Data of the specified data types can be selected and processed for information extraction.

By applying various analytic tools, data representing different objects and scene can be organized and put into context. For example, by comparing positional data of an object from different images obtained at different time points, it is possible to extract positional or motion information of the object. In some embodiments, it may be possible to calculate or compare relative speed when multiple objects are present in the raw data.

In some embodiments, intelligence module 210 (or a submodule thereof) can extract information from one type of data. In some embodiments, extraction module 128 extracts information from multiple types of data. For example, physical appearance of a person can be combined with body temperature reading for additional information extraction. In some embodiments, the multiple types of data can be fused prior to information extraction.

In some embodiments, information extraction process as disclosed herein can be completed in one round or in multiple rounds. In some embodiments, a round of rough information extraction can be performed first before one or more additional rounds of fine extraction are carried out. For example, rough extraction can provide information such as heart rate, while a deeper level of information extraction can lead to information of one or more complete cardiac cycles: such as that of the inflow phase, isovolumetric contraction, outflow phase and isovolumetric relaxation. A still-deeper level of information extraction would include extracting information associated with A-V valve closure, aortic valve opening, isovolumetric contraction, ejection, isovolumetric relaxation, rapid inflow, A-V valve opening. Exemplary information can include aortic pressure, atrial pressure, ventricular pressure, and ventricular volume. In some embodiments, information is extracted from electrocardiogram and phonocardiogram. As noted, the level at which information can be extracted can be limited by the analytical methods that are available, the quantity, type and quality of the raw data.

In some embodiments, intelligence module 210 (or a sub-module thereof) can extract real-time information using pre-learned information. For example, pre-existing patterns of objects and scene can be used as starting points before further real-time information learning. In some embodiments, information extraction can take place multiple times on different devices. For example, an initial information extraction can take place on a local device which limited computing power. The initial information extraction can be crude and limited in depth. The extracted information and raw data can be transferred to another computer device with more computing power and better access to a more comprehensive database (e.g., including Big Data) where further information extraction takes place. In some embodiments, information extraction can be performed based on machine learning and pattern recognition methods; e.g., deep learning, neural network, feature point based approaches, principal component analysis (PCA), linear discriminant analysis (LDA), etc.

In some embodiments, intelligence module 210 can include an information learning sub-module, which can learn or derive knowledge based on analysis of information that has been extracted from raw data.

In some embodiments, knowledge is learned by understanding and contextualizing information. In some embodiments, such contextualizing can be achieved by organizing relevant information into categories. This added level of organization can aid understanding of data. For example, in the example where a patient has high risk of an impending heart attack, the doctor can learn this knowledge by organizing the relevant information together. For example, the patient showed alarming signs such as a flushed face, fast heart rate, very high blood pressure, fast and short breath, slow movement, and etc.

Like information extraction, knowledge learning can also take place according to one or more criteria comprising a user preference, a system setting, an integration parameter, a characteristic of an object or a scene of the raw data, an interactive user control, or a combination thereof. For example, a method/system specifically designed for medical diagnosis can have one or more pre-determined categories for each disease that can be possibly identified based on non-invasive data such as visual data, audio data, and sensor data. For example, a category for heart disease would inform the method/system to focus on certain types of information such as face color, breathing pattern, heart rate, blood pressure values, and etc. In some embodiments, the method/system also provides reference standards against which the obtained information will be compared and results from the comparison can lead to learned knowledge. In some embodiments, at least one criterion is based on Big Data.

As disclosed herein, the learned knowledge can be represented by knowledge data. In some embodiments, the knowledge data can include text, one or more codes, one or more numbers, one or more matrixes, or combinations thereof. In some embodiments, the knowledge data can include one or more images, one or more audio signals, one or more sensor signals; or combinations thereof. Here, the images, audio signals, and sensor signals can be, and preferably are, different from those included in the raw data from which the knowledge is indirectly derived.

In some embodiments, knowledge learning comprises organizing (e.g., separating), in real-time, available information into one or more sub-categories associated with an object and its environment based on one or more characteristics. For example, information reflecting visual characteristics of an object can be organized into one category. In some embodiments, knowledge learning utilizes a comprehensive characteristic-based mechanism, in addition to using, for example, artificial intelligence based mechanisms to facilitate learning. For example, the comprehensive characteristic-based mechanism can recognize one or more characteristics of a person, an object and the environment, and their differences. Exemplary characteristics can include and is not limited to a visual characteristic such as a spatial characteristic, a size characteristic, a shape characteristic, a motion characteristic, a color characteristic, a light illuminance and reflectance characteristic, a temporal characteristic, or a transparency characteristic, a depth characteristic, a material characteristic, or combinations thereof. In some embodiments, the spatial characteristic comprises a three-dimensional spatial characteristic. In some embodiments, the characteristic can be a real-time learned characteristic including but not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof.

In some embodiments, knowledge learning can be performed with interactive user controls. For example, in a remote diagnosis session based on the methods/systems of the current disclosure, the doctor may request the system to look into the possibility whether a person has a certain type of disease or condition. In some embodiments, upon receiving such user directions, the system can group together relevant information that may be helpful for diagnosing the particular disease or condition.

In some embodiments, knowledge is derived from one type of information. In some embodiments, knowledge can be derived from multiple types of information. Most medical diagnoses take place at the knowledge level. Using the same example above, additional information, such as the maximum value of the fever, duration of the fever, exposure to heat and germs, or hydration state can lead to different diagnoses and varied treatments.

In some embodiments, information extraction can be performed based on machine learning and pattern recognition methods; e.g., deep learning, neural network, feature point based approaches, principal component analysis (PCA), linear discriminant analysis (LDA), etc.

In some embodiments, user device 220 comprises an error compensation module. For example, 3D camera may not provide accurate in depth information about dark colored objects. The error compensation module can compensate such depth errors based on object characteristics or region continuity. In some embodiments, 3D camera may not provide accurate in depth information about fast moving objects. The error compensation module can compensate such depth error of moving objects based on object characteristics, region continuity, or object moving characteristics. In some embodiments, the infrared camera may not provide accurate data for a bright reflectance object. The error compensation module can compensate the infrared-related errors about the bright reflectance object based on object characteristics or region continuity. In some embodiments, error-compensated images can be used as references for further real-time object learning. In some embodiments, results from data processing module 208 can also be used for error compensation. In some embodiments, the error compensation module can perform adjustment and optimization for any hardware and/or software component, including, for example, adjusting settings of a camera in response to changes in lighting conditions.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. The learning method can include linear regression, decision tree, support vector machine, K-nearest neighbors, K-means, Bayes network, logistic regression, feature point-based learning, neural network, hidden Markov chain, or combinations thereof. The learning can be supervised, partially supervised, or unsupervised.

The functionalities of data capturing module 206, data processing module 208, real-time learning module 210, and the error compensation module share many similarities and, in some embodiments, two or more of these modules can be combined.

In some embodiments, deep structure learning with multiple hidden layers can be used. The deep learning can be supervised, partially supervised, or unsupervised. Exemplary deep structure learning methods can include but are not limited to deep neural networks, deep belief networks, recurrent neural networks, hybrid of these deep structures, and hybrid of the deep structures with other pattern recognition methods. Due to its deep structure and highly non-linear characteristics, sometimes it is challenging to interpret what was learned, what characteristics are more prominent, how the learned characteristics would reflect the physical characteristics of an object. Here, learned parameters from the deep learning are also referred to as object characteristics.

An extraction or learning process as disclosed herein can be completed in one round or in multiple rounds. In some embodiments, a round of rough extraction is performed first before carrying out one or more additional rounds of fine extraction. For example, rough extraction can trace an outline of the real life object while fine extraction can refine the edges separating the real life object and its actual environment. In some embodiments, one or more rounds of fine extraction can also identify a region within the outline of the real life object that is, in fact, part of the environment, and subsequently remove the region from the real life object.

In some embodiments, user device 220 comprises an interactive control module 212. As disclosed herein, interactive control module 170 can receive instructions from any number of the other functional modules such as data processing module 206, intelligence module 210, communication module 118, and more. Interactive control module 170 identifies one or more actions to be taken, which can then be executed by a processor via user I/O module 202. For example, a user can modify or change a previously entered gesture command by entering a new gesture. A user can also change the content of the real-time AR data via interactive control module 212. For example, during a real-time AR-based communication session, a user can choose a different virtual reality environment. Also, a user can change at least a portion of the real-time AR data through interactive control from within the real-time AR data.

In some embodiments, exemplary system 200 further comprises user device 240. In some embodiments, user device 240 can have the same functional modules as user device 220; e.g., user input and output module 222, local database 224, data capturing module 226, data processing module 228, intelligence based interpretation module 230, and more. When a functional module is present, it can be implemented similarly as in user device 220 or according to any applicable known technology.

In some embodiments, user device 240 can have fewer functional modules and instead relies on a server 250 to provide one or more functionalities. As illustrated in FIG. 1A, other than the data capturing module, all other key functional modules, including data capturing module 226, data processing module 228, intelligence based interpretation module 230, and more can be optional to user device 240. Effectively, these functionalities can be split between user device 240 and server 250 in any combination. For example, user device 240 can transmit captured images to server 170 for data processing (e.g., object extraction) and intelligent interpretation. Although not depicted, it would be understood that any known input/output device or component, such as those disclosed in connection with computer device 102, user device 220 and user device 240, can be used by server 250.

In some embodiments, exemplary system 200 further comprises a server 250. As disclosed herein, server 250 can communicate with one or more user devices and include functional modules such as server database 254, data processing module 258, intelligence based interpretation module 260, interactive control module 262, and more. In some embodiments, data processing module 258, intelligence based interpretation module 260, interactive control module 262, are similar to those disclosed herein in connection with user device 220 or user device 240. In some embodiments, these modules may perform differently on server 250 due to the server's enhanced computing power and storage space in comparison to a user device. For example, integration can take place in parallel in a higher number of pixels than a user device would allow.

The methods/systems disclosed herein are advantageous in many aspects. In some embodiments, comprehensive iterative and interactive interpretation/analysis of the user input data allows more accuracy understanding of the user's intent and thus can help better execute the intent. For example, the comprehensive iterative and interactive interpretation/analysis of the user input data can search and retrieve more accurate and relevant results. The searches can be conducted at any level in many different contexts. For example, they can be searches for content or information on the local device itself. Alternative, the searches can be executed on a remote device or a remote server via network connection; for example, a web-based search. Additional details can be found in U.S. patent application Ser. No. 15/367,124 filed on Dec. 1, 2016 and entitled "Methods and Systems for Personalized, Interactive and Intelligent Searches;" which is hereby incorporated by reference in its entirety.

Figure 5A:
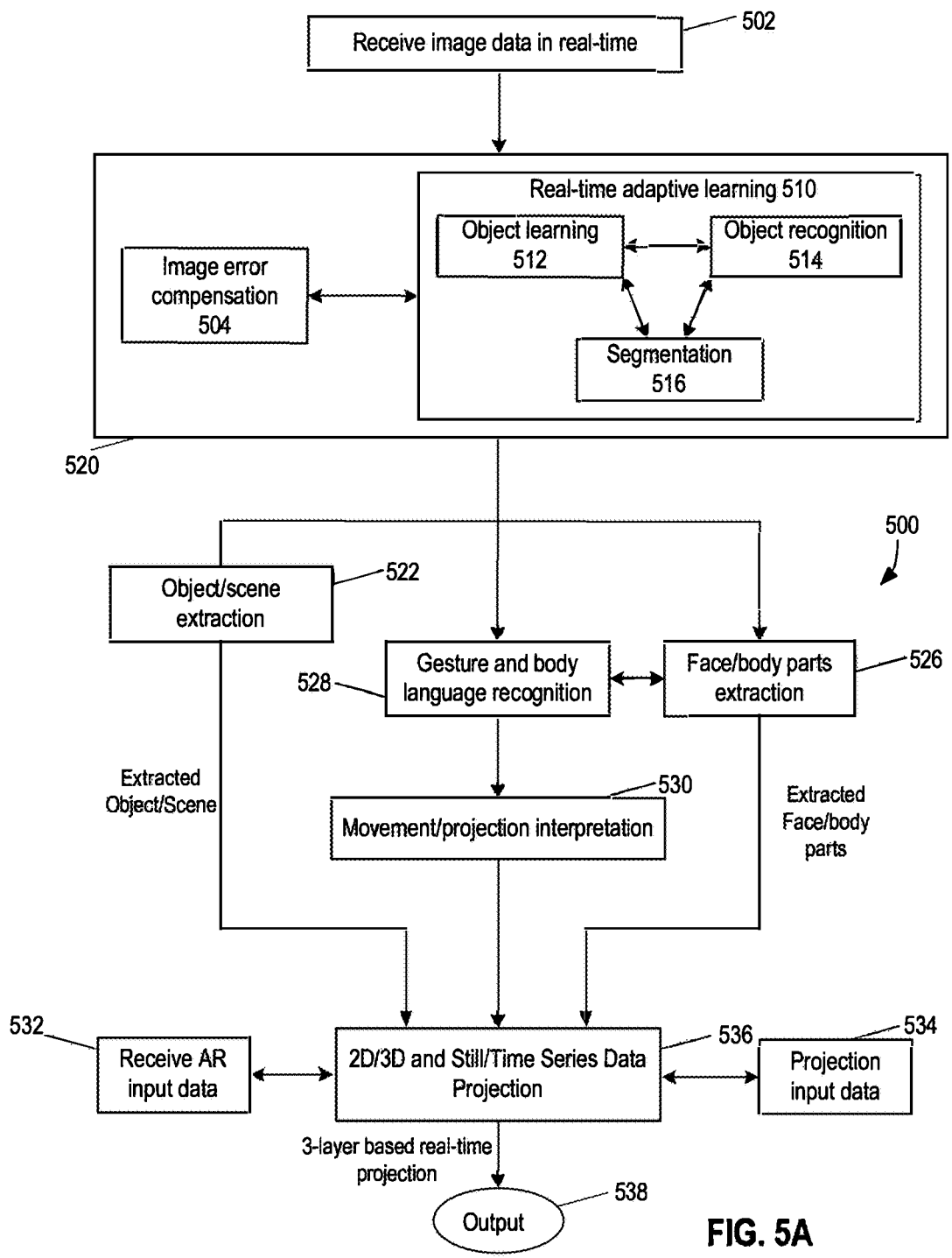
FIG. 5A depicts a sample process for real-time adaptive and intelligent learning.
Figure 5B:
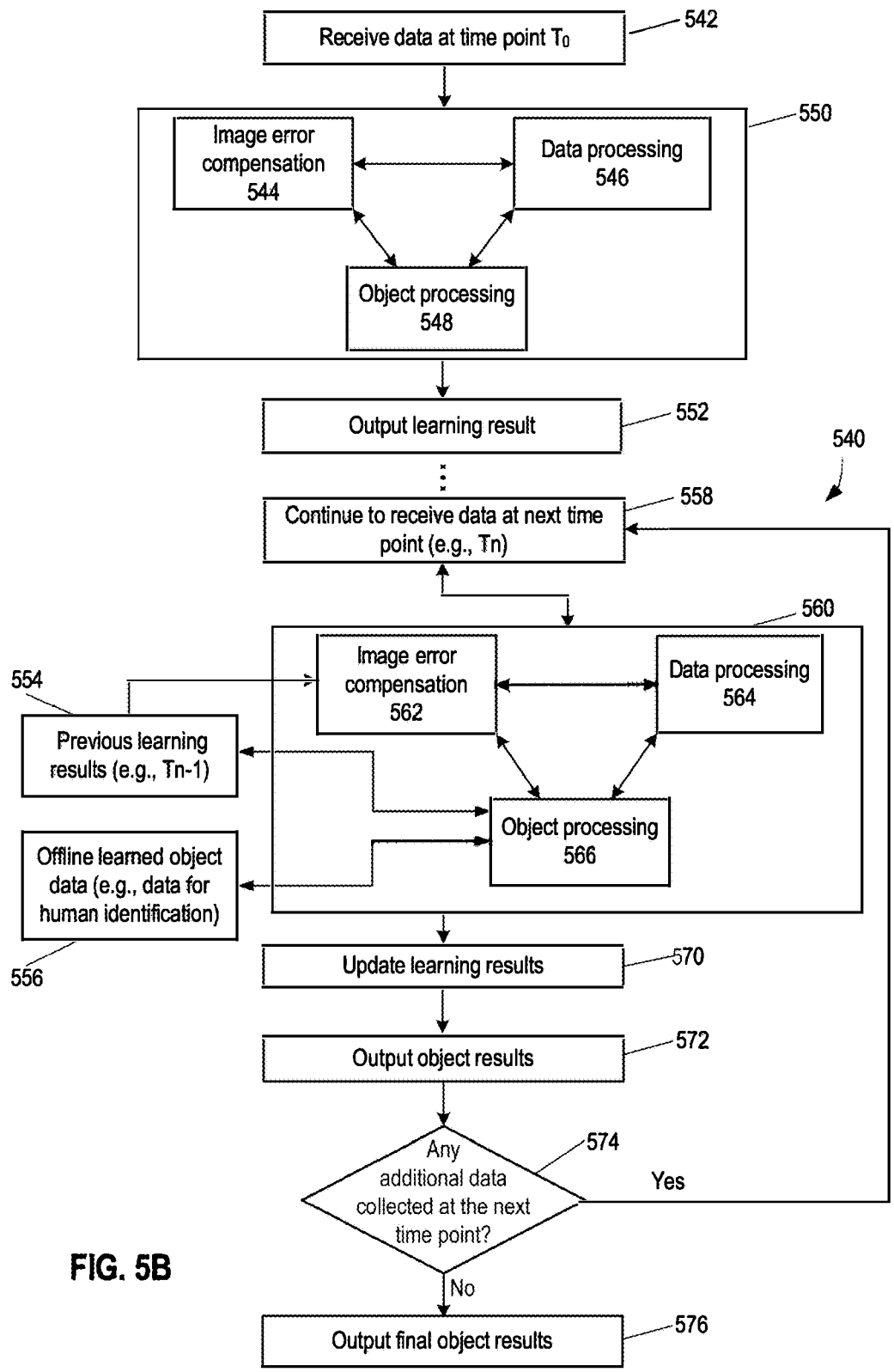
FIG. 5B depicts a sample process for real-time adaptive and intelligent learning.
Figure 5C:
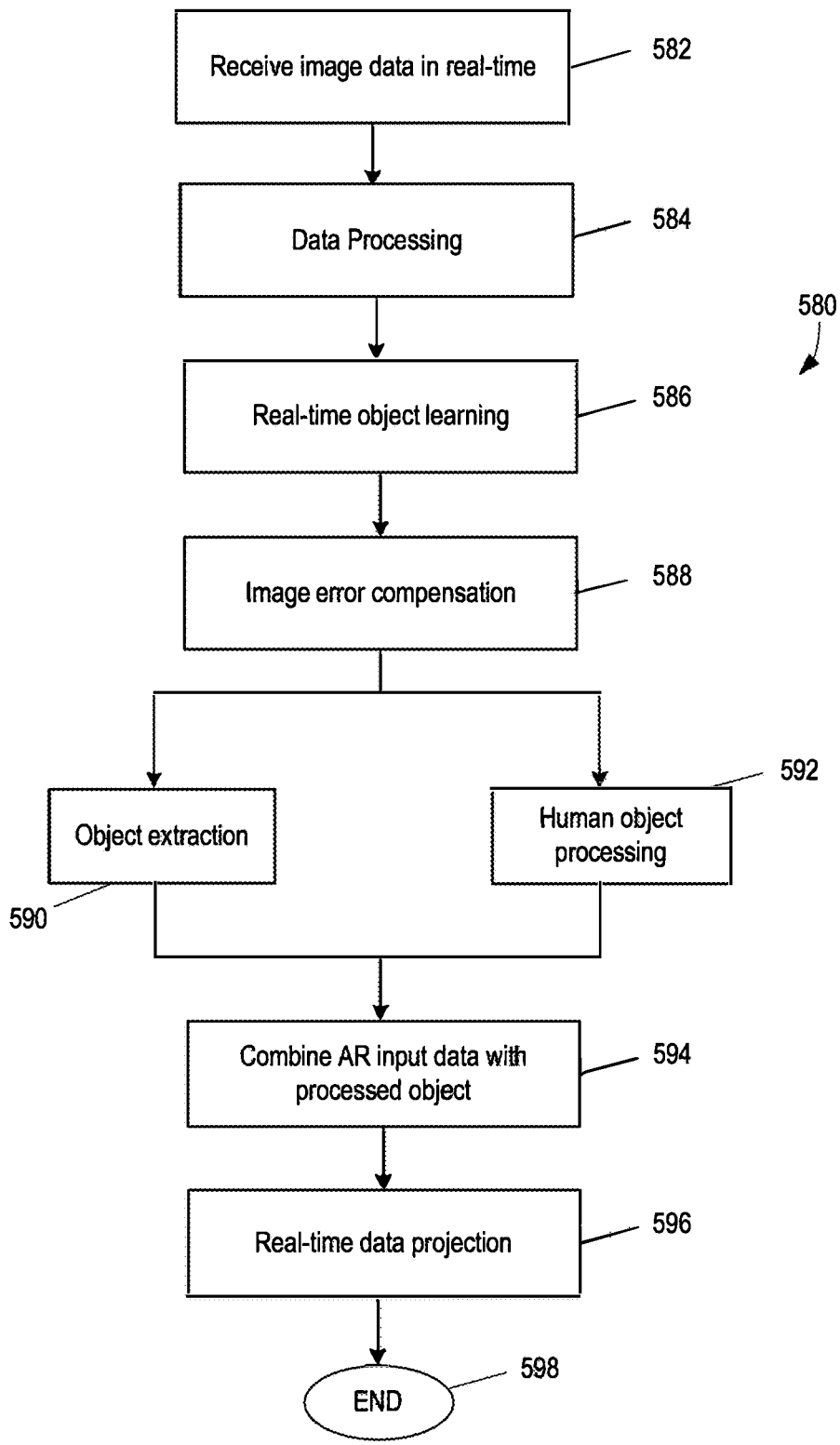
FIG. 5C depicts a sample process for real-time adaptive and intelligent learning and processing.

Additional details of comprehensive, iterative, and intelligent interpretation and analysis of input data (e.g., real-time image data for subsequent real-time augmentation) can be found in the description of FIGS. 5A through 5C and in U.S. patent application Ser. No. 15/665,295 filed on Jul. 31, 2017 and entitled "Methods and Systems for Photorealistic Human Holographic Augmented Reality Communication with Interactive Control in Real-Time;" which is hereby incorporated by reference in its entirety.

In some embodiments, comprehensive iterative and interactive interpretation/analysis of the user input data allows interactive and dynamic control at the local device. In some embodiments, method/system as disclosed herein can be embedded in an interactive display billboards for immersive and non-intrusive content display/experience (e.g., for education or advertisement), which can be implemented in the stand-alone user device 220.

Figure 2B:
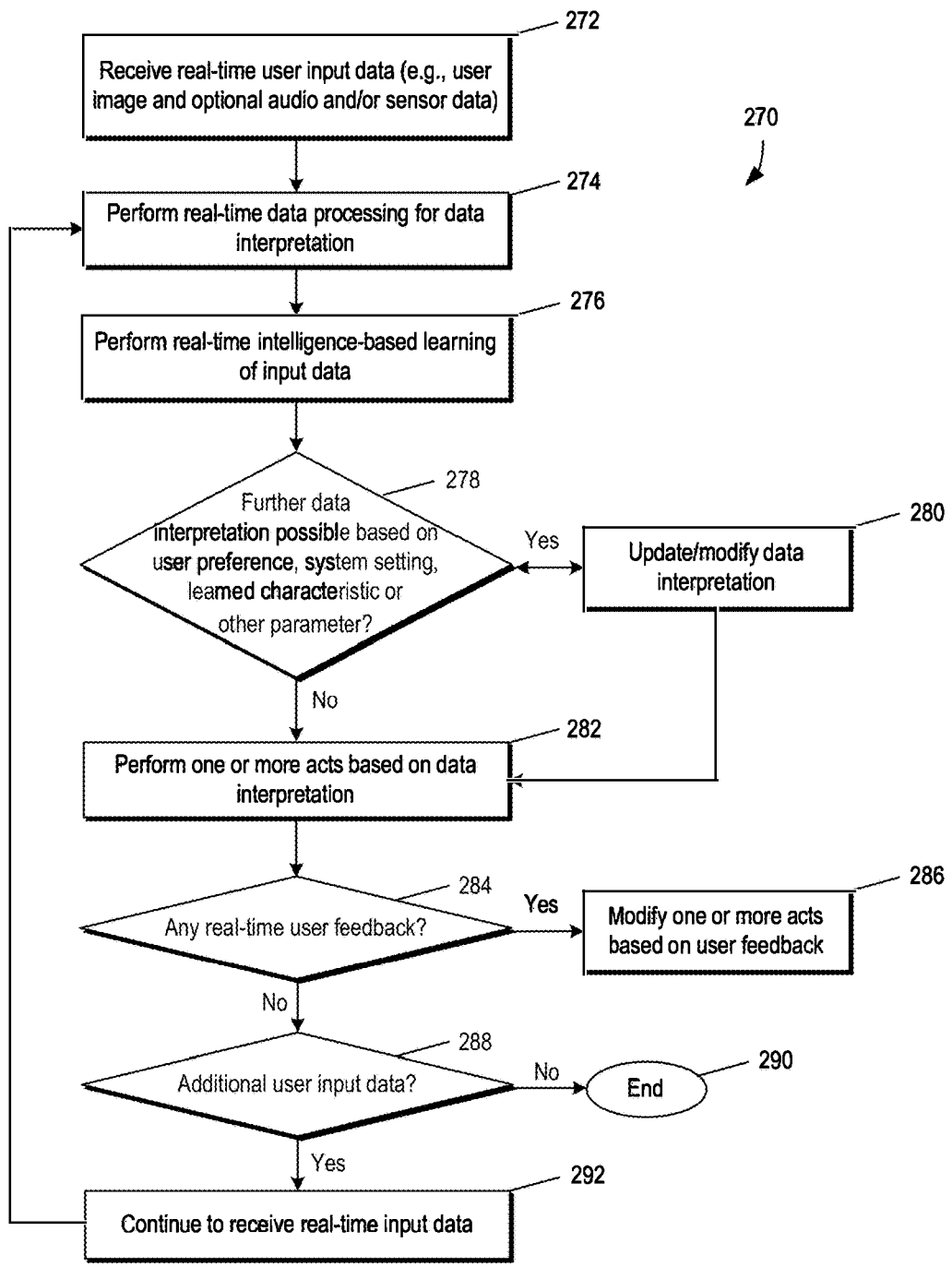
FIG. 2B depicts an example process for intelligent, comprehensive, interactive and real-time input data processing.

FIG. 2B depicts an exemplary process 270 for performing real-time intelligent and comprehensive interpretation of input data.

At step 272, real-time user input data are collected by a data capturing module using one or more data collection components such as a camera, a microphone, and one or more sensors. Any suitable data capturing devices and/or components can be used, including but not limited those described in connection with input data module 112 of FIG. 1A; data capture module 120 of FIG. 1B; and data capturing modules 206 and 226 of FIG. 2A.

User input data collected at this step can include visual data (such as images and videos). In some embodiments, audio data and/or sensor data can be included as well.

At step 274, the collected user data are processed, for example, by a data processing module, for initial data interpretation. As disclosed herein, data processing can include data selection (e.g., eliminating input data relating people or objects that are not relevant); data separation (e.g., separating data representing a user of interest from those of the surrounding and irrelevant objects); data organization (e.g., data of the same type can organized together); combining data (e.g., non-visual data that are associated with selected visual data can be associated with each other for further analysis); and etc.

Any suitable methods and mechanism can be applied; including but not limited to, those described in connection with data processing module 130 of FIG. 1B; data processing module 208; data processing module 228; data processing module 258 of FIG. 2A.

At step 276, real-time intelligence-based learning and interpretation of the input data is performed. As disclosed herein, information with regarding to a user or object of interest can be extracted from the data processed at step 276. Further, extracted information can be used as basis for learning knowledge concerning the user or object of interest.

Information and/or knowledge concerning the user or object of interest can be applied to relevant input data for further interpretation of user input data. For example, user movements, facial expressions, hand gestures can be analyzed to extract meaning at the information and knowledge levels, which are then used to further interpret user input. For example, happy and angry emotions can both lead to excited bodily movements. However, when expression, language and context information are considered comprehensively (sometimes with other data/information/knowledge), a more accurate interpretation can be obtained of the excited user movements observed in user input data.

At step 278, additional criteria can be used to further optimize data interpretation. Such criteria include but not limited to a user preference, a system setting, a learned characteristic of the user or its environment, and any other parameters. For example, a user preference can be set such that processing and analysis would favor the most frequent user of the intelligent AR-cloud platform. In some embodiments, specific data/information/knowledge of the particular user can be used to optimize interpretation of user input. For example, when it is known that the particular user has severe cardiac conditions, interpretation of the excited user movements may change to a different direction because a medical emergency now becomes a possible interpretation.

In some embodiments, multiple types of input data are used during optimization. For example, if sensor data indicates the particular user has fast and erratic heartbeat, the medical emergency becomes a more likely possibility.

At step 280, interpretation of user input data can be updated and/or modified based on additional analysis at step 278.

At step 282, the system can automatically prompt questions to the user concerning the user's health conditions. If a medical emergency is confirmed, the system may automatically contact emergence response team and cause the user to be sent to a medical facility.

At step 284, real-time user feedback can be used to further update or modify the interpretation. If the user confirms a certain fact, the system can cause addition or alternative acts to be performed. For example, a user can choose to confirm good health and decline to request medical assistance.

In some embodiments, when no real-time user feedback is provided, the system continues to receive additional user input data at step 288. For example, when user input is for conducting a search for certain content, either on a local user device or via network connection from remote databases, no user feedback may be considered acceptance of the search results. The system can move on to receive any new user input data.

At step 290, the process completes when no additional user input data are received.

At step 292, additional user input data are received and the process can return to step 274 to restart a new input data analysis and interpretation process.

Exemplary Embodiment: Real-Time Integration of AR-Related Elements Based on Content-Matching In one aspect, disclosed herein are methods and systems for augmenting selected input data by integrating the input data with AR-related input data containing virtual reality elements. As disclosed herein, AR-related input data can be broadly refer to any data/information/knowledge that are used to augment the selected input data (e.g., the selected input data can be extracted from raw user input data based on intelligent learning and analysis). In some embodiments, "AR-related input data" and "virtual reality elements" can be used interchangeably.

In some embodiments, AR-related data are the virtual reality elements. In some embodiments, AR-related data including additional data/information/knowledge concerning the virtual reality elements and their relations with the selected input data before they are integrated. For example, augmentation can take place using different types of virtual reality elements that include but are not limited to, for example, unrealistic or fantastical elements that do not exist (e.g., fictitious elements), modified realistic elements (e.g., a distorted version of the actual environment where a user is located), and unmodified actual realistic elements (e.g., replacing a background of a hotel room with a photo or video of the streets of Paris-both are real but out of realistic context). In some embodiments, the virtual reality elements can include advertisement data elements. In some embodiments, the virtual reality elements can include other external data that are not part of the input data (e.g., an external music file or a real-time audio or text translation of the actually collected audio data).

Figure 3A:
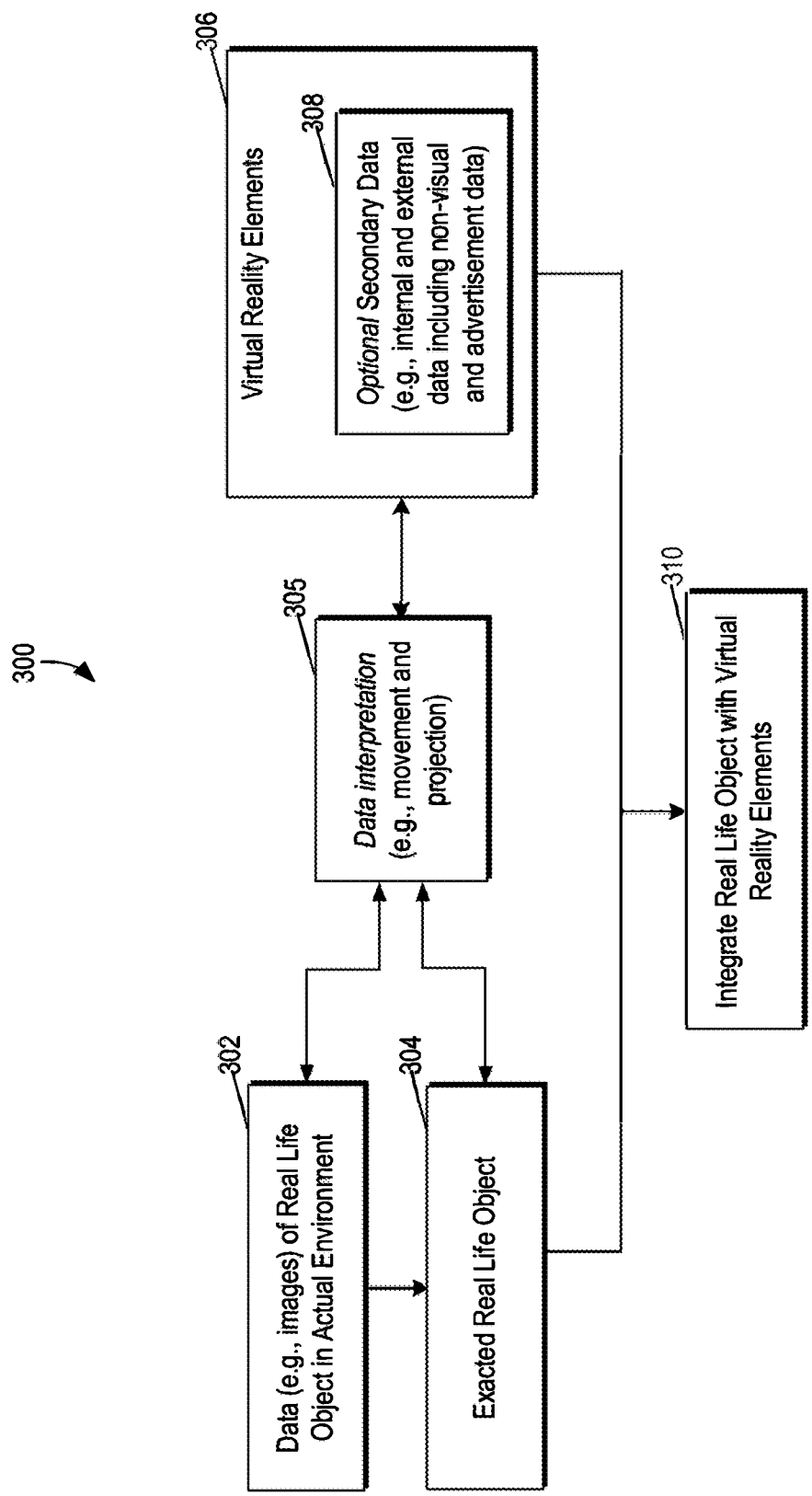
FIG. 3A depicts a sample system for creating AR-based data based on real-time input data and virtual reality elements.

FIG. 3A illustrates elements that are present in an exemplary AR-based real-time image and signal processing system 300. Data such as images of a real life object (e.g., a user of an embodiment of the current method/system) are captured while the real life object is physically located in an actual environment (e.g., block 302). The captured images are then processed in real-time to extract image information of the real life object (e.g., block 304). Virtual reality elements such as a virtual environment (e.g., block 306) can be constructed previously or concurrently while the real life object is being extracted. The extracted real life object is then integrated with the selected virtual environment. Advertisement elements and additional data (e.g., block 308) can be included as a part of the virtual reality elements in system 300. The entire process can take place in real-time while images of the real life object are being captured, although in some embodiments, certain virtual environment elements can be constructed before-hand.

As disclosed herein, the terms "data" and "signals" cam be used interchangeably. For example, they can include image, audio, video, text, spatial, geographical, or any other information associated with the real life object. They also include metadata or other embedded information that reflect a state of the real life object. They can further include data that are indirectly associated with the real life object, for example, information such as images or videos that reflect the geolocation of the real life object. As disclosed herein, "signals" and "data" can include internal and/or external data. Here, internal data refer to those collected during the real-time capture of the real life object in its actual environment, including visual, audio and other types of information. External data refer to content beyond those collected in real-time, including but not limited to data already stored on a local user device, data from another user device (accessible via network connection), data stored on a server (e.g., including advertisement elements stored on an advertisement provisioning server), or data retrieved in real-time using network collection. Most examples disclosed herein refer to images, which, however, should not in any way limit the scope of the invention.

As disclosed herein "secondary data" are data or signals in other than those reflecting the real life object itself. Secondary signals can also include internal or external data. In some embodiments, secondary signals include non-visual signals such as audio sound track or external music files. In some embodiments, secondary signals include advertisement elements that can be incorporated with the extracted real life object, the virtual environment, or the final integrated images or videos.

At block 302, data (e.g., images or audio signals) of a real life object (e.g., a user operating the current system/method) is being captured, using, for example, a user device with an image/audio capturing device such as a camera. In some embodiments, the camera is an integral part of the user device. In some embodiments, the camera is an external hardware component that can be connected to the user device. In some embodiments, the user device is a network-enabled camera. Preferably, the camera is a depth camera. In some embodiment, the image/audio capturing device includes a set of cameras. In some embodiments, the user device should be equipped with a CPU/GPU processor, a camera, a mic phone, a display, a speaker, one or more sensors, a communication unit, and storage. It includes but is not limited to a desktop computer, a laptop computer, a smartphone device, a personal digital assistant, a network-enabled camera, a tablet, an AR glass, an AR hamlet, a VR glass, a smart TV, and etc. The camera can be a 3D camera, a regular RGB camera, an IR camera, a multiple spectrum camera, a hyperspectral camera, a 360 degree camera etc.

In some embodiments, the real life object is a person such as the user operating the current system/method. In some embodiments, the real life object is an animal or an object. In some embodiments, a plurality of images is taken of the real life object. In some embodiments, the images are taken continuously and form a video. In all embodiments, the computer device for capturing image of the real life object is accessible to the real life object or a user of the computer device.

As disclosed herein, the real life object can be in any environment when images are being captured. There are no special requirements for the environment for image capturing. For example, a background screen of a uniform or near uniform color is not needed. In most embodiments, images of the real life object are capture as is when the real life object is in its actual physical environment. In some embodiments, images of the real life object are taken while the real life object is carrying out regular activities.

At block 304, while images are being captured, image information of the real life object is extracted. In some embodiments, extraction is performed by separating the real life object from its actual environment, based on one or more differences in a characteristic between the real life object and the actual environment. In some embodiments, the characteristic can be a visual characteristic, including but not limited to a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

In some embodiments, the visual characteristic comprises a three-dimensional spatial characteristic.

In some embodiments, the characteristic can be a real-time learned or a pre-learned feature relating to the real life object or the actual environment. A real-time learned or pre-learned characteristic includes but is not limited to, for example, color, shape, edge, light reflectance, light illuminance, motion, depth, material, contrast, or combinations thereof.

In some embodiments, extraction of the real life object is done on an image-by-image basis. This also applies to video extraction, which is done on a frame-by-frame basis. In some embodiments, multiple images are processed in parallel at the same time.

At block 306, virtual reality elements such as a virtual environment can be provided. In some embodiments, the virtual environment can be constructed prior to image extraction or even image capture. In some embodiments, the virtual environment can be constructed concurrently as image extract or image capture.

In some embodiments, the virtual environment is different from the actual environment. In some embodiments, the virtual environment is a modified version of the actual environment. In some embodiments, images for constructing the virtual environment can be modified image characteristics including but not limited size, shape, image quality, color, perspective, light, visual effect, or combinations thereof.

In some embodiments, the virtual environment can be the same as the actual environment, but one or more characteristics can be changed. For example, the actual environment can be processed to enhance certain elements to render a virtual environment. Additionally, the actual environment can be modified to enhance the image quality to render a virtual environment. In some embodiments, one or more elements of the actual environment are altered in visual characteristics such as color, shape, size, light and etc.

In some embodiments, the virtual environment can be the same as the actual environment, but its relations with the real life object are altered. In some embodiments, the real life object becomes much smaller or much larger in scale relative to its environment, as in the movie Alice in Wonderland. For example, a person who is drinking tea in the captured images can be shown within a tea cup in the final integrated image while the other elements of the environment remain unchanged.

In some embodiments, a server can provide collections virtual environment to a user. The virtual environment can be divided into different categories based on the themes present therein. Exemplary themes include but are not limited to nature, animals, space, movie, architecture, culture, travel, and etc. A user's selection for particular types of themes can be stored in user preference.

In some embodiments, the virtual environment comprises an image. In some embodiments, the virtual environment comprises a video. In some embodiments, multiple virtual environments can be included, each treated as a separate element during image or video integration.

At block 308, advertisement elements and/or other secondary data can be provided as a sub-category of the virtual reality elements. In some embodiments, the advertisement elements are the only virtual reality elements present. In some embodiments, the advertisement elements are integrated with other virtual reality elements such as a virtual environment. The advertisement elements and/or other secondary data can both include internal or external data. Internal data refer to data captured in at block 302. External data can be pre-stored on the local device or on a server. Exemplary form of advertisement elements and/or other secondary data include but are not limited to image, audio, video, text, spatial, geographical, or any other type of information. In most embodiments, advertisement elements are provided by a server. In some embodiments, advertisement material can be pre-created. In some embodiments, advertisement material is created in real-time at a user's request.

In some embodiments, advertisement elements and/or other secondary data include non-visual signals such as audio signals, for example, sound information collected when capturing the image information of the real life object. In some embodiments, the audio signals include internal or existing audio signals or external audio signals. In some embodiments, internal or existing audio signals are obtained from the captured images or videos and subject to further processing (e.g., voice recognition and subsequent language translation). In some embodiments, audio signals of a video can be processed for enhanced sound effects. For example, ambient noises can be removed to enhance the voice of a real life object (e.g., a speaker during a conference call). In some embodiments, special sound effects can be added to a desirable voice. For example, a voice can be rendered to have three-dimensional hollow effects to mimic sounds in an echoing environment.

In some embodiments, advertisement elements can be associated with a product or a service. In some embodiments, the advertisement elements include internal or existing audio signals or external audio signals. In some embodiments, the advertisement elements can be associated with the real life object (e.g., element 322 or 304). For example, the real life object can wear or hold a product comprising the advertisement elements. In some embodiments, the advertisement elements are added to virtual environment 306. For example, the advertisement elements can be displayed as part of the virtual environment. In some embodiments, the advertisement elements can be implemented integrated images or videos. For example, the advertisement elements can be treated as another virtual environment, in addition to the existing virtual environment, during integration. In some environments, the advertisement elements can be added post-integration; for example, at the time when a user views the integrated image or video.

In some embodiments, advertisement elements are provided based on user preferences that are stored either locally on a user device or on a server (e.g., as part of a user profile). In some embodiments, user preferences are determined by user shopping histories. In some embodiments, a user may specifically request a product, a service, a type of product, or a type of service. In some embodiments, general user information such as age and gender may be used as reference. In some embodiments, generally available trending information may be used.

Additionally and advantageously, advertisement elements are provided based on context information. Context information includes but is not limited to communication context, advertisement content context, presentation context and etc. For example, if advertisement is presented during a conference meeting at a company, advertisements may include content of products and services relating to the specific industry of the company. When an advertisement is to be presented as online ads embedded in a public forum such as a web site or web page, the content of the web site and/or web page can be taken into consideration. No advertisement will be provided if the content on such web site and/or web page is deemed inappropriate. Content that is inappropriate includes but is not limited to religious fanaticism, terrorism, pornography and etc. The criteria can be set by the server providing the advertisement content. In some embodiments, an advertiser may set criteria for content that it does not want to be associated with.

In some embodiments, when multiple advertisers can provide the same or similar suitable content, a bidding process may be implemented to select the advertisement content.

In some embodiments, external audio signals can be added to existing audio signals. For example, a user can choose to play background music during a video conference call. In some embodiments, external audio signals are used to replace existing audio signals (e.g., audio signals collected while capturing images of the real life object). Such audio signals (external or internal) can be associated with any elements in the system (e.g., block 302, 304, 306 and 310). In some embodiments, the audio signals are associated with virtual environment. In some embodiments, the audio signals can be added to integrated images.

At block 310, the extracted real life object and the virtual environment are integrated or combined to render images or videos of a real life object within the virtual environment. To achieve integration, relations between the extracted real life object and the virtual environment will be defined. In some embodiments, the relations are defined concurrently as image extraction and/or virtual environment construction. In some embodiments, the relations are defined once image information of the real life object is extracted and the virtual environment is constructed.

In some embodiments, the system or user provides a general pre-defined guideline to the relations. In some embodiments, the relations are entirely defined automatically by the system based on information from the extracted real life object and the virtual environment. In some embodiments, a user can provide real-time adjustment to re-define or modify the relations between the extracted real life object and the virtual environment during the integration process.

In some embodiments, relations between the extracted real life object and the virtual environment include depth relation. For example, the extracted real life object can be partially or entirely "in front of" or "behind" an element of the virtual environment. In some embodiments, the extracted real life object can be partially or entirely "in front of" one element but partially or entirely "behind" another element of the same virtual environment. In some embodiments, the depth relations between all or a portion of the extracted real life object changes temporally with time progression between different images. In some embodiments, the depth relations between all or a portion of the extracted real life object changes spatially over different elements in the same image.

In some embodiments, relations between the extracted real life object and the virtual environment include a transparency relation. For example, the extracted real life object can be partially or entirely transparent relative to an element of the virtual environment. In some embodiments, the transparency relations between all or a portion of the extracted real life object changes temporally with time progression between different images. In some embodiments, the transparency relations between all or a portion of the extracted real life object changes spatially over different elements in the same image.

Figure 3B:
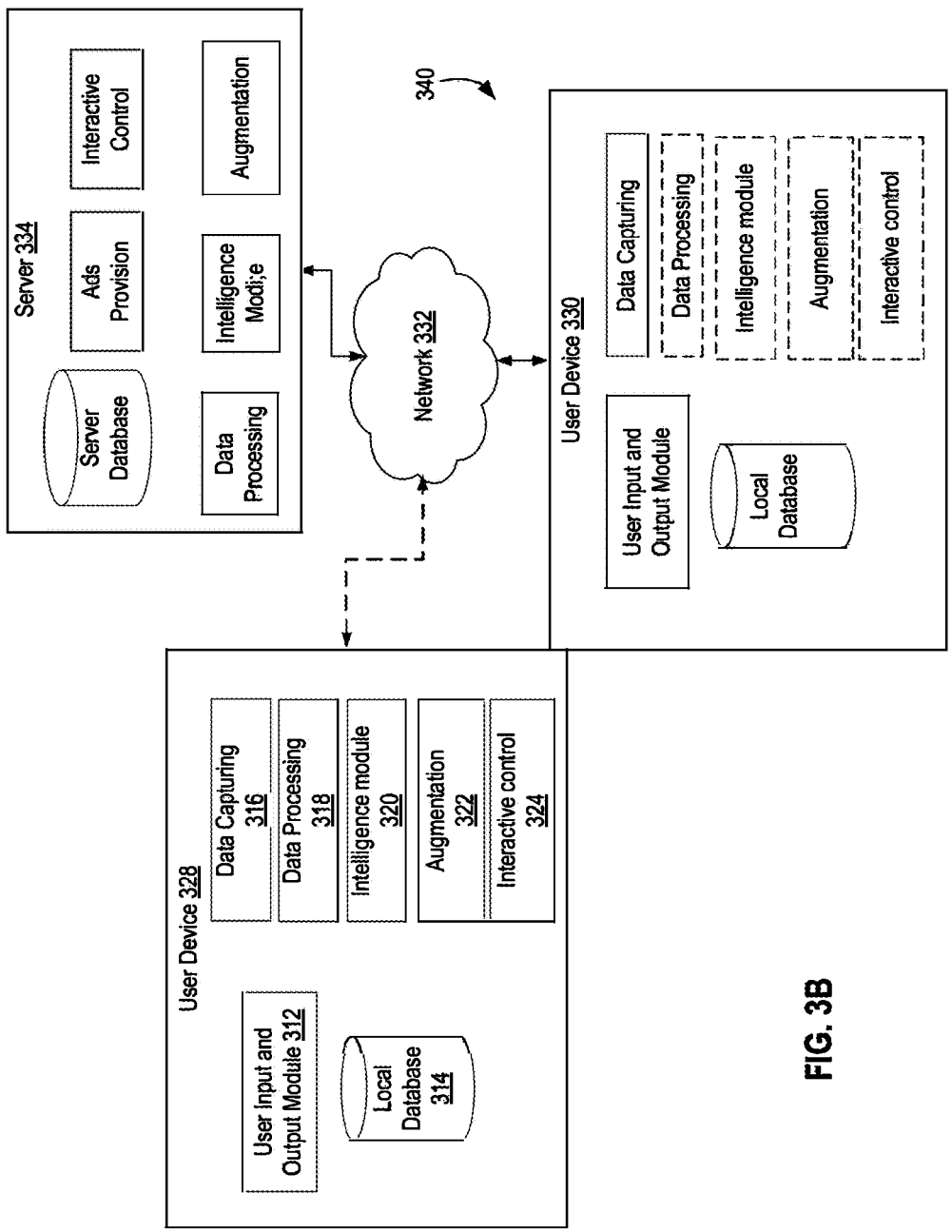
FIG. 3B depicts a sample system for creating AR-based data based on real-time input data and virtual reality elements.

FIG. 3B illustrates an exemplary system 340 for carrying out the functionalities disclosed herein. Here multiple user devices (e.g., 328 and 330) are connected to a server device 334 via network 332.

In some embodiments, system 340 includes user I/O module 312, local database 314, data capturing module 316, data processing module 318, intelligence module 320, augmentation module 322, and interactive control module 324. As disclosed herein, the functionalities of these modules (e.g., those of I/O module 312, local database 314, data capturing module 316, data processing module 318, intelligence module 320, augmentation module 322, and interactive control module 324) can be the same or similar to corresponding functional modules associated with computer device 102 (of FIG. 1B), user device 220, user device 240 and server 250 (each of FIG. 2A). The inter-relations described between user devices 220, 240 and server 250, and any variations thereof, can also be applied to user devices 328, 330 and server 334. It will be understood that alternatives and variations can be made so long as the intended purpose of a functional module thereof can be achieved.

The unique functionalities of system 300 can be exemplified by certain aspects of intelligence module 320, augmentation module 322 and interactive control module 322, which is in the embodiment shown in FIG. 3B.

In addition to various features associated with intelligent interpretation of input data, intelligence module 320 can facilitate augmentation of selected input data with virtual reality elements. As disclosed herein, in some embodiments, intelligence module 320 can perform additional intelligent interpretation of virtual reality elements. For example, information and/or knowledge can be extracted or learned from the virtual reality elements, and used in combination with information and/or knowledge associated with the selected input data. In some embodiments, intelligence module 320 can process user input data and virtual reality elements in parallel or sequentially. In some embodiments, information and/or knowledge associated with virtual reality elements can be obtained either in advance or in real-time. In some embodiments, information and/or knowledge associated with the selected user input data can affect the choice of virtual reality elements. In some embodiments, information and/or knowledge can be extracted or learned from the selected input data and virtual reality elements in combination simultaneously.

Additional details of comprehensive, iterative, and intelligent learning of input data (e.g., real-time image data for subsequent real-time augmentation) can be found in the description of FIGS. 5A through 5C and in U.S. patent application Ser. No. 15/665,295 filed on Jul. 31, 2017 and entitled "Methods and Systems for Photorealistic Human Holographic Augmented Reality Communication with Interactive Control in Real-Time;" which is hereby incorporated by reference in its entirety.

In some embodiments, augmentation module 322 can select AR-related input data (e.g., virtual reality elements) information and/or knowledge from intelligence module 320. For example, the information and knowledge can be used for content matching between the selected input data and virtual reality elements. Exemplary embodiments of content selection and content matching are illustrated in FIGS. 3C and 3D.

In some embodiments, augmentation module 322 can define inter-relations between the selected input data and virtual reality elements during integration based on the information and knowledge obtained from both. In some embodiments, integration of the selected input data and virtual reality elements takes place based on a multi-layer approach (e.g., FIG. 3E).

Figure 3C:
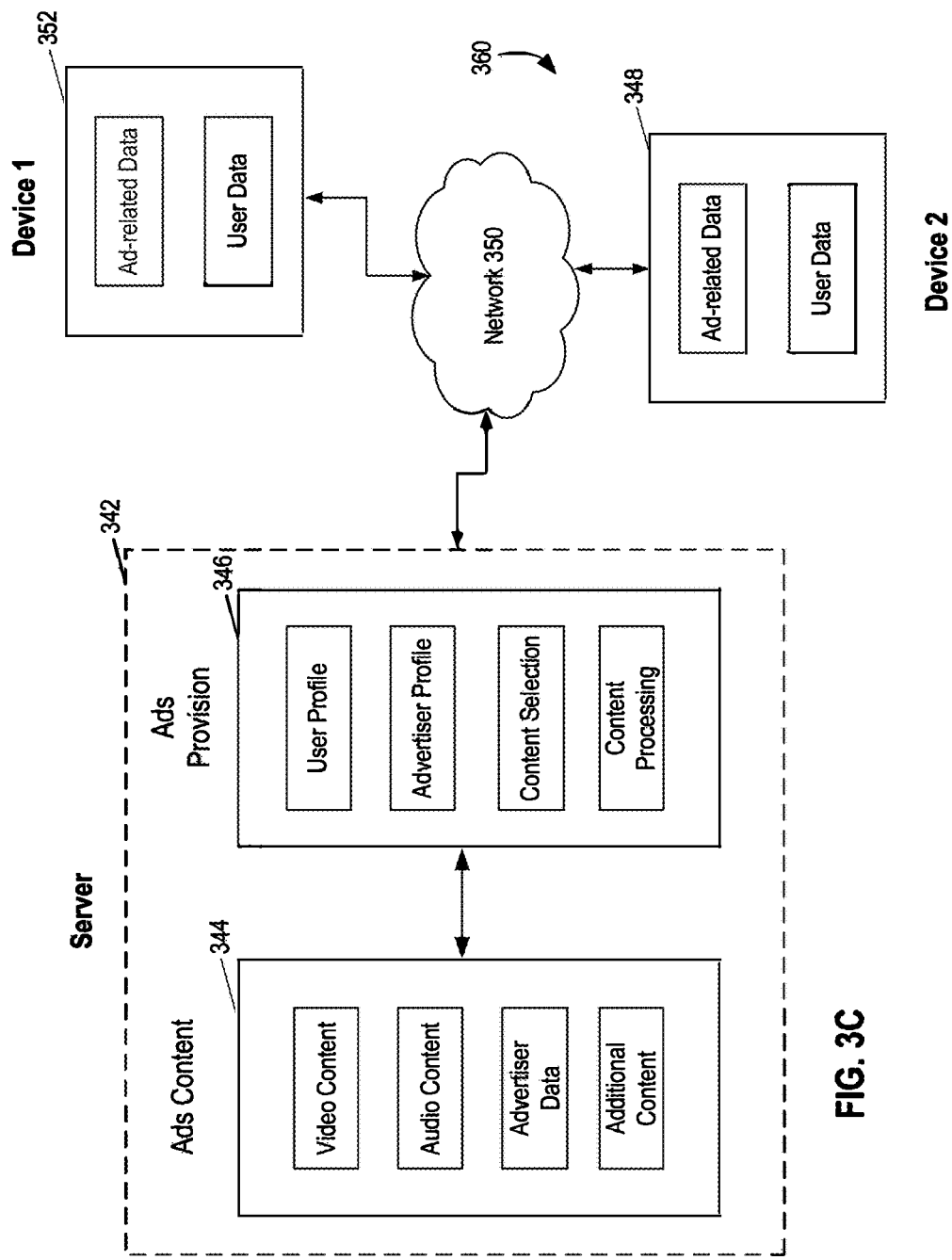
FIG. 3C depicts a sample system for including advertisement elements in real-time AR-based data.
Figure 3D:
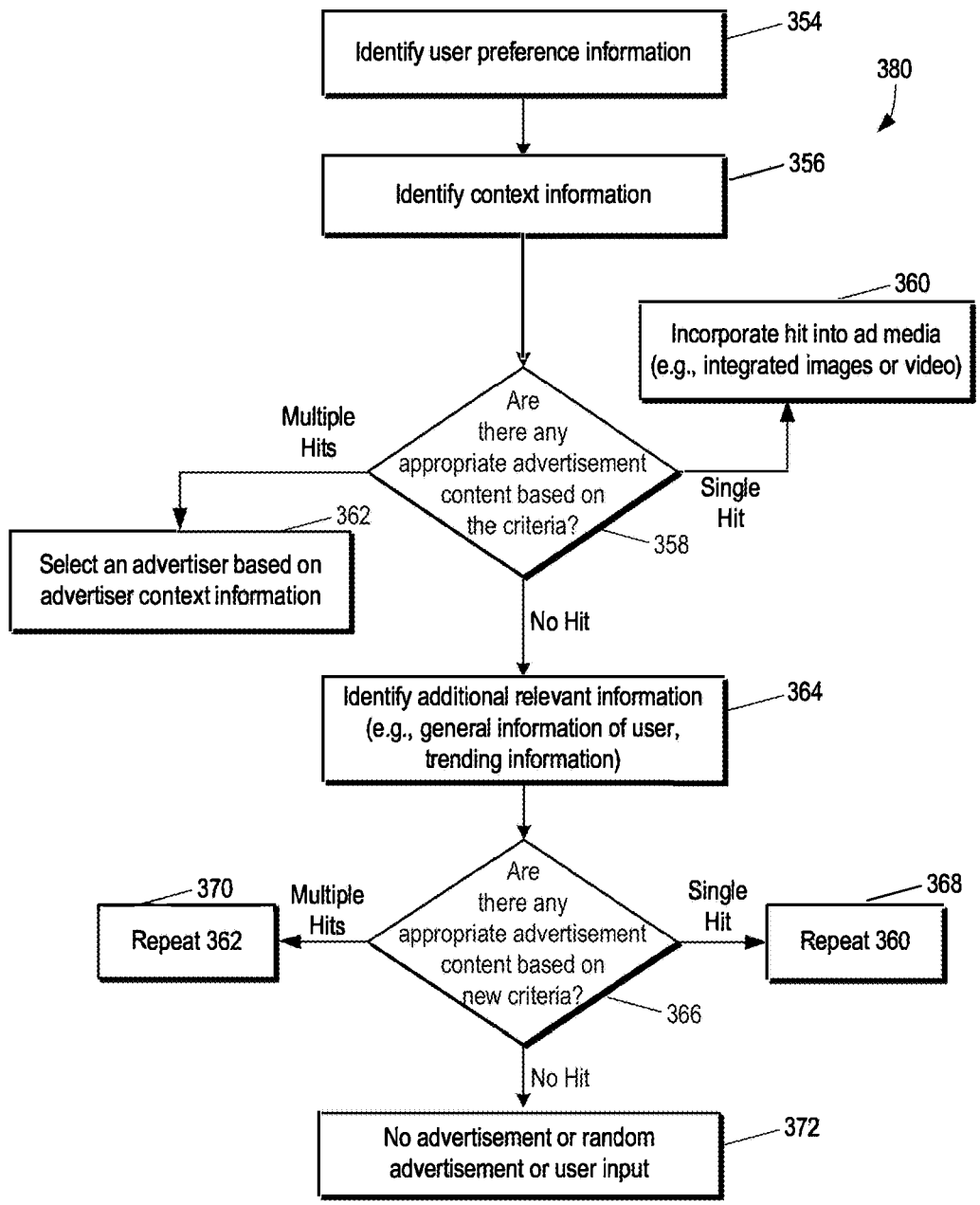
FIG. 3D depicts a sample processing for including content-matched advertisement elements in real-time AR-based data.

FIG. 3C illustrates a sample system 200 for providing advertisement content. For example, a server 342 determines which advertisement content to provide to a computer device (e.g., 348 or 352) via network 350 based on a number of content-matching parameters, including but not limited to, for example, selected and processed user input data for integration and characteristics associated therewith, information and knowledge associated with the selected user input data, AR-based input data (e.g., virtual reality elements including advertisement related virtual reality elements) and characteristics associated therewith, information and knowledge associated with the AR-based input data, one or more user preferences, one or more system settings, previous user historical data, big data, geolocation and trending information associated therewith, general trending data, an interactive user control, and any other contextual parameters.

In some embodiments, server 342 stores the advertisement content 344 in its local database. In some embodiments, server 342 receives the advertisement content from another server; for example, directly from the advertiser. Advertisement content includes but is not limited to video content, audio content, text conduct, and any other form of suitable content.

In some embodiments, server 342 includes an advertisement provision module 346. Advertisement provision module 346 interfaces between computer devices (e.g., 352 and 348) and advertisement content 344. Here, a computer device can be a personal computer device or a special purpose device such as an interactive display screen or billboard. Advertisement provision module 346 identifies user preference information. Such user preferences can be stored either locally on a user device or on a server (e.g., as part of a user profile). In some embodiments, more general user information such as age and gender may be stored in user profiles on the server while more private information is stored locally on a user device. In some embodiments, user preferences are determined by user specified information, user biographical information, user behavior information, user activities, user psychological status, user social status, user socioeconomic status, user real-time request information, or combinations thereof. In some embodiments, generally available trending information may be used to predict user preference.

In some embodiments, context based information such as date and time information, communication context, content context, advertiser context, geolocation context, presentation context, or combinations thereof can also be used to identify the appropriate advertisement content for a viewer. Here, the viewer can either actively seeks advertisement information or is passively presented with such information while engaging in other activities such as video conferencing or video gaming.

In some embodiments, a user may specifically request a product, a service, a type of product, or a type of service. In some embodiments, such requests can be made in real-time or previously specified in a file stored on server 342 or one or more user devices (e.g., 352 and 348).

In some embodiments, advertiser profiles can be created and stored on server 342. For example, an advertiser may specify forums or venues they would not want their advertisements to be shown. In addition, an advertiser can set pricing information for real-time bidding when multiple advertisers are determined to be suitable for a particular forum. As used herein, a forum can be a website, a web page, a video conference platform, or any form of platform where images and videos disclosed herein can be presented.

In some embodiments, advertisement content is selected based on user preferences and advertiser profiles. In some embodiments, advertisement content is selected based on generally available trending information. In some embodiments, advertisement content is further processed prior to being incorporated into the final integrated images and/or videos.

As disclosed herein, matching advertisement content with user devices can take place in real-time in an immersive and non-invasive manner. For example, subtle advertisement elements can be incorporated into an AR-based background during a communication session. Advertisement content can also be presented as part of an interactive experience; e.g., as an interactive element of a computer game or an educational program). In some embodiments, the advertisement content can change with respect to users and context of the communication. In some embodiments, advertisement content can be provided at the request of a user.

As disclosed herein, content matching of advertisement content can take place according to a comprehensive approaching based on any number or combination of the content-matching parameters enumerated above. In some embodiments, different content parameters can be assigned different weights. For example, a user preference can be assigned a higher weight than information inferred from general trending data or geolocation data.

FIG. 3D depicts an example process 380 for content matching based on context information for advertising. Integrated images and videos as disclosed herein are used as media for embedding the advertisement elements. However, the context-based content matching advertisement methods are not limited to such and can be applicable to any media. Here, the exemplary content matching process takes place according perceived importance of selected content-matching parameters. One of skill in the art would understand that variations can be made and additional parameters can be included to facilitate content-matching. At step 354, user preference information is identified. Here, user preference information can be assigned a higher weight during content-matching. User preference information includes user specified information, user biographical information, user behavior information, user activities, user psychological status, user socioeconomic status, status, user real-time request information, or combinations thereof. For example, user behavior information includes user habits, instant interactivity with the system, and etc. User activities include purchasing activities, browsing activities, social media activities, and etc. For example, psychological status can be obtained through facial expression and user behavior to know if a user is happy, angry, frustrated, etc. Advertisement content can be selected based on a perceived user's emotional state. Social status includes marital status, relationship status, active or inactive social engagement with friends, popularity, and etc. these info can be obtained from the user's social media info, user preference setting, etc. Socioeconomic status (SES) is an economic and sociological combined total measure of a person's work experience and of an individual's or family's economic and social position in relation to others, based on income, education, and occupation.

At step 356, context information is identified. Context information includes but is not limited to date and time information, communication context, content context, advertiser context, geolocation context, presentation context, or combinations thereof. For example, advertisement content presented to a user when the user is conducting company video conference may differ from the advertisement content presented the same user when the user is chatting to a friend or family member via video conference. Further, the advertisement content presented when the user is engaged in a video game may still be different from either content specified previously.

In some embodiments, the context associated with potential presentation forums is ascertained to identify appropriateness of the forums for presenting particular types of advertisement content. For example, websites associated with child development content accessible by young children will not display any advertisement content inappropriate for underage children.

At step 358, database containing advertisement content is searched to identify content that matches the identified user preference and context information.

At step 360, when only one single hit is identified, the content will be selected and incorporated into advertisement media (for example, the final integrated images or videos).

At step 362, when there are multiple hits identified, a bidding process can be initiated to identify an advertiser. In some embodiments, the bidding process is based on pricing information. In some embodiments, quality of the advertisement content can also affect whether particular advertisement content may be selected.

At step 364, when no hits are identified, additional information may be used to determine advertisement content. Such additional information includes but is not limited to general user information such as gender, age, geolocation, and generally accessible information such as trending information associated with the gender, age, and geolocation. In some embodiments, weather and major events associated with a particular location can also be used to as criteria for searching database containing advertisement content.

At step 366, database containing advertisement content is further searched to identify content that matches the identified user preference and context information.

At step 368, method of step 360 is repeated: when only one single hit is identified, the content will be selected and incorporated into the final integrated images or videos.

At step 370, method of step 362 is repeated: when there are multiple hits identified, a bidding process may be initiated to identify an advertiser. In some embodiments, the bidding process is based on pricing information. In some embodiments, quality of the advertisement content may affect whether particular advertisement content may be selected.

At step 372, when no hits are identified, the system may decide to present no advertisement content or randomly present any advertisement content. In some embodiments, a user may request random advertisement content.

In some embodiments (not depicted in FIG. 3D), the selected advertisement content (e.g., as part of certain integrated images and videos) is presented with real-time translation, special sound effect, or music background.

At any point, a user can turn on and off the advertisement feature, or specify any settings for a highly personalized advertisement experience. Additionally, a user can provide real-time feedback to request specific advertisement content or a particular type of advertisement content.

As disclosed herein, content-matching can take place in real-time. For example, the advertisement content can be stored locally on an intelligent AR-user device; e.g., an interactive display screen or billboard or a suitable user device. In some embodiments, the advertisement content can be received at the intelligent AR-cloud platform via network communication to a local or remote host.

Figure 3E:
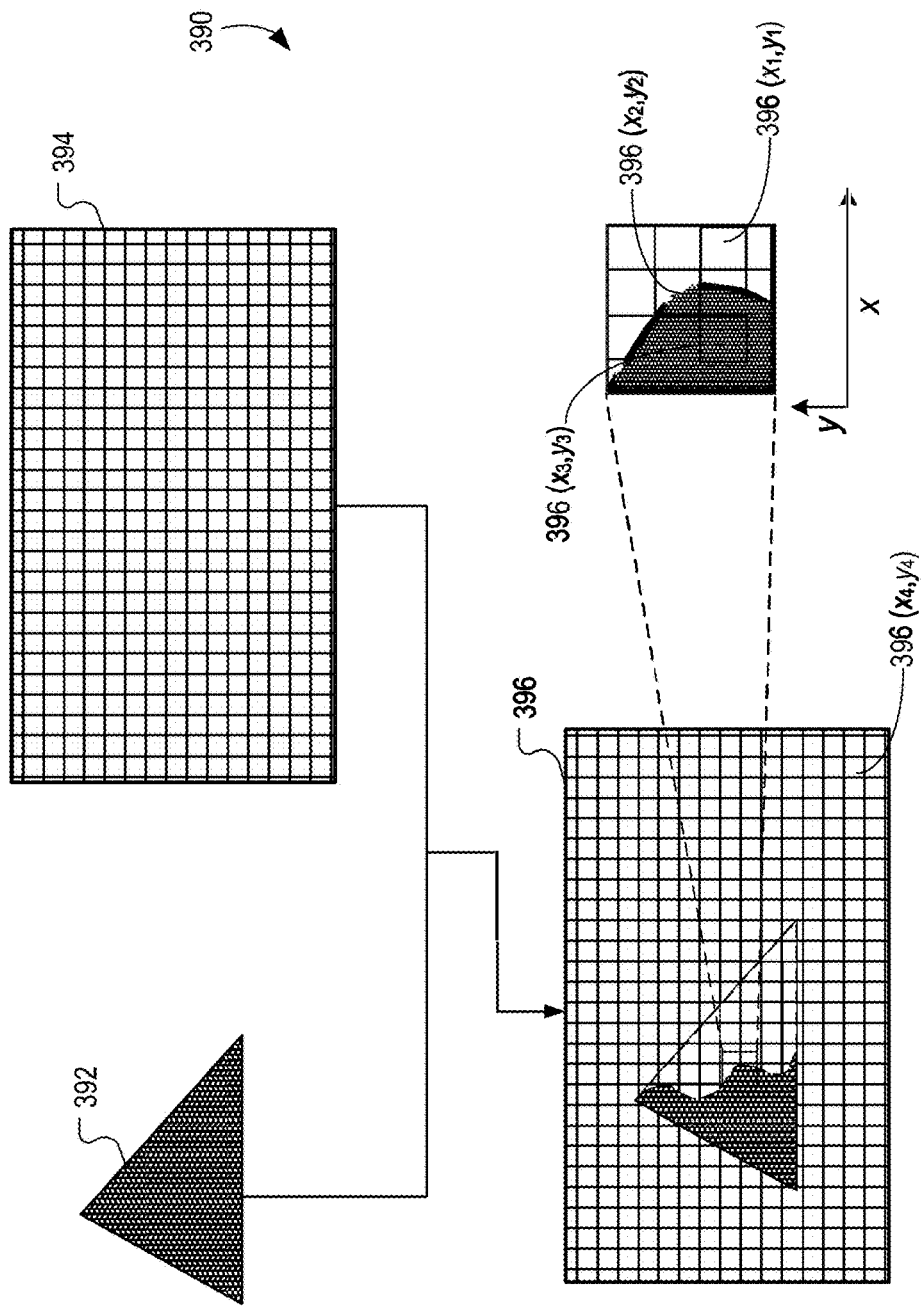
FIG. 3E depicts a sample processing for integrating real-time input data and virtual reality elements to create real-time AR-based data.

FIG. 3E provides an illustration of an exemplary embodiment of pixel-by-pixel integration process 390. Here a simplified extracted real life object 392 is represented by a triangle. A simplified virtual environment is shown as 394, a rectangle with grid patterned, where each grid represents a pixel. An image obtained by integrating real life object 392 with virtual environment 394 is illustrated as integrated image 396. As depicted, certain pixels of real life object 392 become invisible (being positioned behind virtual environment 394); see, for example, pixel 396 $(x_1, y_1)$. Some pixels of real life object 392 are partially visible and partially invisible (being positioned partially in front of and partially behind virtual environment 394); see, for example, pixel 396 $(x_2, y_2)$. Some pixels of real life object 392 are completely visible (being positioned in front of virtual environment 394); see, for example, pixel 396 $(x_3, y_3)$. Some of the pixels in integrated image 396 complete lack any information from real life object 392; see, for example, pixel 396 $(x_4, y_4)$.

Using the three layered approach, pixel 396 $(x_1, y_1)$ has a front layer that is defined by a pixel in virtual environment 394 and either its intermediate layer or background layer can be filled with information from a corresponding pixel from real life object 392. However, because the transparency value of the front layer is set at 0, whatever behind the front layer is completely blocked by the pixel in virtual environment 394. As such, alternatively, pixel 396 $(x_1, y_1)$ can be obtained by defining its front layer with the pixel information from virtual environment 394 while setting values of the intermediate layer or background layer to null.

Pixel 396 $(x_2, y_2)$ depicts information from both real life object 392 and virtual environment 394. This pixel can be obtained by defining the front layer with partial information from real life object 392, the intermediate layer with information from a corresponding pixel from virtual environment 394, and the background layer with partial information from real life object 392. Again, the transparency level for each layer is set at 0 so the intermediate layer is partially shown and the background layer is completely blocked. When the transparency levels for different layers are set at none-zero value, information from real life object 392 and virtual environment 394 will blend with each other throughout the pixel.

Pixel 396 $(x_3, y_3)$ is the opposite of pixel 396 $(x_1, y_1)$. It has a front layer that is defined by a pixel in real life object 392 and either its intermediate layer or background layer can be filled with information from a corresponding pixel from virtual environment 394. However, because the transparency value of the front layer is set at 0, whatever behind the front layer is completely blocked by the pixel in real life object 392. As such, alternatively, pixel 396 $(x_3, y_3)$ can be obtained by defining its front layer with the pixel information from real life object 392 while setting values of the intermediate layer or background layer to null.

Pixel 396 $(x_4, y_4)$ is located in an area where real life object 392 and virtual environment 394 do not overlap. In this case, real life object 392 is completely missing. It can be obtained by defining any of the three layers with the information from the corresponding pixel from virtual environment 394 while setting the value for the remaining levels to null.

In some embodiments, as illustrated above, parallel computing can be carried out for multiple pixels at the same time. In some embodiments, computing can be simplified by identifying pixels in non-overlapping regions. In some embodiments, computing can also be simplified by defining only the top layer for solid pixels that are completely non-transparent.

In some embodiments, the extracted real life object comprises three-dimensional image information that can be divided between one or more of the front, intermediate and background layers in any combinations. In some embodiments, the virtual environment comprises three-dimensional image information that can be divided between one or more of the front, intermediate and background layers in any combinations.

In some embodiments, the relations between an extracted real life object (e.g., 392) and a virtual environment (e.g., 394) changes dynamically. In some embodiments, such dynamic changes take place over time between integrated images. For example, real life object 392 may move in and out of virtual environment 394. In some embodiments, at least a portion of the real life object interacts with one or more elements of the virtual environment. For example, this can occur in a game setting where a real life object (a user) can use gesture to bounce balls off a wall in the virtual environment or pass a ball to a player in the virtual environment.

Active and Passive Advertisement

The systems and method disclosed herein can be applied to establish active and or passive advertisement experience.

Active advertisement experience can be associated with content creation as well as content provisioning. For example, a real estate agent can create flyers by inserting a real-time image of himself into photos of a piece of property using existing photos of the property without having to retake photos. Additionally, the method here allows existing photos of the property to be enhanced by real-time modification when generating the integrated image.

As another example, a user can create small budget advertisement on a local user device, with or without assistance from a server. For example, an owner of a flower shop can incorporate images of their specialty flower arrangement into her favorite scenes in a video clip.

A user can also use the embodiments disclosed herein to create images or videos with assistance from one or more external servers. The images or videos can be for personal enjoyment or as a form of speech (e.g., including for advertisement). As disclosed herein, advertisement elements can be added in any one or multiple method steps that are performed on the server.

For advertisement provisioning, context information is used to create in real-time targeted-advertisement materials to viewers. For example, to promote the Olympics, a generic video about the games can be provided as the virtual environment. Different real life objects, for example, a celebrity, an actor, an athlete, a common user of a computer device can take a personal video of themselves, which will then be integrated with the virtual environment to create as many promotion video as possible.

In some embodiments, part of the advertisement videos can be taken before-hand, real-time integration occurs when a viewer requests the material. For example, when a person from China clicks a link on the official Olympic Game website, the server detects the person's geolocation and possibly other information, and creates a video specific for the person where an athlete from China will be featured in the video and different China-related elements will be incorporated into the generic video. And the video will be presented in Chinese, for example, using a voice that will be familiar to the person. When another person from the US clicks the same link, a different video will be created in real-time to provide the other person a different viewing experience, featuring a different athlete, different US-related elements, and English narration using a different voice familiar to people in the US.

As noted above, advertisement can be passively presented while engaging in other activities such as video conferencing or video gaming. Although users engaging in activities such as video conferencing or video gaming do not actively seek advertisement information, the context based content matching approach disclosed herein provides a seamless and relevant experience with embedded advertisement elements in a non-invasive way. Passive advisement as disclosed herein can be immersive and interactive, leading to fun experiences, in contrast to traditional advertisement, which is often considered a waste of time and causes unpleasant reactions from viewers. Passive advisement as disclosed herein can find numerous applications and generate enormous revenue.

For example, before or during a video conference, a user can select Hawaii as a theme option for the virtual environment. The system, in turn, can identify numerous possible advertisement elements that can be used as the virtual environment or as a part of the virtual environment. For example, the user's favorite destination in the past is Maui. Scenes from favored locations and activities in Maui can be presented as part of the virtual environment. Additionally, if the user likes to surf and another island in Hawaii offers better surfing experience than Maui, photos or videos of the other surfing destination may be presented to the user. The selected of advertisement elements can be done based context of the video conference as well. If the user is talking to friends and family, virtual environment with more family-oriented destinations or activities can be presented; for example, if the user has two young children, the virtual environment can include images or videos of more child-friendly activities. In some embodiments, destinations can be selected based on their respective distance to the user's favorite hotel on Maui.

Often, many types of advertisement content can be provided. Final selection of a particular type of content can be decided in a bidding process. An advertiser with appropriate content and the best pricing may be selected.

For the same user choosing Hawaii as a theme option for the virtual environment during video conferencing with a business partner, advertisement content with more tranquil characteristics will be presented. For example, a quite forest or a quite beach front scene from Hawaii may be selected to be part of the virtual environment. Again, there will be many options possible. The final selected again can be decided in a bidding process. An advertiser with appropriate content and the best pricing may be selected.

In another example, a person may passively participate in rendering advertisement material. For example, a traveler arriving at an airport can choose to view video material of the new destination via a system as disclosed herein. The traveler can interact with elements within the video material. The traveler can choose to create and save images and/or videos reflecting such fun interactions. In some embodiments, advertisement material can be embedded in the images and/or videos. In some embodiments, no advertisement material is embedded in the images and/or videos but the overall experience itself can be considered an advertisement. Such experience can be designed for any purpose or to suit the need for any industry. For example, a cosmetic company can create a platform where a user gets to virtually try out different makeup products. Effects of the makeup products can be generated as virtual environment and merge with a user to create modified images or videos of the person wearing the makeup product. Similarly, a clothing company can intelligently present clothing options to a person based on user preferences. The clothing items can be created as virtual environment and merge with a user to create modified images or videos of the person wearing the clothing items.

Figure 4A:
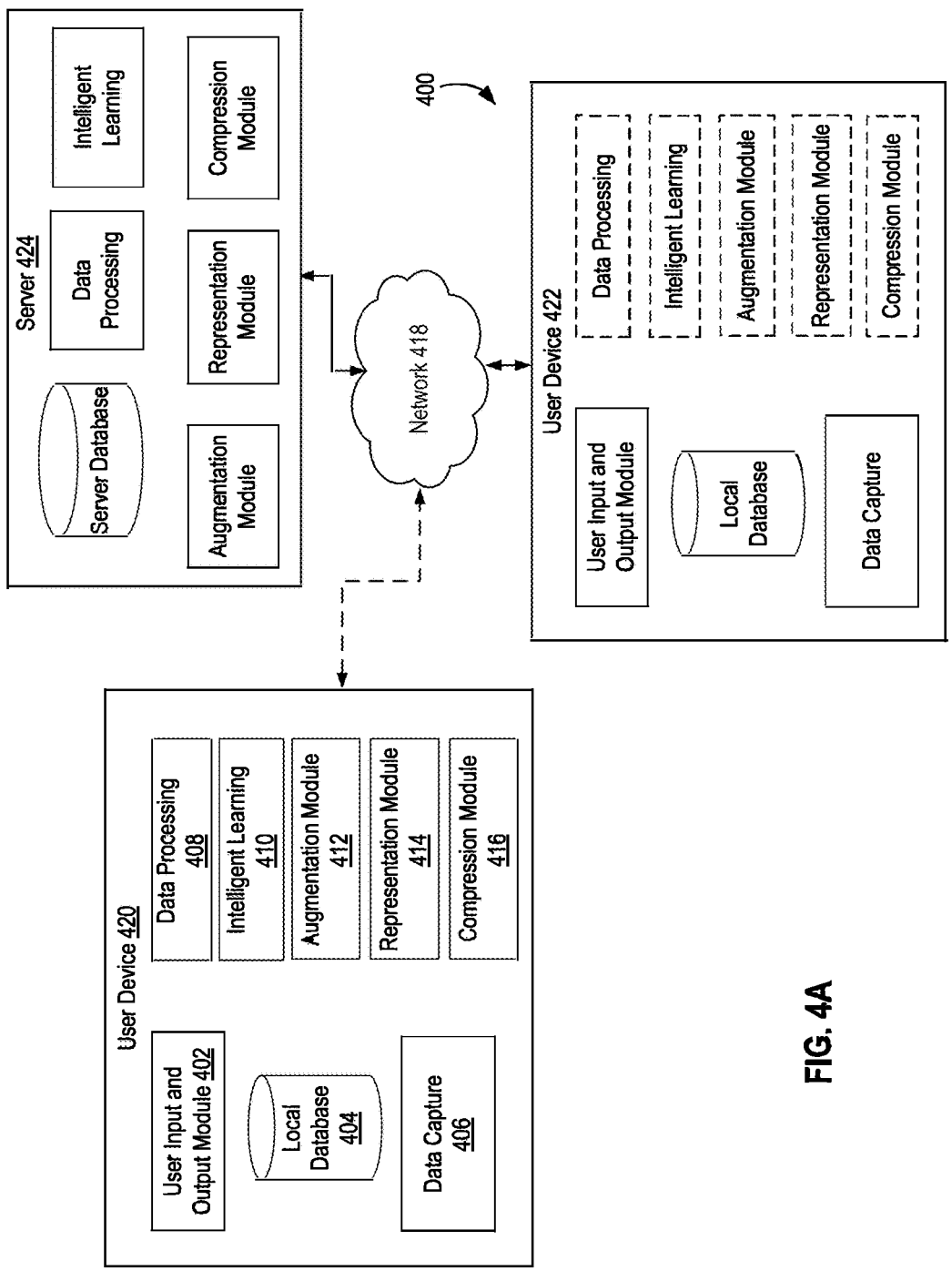
FIG. 4A depicts a sample system for AR-based data real-time communication.

FIG. 4A depicts an exemplary system for real-time AR-based communications based on multi-leveled intelligent real-time intelligent learning and processing (e.g., information extraction and knowledge learning). Exemplary system 400 includes a computer device 420 and a computer device 422, connected to a remote intelligence server 424 via internet 418. As disclosed herein, intelligent learning and processing of data can take place on a single device or on multiple devices.

In some embodiments, system 400 includes user I/O module 402, local database 404, data capturing module 406, data processing module 408, intelligence module 410, augmentation module 412, representation module 414, and compression module 416. As disclosed herein, the functionalities of these modules (e.g., those of user I/O module 402, local database 404, data capturing module 406, data processing module 408, intelligence module 410, and augmentation module 412) can be the same or similar to corresponding functional modules associated with computer device 102 (of FIG. 1B), user device 220, user device 240 and server 250 (each of FIG. 2A), and user device 328, user device 330, and server 334 (each of FIG. 3B).

The inter-relations described between user devices 220, 240 and server 250, of 328, 330 and server 334, and any variations thereof, can also be applied to user devices 420, 422 and server 424. It will be understood that alternatives and variations can be made so long as the intended purpose of a functional module thereof can be achieved.

The unique functionalities of system 400 are exemplified by certain aspects of I/O module 402, representation module 414, and compression module 416, as illustrated below.

In some embodiments, user I/O module 402 can receive user input to a user device and present output from another device, using text, audio, video, motion, and/or haptic output mechanisms. For example, I/O module 402 includes one or more data collection components such as a camera, a microphone, a keyboard, a mouse, a touch sensitive screen, one or more sensors, and etc. In some embodiments, I/O module 402 is also configured to detect and track eye movement, facial expression and etc. In some embodiments, I/O module 402 or user device 420 further includes one or more sensor devices for collecting data such as heartbeat, blood pressure, orientation, temperature, motion, altitude, pressure, proximity, acceleration, and etc.

In some embodiments, I/O module 402 can also present audio, visual, motion, and/or haptic output to a user. For example, I/O module 402 display integrated images or videos on a monitor a user of device 420. In some embodiments, the I/O module 402 includes one or more output components such as a monitor (can be touch sensitive), a speaker, a touch sensitive screen, and one or more sensors. In some embodiments, the output devices allow a user receive a physical experience such as touching (e.g., a user can receive a remote handshake or kiss). These functionalities facilitate effective communications.

Transformation of data type and data formation can be done by a representation module 414, which can also be referred to as "data representation module 414" or "module 414." As disclosed herein, representation module 414 can represent one or more types of data using data parameters. For example, data parameters can include text, one or more codes, one or more numbers, one or more matrixes, one or more images, one or more audio signals, one or more sensor signals; or combinations thereof. For example, a particular AR input data (e.g., a specific virtual environment) can be represented with a numerical code. A user's expression can be represented as a series of numbers or matrixes. A user's gesture can be represented by gesture model parameters using a gesture model that is specific to the user.

As disclosed herein, different data parameters can be used to represent the same information. The specific form of the data parameters can be determined by a number of factors, including but not limited to cultural background, language differences, personal habits, individual variations, and etc. For example, a typical first-time greeting in a user from the US can be represented by the word "Hello" or "Hi," followed up the phrase "nice to meet you" and a friendly wave to another user at a remote communication device. The same greeting for a user in the UK can include the phrase "how do you do?" and a friendly nod. Here, the data parameters representing the greetings include audio signals for the verbal greeting and images of the hand or head movement.

In some embodiments, significantly different data parameters may be used to represent AR data based on cultural differences. For example, a user from the US communicates with a user from Japan in a formal business meeting using methods/systems according to the current disclosure. The user in Japan represents a traditional corporation, so the user in the US instructs the system to tailor the communication according to Japanese custom. Alternatively, the system can automatically establish settings to facilitate a formal meeting based on context and background information that is provided to the system. Here, the information: the word "Hello" or "Hi," the phrase "nice to meet you," the friendly wave, and optional background information can be used to derive data at the knowledge level; for example, the system can automatically learn about the context and purpose of the meeting. Subsequently, real-time AR data can be generated based on such information and knowledge. In the real-time AR data, the knowledge and information can be represented by data parameters that are different from those associated with the input data. For example, the system can use an avatar representing the user in the US to create an animation of the user greeting the Japanese user by bowing according to standard Japanese custom. Here, the real-time AR data significantly different from the raw data input: completely different form of data parameters are chosen to represent the same information and knowledge. As used herein, "raw data" and "user input data" can be used interchangeably.

Representation module 414 can represent data at any level into proper format, including but not limited to including fully or partly augmented data, information data, knowledge data, AR input data, and etc. For example, augmented data can be separated into multiple files before being compressed for data transmission (e.g., steps 446-449 in FIG. 4B or steps 416-420 in FIG. 4C). In some embodiments, representation module 414 can include data construction or reconstruction functions, which can change the data parameter form or type of a particular data, for example, to suit a particular type of hardware design (e.g., 3D display to 2D display or vice versa) or to present the data better to a particular audience (e.g., people with visual, audio and other forms of disabilities).

In some embodiments, device 420 comprises a compression module 416, which can also be referred to as "data compression module 416" or "module 416." As disclosed herein, data is compressed to achieve optimal compression rate while preserving the data integrity. Both lossless and lossy compression methods can be used for data compression, for example, as specified by the system or the user. Exemplary lossless methods include but are not limited to the Lempel-Ziv (LZ) method, Lempel-Ziv-Welch (LZW) method, LZX (an LZ77 family compression algorithm), Huffman encoding, grammar-based codes, probabilistic modeling, wavelet based method, and etc.

During lossy data compression, some loss of data is acceptable. Here, the data include raw data or user input data, information and even knowledge, depending on their respective relevance. Dropping non-essential details from the data source can save storage space. Lossy data compression schemes are designed by research on how people perceive the data in question. For example, the human eye is more sensitive to subtle variations in luminance than it is to the variations in color. JPEG image compression works in part by rounding off non-essential bits of information. There is a corresponding trade-off between preserving information and reducing size. A number of popular compression formats exploit these perceptual differences, including those used in music files, images, and video.

In some embodiments, a data type is used as a parameter during lossy data compression. In lossy audio compression, methods of psychoacoustics are used to remove non-audible (or less audible) components of the audio signal. Compression of human speech is often performed with even more specialized techniques; speech coding, or voice coding, is sometimes distinguished as a separate discipline from audio compression. Different audio and speech compression standards are listed under audio coding formats. Voice compression is used in internet telephony, for example, audio compression is used for CD ripping and is decoded by the audio players.

In some embodiments, regardless of data type, selective compression can be applied. For example, a selective compression approach can combine lossless and lossy data compression methods. Here, different methods of compression are applied to different bits of data in accordance with their respective significance. For data that need the full reservation, a loss compression method will be applied, including, for example, Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. For example, when an iris scan is used as a form of authentication, nearly all information will reside within the iris portion (color part of the eye) of the image. The data can be compressed such that integrity for the eyes is preserved while the remaining of the face or even the person can be significantly compressed. For example, anything beyond the face can even be completely removed. The combined approach allows key characteristics to be preserved in relevant data while reducing the burden of irrelevant data.

In some embodiments, compression module 416 can also perform de-compression of data at various levels, including fully or partly augmented data, information data, knowledge data, AR input data, and etc.

As disclosed herein, data (e.g., data or results of analysis) can be shared among data acquisition 406, data processing module 408, intelligent learning module 410, augmentation module 412, representation module 414, compression module 416, and any other functional modules not described here.

In some embodiments, pre-defined user preference and system settings can be applied to specify or limit the functionalities of any of the functional modules disclosed herein.

Figure 4B:
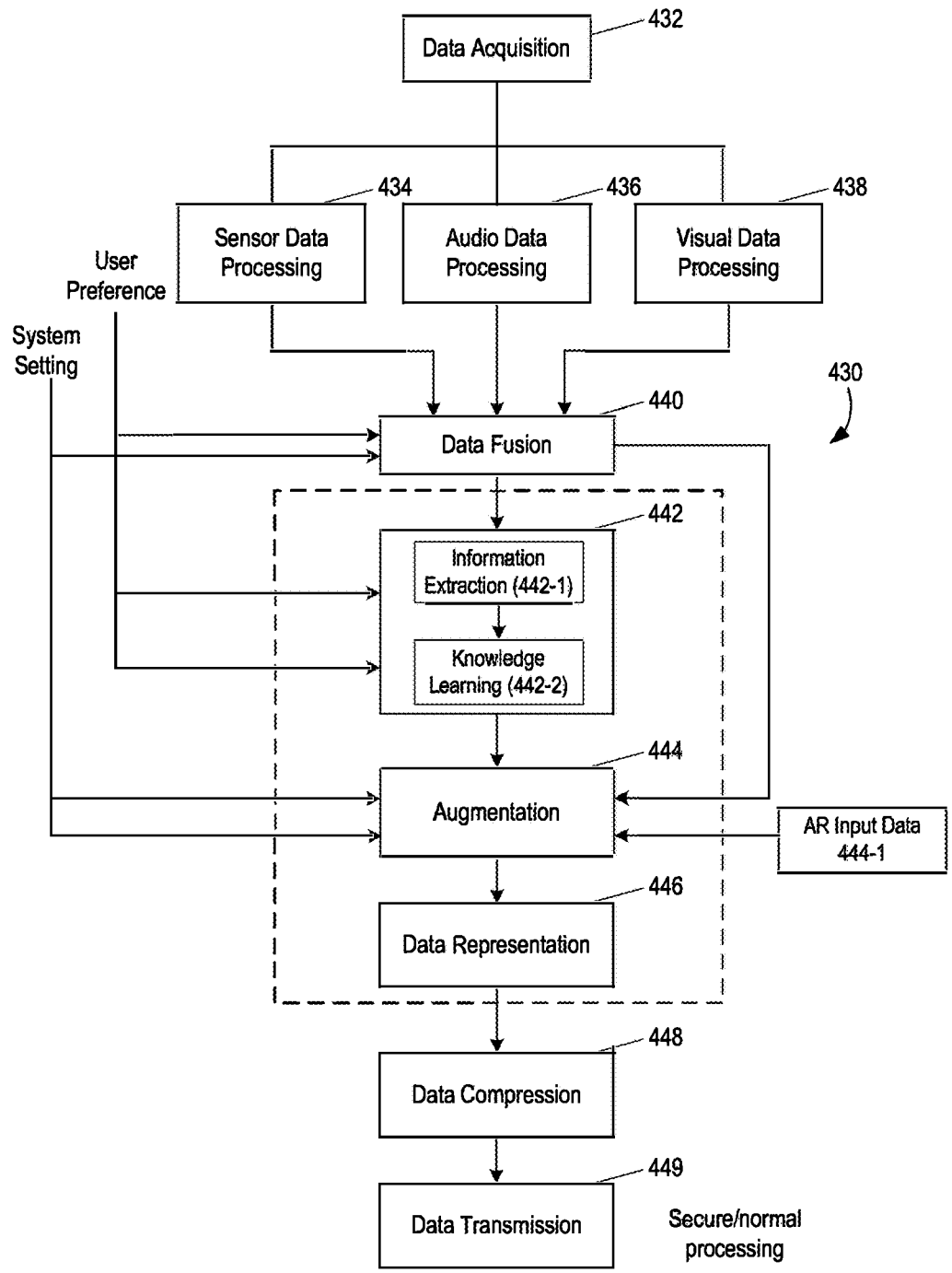
FIG. 4B depicts a sample process for AR-based data real-time communication.
Figure 4C:
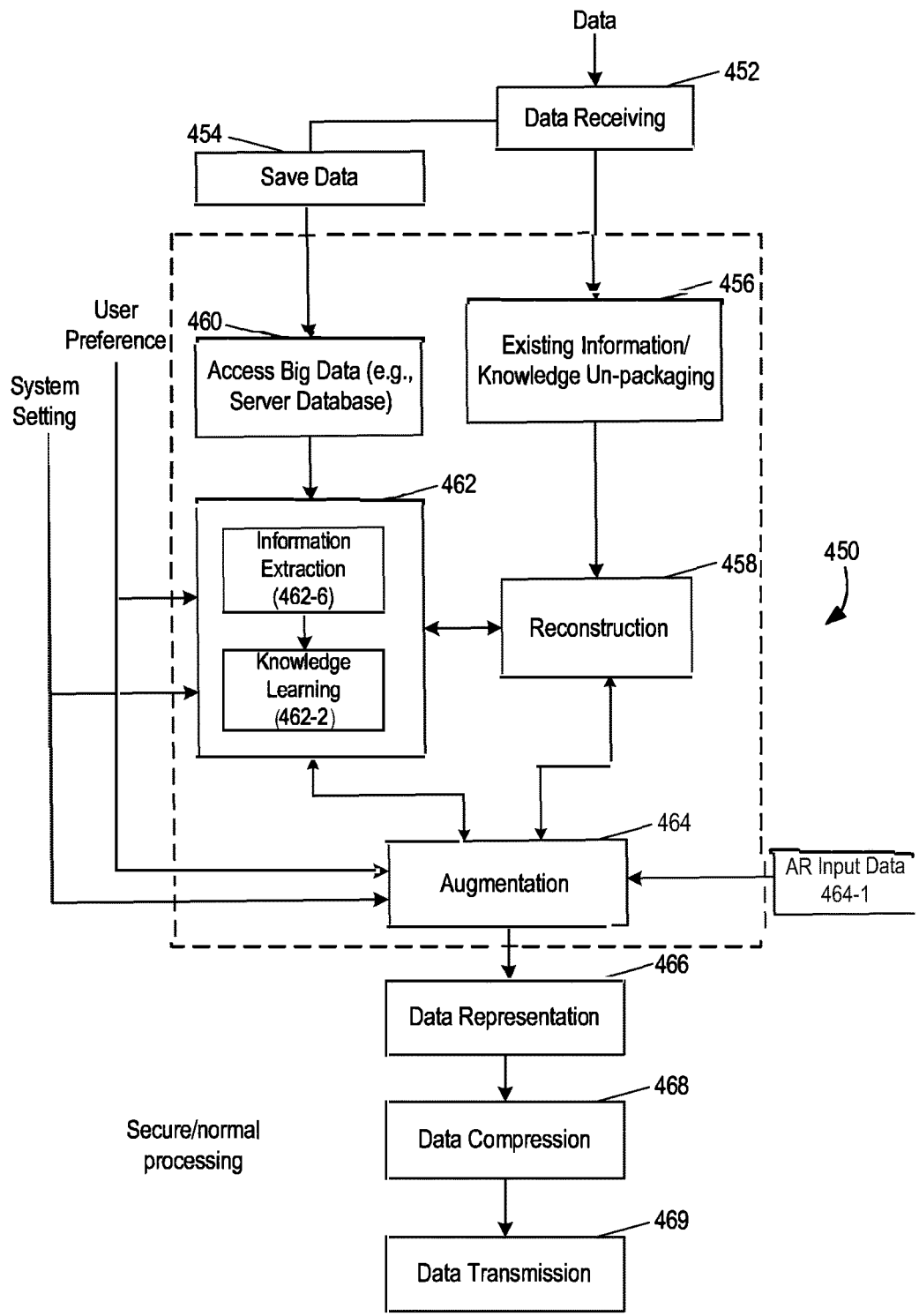
FIG. 4C depicts a sample process for AR-based data real-time communication.
Figure 4D:
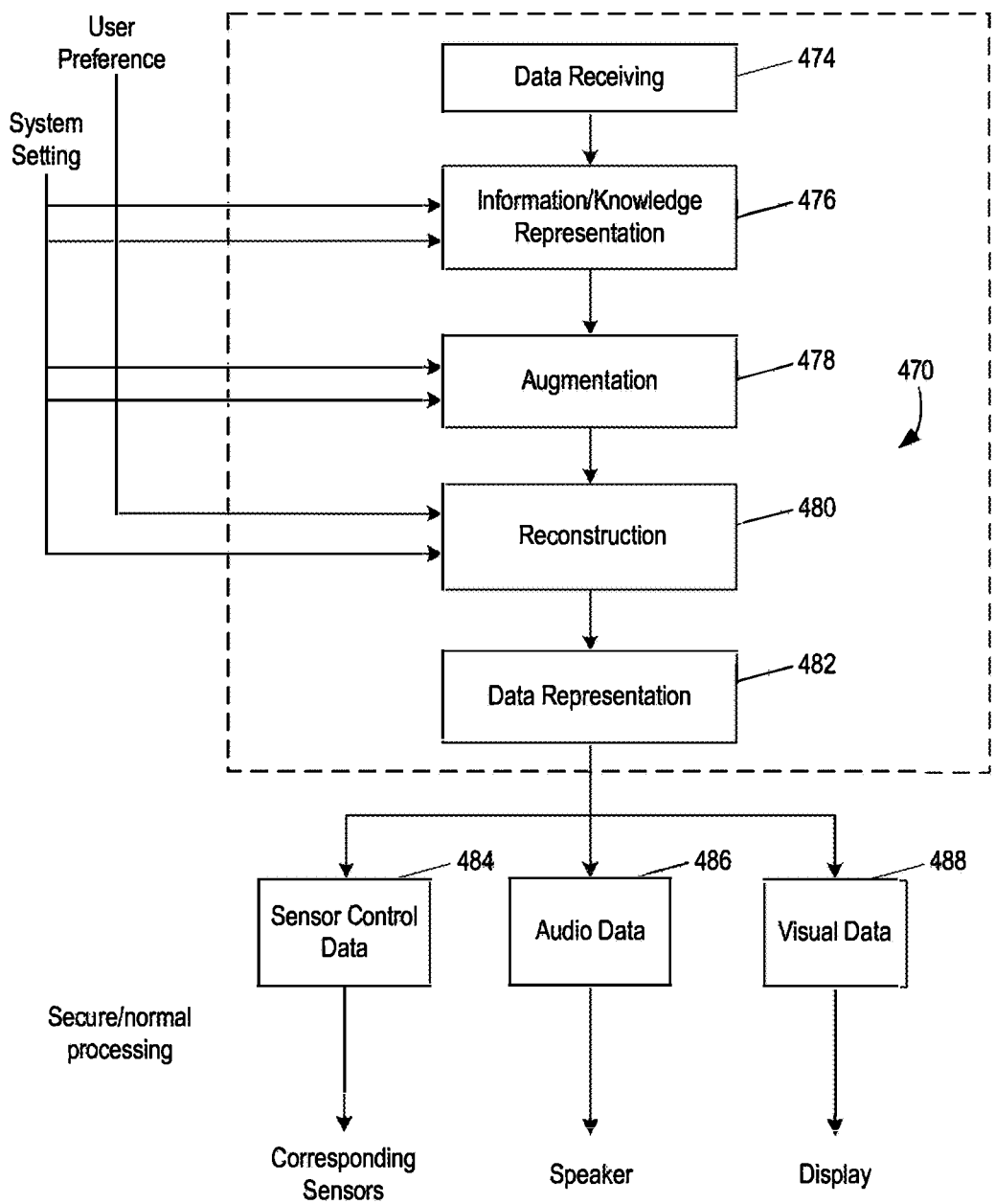
FIG. 4D depicts a sample process for AR-based data real-time communication.

Additional details of these functional modules can be found in descriptions in connection with FIGS. 4B-4D.

FIG. 4B depicts an exemplary embodiment for performing data processing on a computer device. Exemplary embodiment 430 comprises numerous steps for performing data acquisition/processing, information extraction, knowledge learning, data augmentation, data representation, data compression, data transmission and etc. Much of the steps here can be carried out by functional modules described in connection with FIG. 4A. Here, the computer device can be a local device or a server.

At step 432, image data and optional audio and sensor data are captured either individually or in combination. Exemplary data capture unit includes but is not limited to a microphone, a camera (e.g., 2D, 3D, IR, etc.), and one or more sensors. As disclosed herein, sensor devices collect data such as heartbeat, blood pressure, orientation, temperature, motion, altitude, pressure, proximity, acceleration, and etc. As disclosed herein, a sensor can record and store measurements of a user or of an environment where the sensor is located.

At steps 434, a visual data processing unit processes camera data for scene understanding and object detection, tracking, and recognition. For example, visual data include but are not limited to facial expression, hand gesture, body language tracking and recognition using 2D, 3D, 4D, color, near infrared (NIR) data, infrared IR data, thermal, multiple spectral, and/or hyperspectral images, or combinations thereof. This unit can also perform human identification based on face, gesture, body shape, palm, iris, sclera, etc. In some embodiments, text data can be included as visual data.

At step 436, an audio data processing unit processes microphone data from one or multiple microphones for audio data understanding, and/or audio noise mitigation. This unit can also perform human identification based on voice patterns. In some embodiments, certain audio data do not provide meaningful information and can be considered background noise. Such audio data can be treated as a scene.

At step 438, a sensor data processing unit processes sensor data for environmental understanding, user bio-status monitoring, and/or human behavior understanding.

In some embodiments, each functional data unit processes input data separately and individually. For example, multi-type data can be processed by two different unit simultaneously or sequentially. In some embodiments, one or more functional data unit can be combined into one.

At step 440, a data fusion unit fuses the audio data, visual data, and sensor data together based on the user preference and system setting. During data fusion, multiple data sources are integrated to produce more consistent, accurate, and useful information than that provided by any individual data source. An example data fusion is to fuse the visual data and audio data together to analyze user emotion. In another example, the system can further fuse the visual data, audio data, and the sensor data (such as data reflecting the bio-status of the user; e.g., heartbeats, blood pressures, and etc.) to provide more accurate analysis of user emotion.

At step 442, intelligent learning or processing is performed at multiple levels. For example, at step 442-1, information extracts necessary information from raw data or fused data based on one or more criteria, including, for example, a user preference, a system setting, an integration parameter, a characteristic of an object or a scene of the raw data, an interactive user control, or a combination thereof. In some embodiments, a criterion based on Big Data can also be used. For an example, the system can extract the user facial muscle movements that represent user expression information. For another example, the system can extract the user speech emphasize using the voice magnitude changes and tone changes. Optionally, at this step, extracted information (real-time learned or existing) can be used to create augmented reality data based on real-time data, AR input data, and additional data according to one or more criteria comprising a user preference, a system setting, a characteristic of the object or scene from the real-time data, or a combination thereof.

Also at step 442-2, previously obtained information can be further analyzed to determine knowledge. As described, knowledge learning from extracted information can be based on one or more criteria, including, for example, a user preference, a system setting, an integration parameter, a characteristic of an object or a scene of the raw data, an interactive user control, or a combination thereof. In some embodiments, a criterion based on Big Data can also be used.

At step 444, the knowledge, in combination with previously information, will be used to augment real-time data (processed or raw), AR input data (444-1), and additional data to create real-time AR data, according to one or more criteria, including, for example, a user preference, a system setting, an integration parameter, a characteristic of an object or a scene of the raw data, an interactive user control, or a combination thereof. In some embodiments, a criterion based on Big Data can also be used. In some embodiments, only knowledge will be used for the augmentation. In some embodiments, only information will be used for the augmentation.

As disclosed herein, any suitable data can be used as AR input data (444-1). For example, they can be real-time data or pre-created data. AR input data (444-1) can be realistic or include virtual elements.

In some embodiments, prior to data augmentation, some data can be eliminated or added. For example, data related to user privacy can be eliminated. Certain data can be eliminate for better compression results. Alternatively, extra data can be add to create a certain effect (e.g., appearing cool, fun, mysterious, friendly, serious and etc.) Data can also be added to facilitate better conversation engagement. As disclosed herein, data can be eliminated or added any reasons based on a user preference, system setting, characteristics of the object/scene, information, knowledge, and/or interactive user control. For example, the knowledge/information based augmentation unit would eliminate the background scene from the camera data and use user selected background scene to replace the real background information for privacy protection reason. In another example, the augmentation unit may remove user face and body while using preselected avatar to represent user but copy the user's facial muscle movement, eye movement, gesture, body movement, and etc. into the avatar for fun. In still another example, the information augmentation unit may remove the user's true voice information but keeping user's speech tone and magnitude change along with the speech content for better conversation engagement. In yet another example, the knowledge/information based augmentation unit would perform real-time deformation of user face/body/voice/background scene, etc.

Besides the above examples, one important function of the augmentation unit is: it can extract a real-time information in one form and transform it into another type of information for display, audio, and/or sensor control. For example, one unit can extract the user's heartbeat change and use it as a control signal for some sensors in another unit, or display it as a person's height in the virtual world.

At step 446, a data representation unit uses data to present the real-time AR data from step 314. As an example, a user's expression may be represented as a series of numbers/matrix which represent expression model parameters. In another example, if the user chooses to augment the scene background, the background scene can be the scene number in the system. In still another example, a gesture of a user can be represented by parameters using a gesture model of the user. In yet another example, user identity can be represented by use ID number after the system identification. In some embodiments, the augmented data can be separated into multiple files to prepare for subsequent actions (such as data compression and transmission). For example, the video/audio portion of the real-time AR data can be presented as a MPEG file with both video and audio signals. Alternatively, the video/audio portion of the real-time AR data can represented in separate video and audio files. Similarly sensor related data can be represented in a separate file.

At step 448, a data compression unit compresses the data to achieve optimal compression rate while preserve the data integrity. Both lossless or lossy compression methods can be used for data compression based on the design needs, such as Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. During lossy data compression, some loss of data is acceptable. Here, the data include raw data, information and even knowledge, depending on their respective relevance. Dropping non-essential details from the data source can save storage space. In some embodiments, a selective compression approach can be used by combining lossless and lossy data compression methods. Here, different methods of compression are applied to different bits of data in accordance with their respective significance. For data that need full reservation, a loss compression method will be applied, including for example, Lempel-Ziv (LZ) method, Lempel-Ziv-Welch (LZW) method, LZX (an LZ77 family compression algorithm), Huffman encoding, grammar-based codes, probabilistic modeling, wavelet based method, and etc. For example, when an iris scan is used a form of authentication, nearly all information will reside within images of the user's eyes. The data can be compressed such that integrity for the eyes is preserved while the remaining of the face or even the person can be significantly compressed. For example, anything beyond the face can even be completely removed. The combined approach allows key characteristics to be preserved in relevant data while reducing the burden of irrelevant data. At step 449, compressed data can be transferred to a proper receiver device and the cloud using proper communication protocols, using, for example, a data transmission unit. In some embodiments, the data can also be encrypted to ensure secure transformation.

As disclosed herein, each of the steps can itself be an iterative process including many round of analysis or processing. As such, many of the steps can be carried in real-time concurrently in parallel processes. For example, processing of visual, audio and sensor data (e.g., steps 434, 436, and 438) can take place at the same time. Also, for example, as soon as some information is extracted at 442-1, knowledge learning at 442-2 can be started while continuously receiving additional information that is be concurrently extracted.

In some embodiments, all aspects of data processing can take place in one device via a secure processor and a secure channel, with a secured storage including encryption to ensure data security. In some embodiments, part of the data processing can take place via a secure processor, secure channel, with secure storage including encryption to ensure security while other parts of the processing can take place via a processor, channel and storage with regular security level. In some embodiments, all aspects of the data processing can take place via a processor, channel and storage with regular security level. As disclosed herein, data processing includes processing of raw data, information, knowledge, and beyond.

FIG. 4C depicts an exemplary embodiment for performing data processing on a computer device. Exemplary embodiment 400 comprises numerous steps for performing data processing, information extraction, knowledge learning, data augmentation, data representation, data compression, data transmission and etc. Much of the steps here can be carried out by functional modules described in connection with FIG. 4A. Here, the computer device can also be a local device or a server, preferably a server.

At step 452, the computer device (e.g., a server) receives data from another device (e.g., a user device). As disclosed herein, data received comprise raw data, partially processed data, fully processed data (including augmented data), or combinations thereof. Exemplary embodiment 400 illustrates a scenario where data received at the computer device has already been augmented on a different device. In some embodiments, the received data are decompressed (e.g., the previously augmented data) into a proper format suitable for processing on the server. If the data is encrypted for secure transfer, in this unit, the data will be decrypted. The decompression can be performed by a compression module (for example, element 416 of FIG. 4A).

At step 454, data received is saved in a database on the computer device (e.g., a server). Also saved on the server data is big data information, which can be used to facilitate in-depth information extraction and deep knowledge learning.

At step 456, existing information/knowledge in the received data can be unpackaged. For example, expression model parameters can be transformed into the expression information. In another example, a background number can also be transformed to selected background scene, e.g., previously selected by a user of the device sending the data. In some embodiments, gesture model parameters can be transformed into hand and arm positions and shapes, and vice versa. As disclosed, the functions at this step can be performed by a representation module (e.g., element 160 of FIG. 1B and element 414 of FIG. 4A.)

At step 458, unpackaged existing information/knowledge associated with the audio, video, sensor data from the previous step can be reconstructed with one or more data parameters, which often involves one or more types of transformation. For example, user facial expression information, gesture information, and body movement information can be reconstructed along with user's audio information and user's sensor information together. In some embodiments, the reconstructed data can be included in intensive intelligence understanding, for example, at step 462.

At step 460, Big Data material can be accessed for subsequent processing. In some embodiments, Big Data material can be retrieved in real-time. In some embodiments, Big Data material can be saved in a database on the computer device. In some embodiments, the received data from steps 452 and 454 can also be saved in the database. In some embodiments, the received data and Big Data material can be used in subsequent processing; e.g., for in-depth information extraction and knowledge learning.

At step 462, more intensive intelligence understanding based on the constructed information/knowledge, received data, and Big Data can be carried out according to one or more user preferences and/or system settings. Here, more complete and in-depth intelligence understanding can be made possible by leveraging the availability of Big Data and high computation power of a device such as a server. Here, new information can be extracted based on existing information from the previous augmented data at step 462-1. Similarly, at step 462-2, new knowledge can be learned based on existing knowledge associated with the previous augmented data. For example, for an intelligent communication application, an intelligence information digestion unit (e.g., implemented as element 140 of FIG. 1B or element 4108 of FIG. 4A) can determine the user intent, the user's emotion status (happy, sad, pain, normal, etc.), or the user's behavior status (normal, abnormal, etc.). In another example, for a remote medical diagnosis application, the intelligence information digestion unit can have an in-depth analysis of the user health status based on the current information and past information and other health information in healthy and diseased populations. In yet another example, for an international business communication application, the unit can provide intelligence information to mitigate the culture difference: e.g., if a Japanese user avoids eye contact during the communication, the unit can provide the non-Japanese user that this is a sign of respect in Japanese culture to avoid eye contact. At the same time, the system can provide the Japanese user that it is American culture to have eye-contact during communication. In still another example, the system automatically alerts a user if an improper language has been used during the business meeting that may be perceived offensive under the particular culture settings for another user included in the communication. As a form of remedy or mitigation, the system can allow the user or another user (e.g., a supervisor having superior control rights over the communication) to stop transmission of the offensive content.

In some embodiments, the intelligence information digestion unit can also perform automatic language translation and behavior translation. For example, it can automatically translate English into Chinese, and vice versa. It can also automatically translate an American user's "hi" into a behavior such as a "bow" for a Japanese user, while translating a Japanese user's bow into a "hi" or other form of greetings. In multi-party group communication, the same language or behavior can be translated into different forms based on the cultural background of other participants of the communication.

At step 464, a knowledge/information based augmentation unit (e.g., implemented as element 150 of FIG. 1B or element 412 of FIG. 4A) can augment the received data and additional AR input data (e.g., 464-1) by applying the information and knowledge learned from step 462. Here, augmentation of data can also be performed by leveraging the availability of Big Data and high computation power of a device such as a server. In some embodiments, step 464 applies machine learning and pattern recognition methods to perform intelligent data augmentation. For example, after transforming the American user's Hi into a "bow" in previous step, the augmentation unit would augment the gesture, body movement and user's expressions to perform the "bow," for example, using an avatar representing the American user. For example, during augmentation, a 3D model of the user can be built and used a 3D scene of the user bowing in greeting.

At step 466, a data representation unit translates the augmented information data into data parameters representing different types of data (e.g., text, numbers, matrices, images, signals, etc.). As disclosed herein, the data representation unit can be implemented as, for example, element 160 of FIG. 1B or element 414 of FIG. 4A.

At step 468, a data compression unit compresses the transformed data to achieve optimal compression rate while preserve the data integrity and etc. As disclosed herein, the data compression unit can be implemented as element 160 of FIG. 1B or 416 of FIG. 4A.

At step 469, a data transmission unit transfers the compressed data to one or more proper receiver units using proper communication protocols. In some embodiments, the compressed data can be transferred to back to the sender device. The data transfer unit can also encrypt the data for secure transmission needs. Although not illustrated previously, one would understand that a data transmission unit can be implemented on either a user device or a server, utilizing the functionalities of, for example, network communication module 118 of FIG. 1B.

As disclosed herein, each of the steps can itself be an iterative process including many round of analysis or processing. As such, many of the steps can be carried in real-time concurrently in parallel processes. For example, saving data (e.g., step 454), accessing Big Data (e.g., step 460) and unpacking of the received data (e.g., step 456) can take place at the same time. Also, for example, as soon as some information is extracted at 462-1, knowledge learning at 462-2 can be started while continuously receiving additional information that is be concurrently extracted.

In some embodiments, all aspects of data processing can take place in one device via a secure processor and a secure channel, with a secured storage including encryption to ensure data security. In some embodiments, part of the data processing can take place via a secure processor, secure channel, with secure storage including encryption to ensure security while other parts of the processing can take place via a processor, channel and storage with regular security level. In some embodiments, all aspects of the data processing can take place via a processor, channel and storage with regular security level. As disclosed herein, data processing includes processing of raw data, information, knowledge, and beyond.

FIG. 4D depicts an exemplary embodiment for performing data processing on a computer device. Exemplary embodiment 470 comprises numerous steps for performing data processing, information extraction, knowledge learning, data augmentation, data representation, data compression, data transmission and etc. Much of the steps here can be carried out by functional modules described in connection with FIGS. 1B, 3B, and 4A. Here, the computer device can also be a local device or a server, preferably a server.

At step 474, data are received at the computer device from another device (e.g., a user device or an intelligence server). In some embodiments, the received data can be decompressed into one or more proper formats based on the confirmation of the receiver device. If the data are encrypted for secure transfer, the data can be decrypted at this step.

At step 476, the received data (e.g., decompressed/decrypted) can be translated into proper information based on one or more user preferences and system settings. For example, if the computer device does not have 3D display capability, at this step 3D information can be properly transformed into 2D displayable information. In another example, the function of the computer device can be limited such that the bulk of the processing, analysis, and manipulation take place on another device (such as a server). This is suitable when a user prefers a local device having a light capability. Functions performed at this step enable the system to adapt to the specific hardware unit that the user is using. In some embodiments, the computer device here can be a receiver device, forming a full communication cycle with a sender device (e.g., FIG. 4B) and a server device (e.g., FIGS. 4B and 4C).

At step 478, data can be further augmented based on the receiver's preference, receiver device's setting, the characteristics of object/scene on the receiving side, the receiver's interactive control. For example, in a remote medical communication session, the sender is a doctor, and the receiver is a child. The child expresses and understands his health level as the happiness level of his favorite toy bear. The happier the bear is, the healthier he is. The system can augment the health level evaluated by the doctor into the happiness of his toy bear on his hand. For example, a screen can show a happy bear after a healthy routine check-up and offer a bear with a soothing voice to offer comfort when the child suffers from an unpleasant condition such as fever, pain, cough and etc.

At step 480, the method can decide on the format and device by which the augmented information can be presented. For example, this system can decide to use a display to present all image related information and use a speaker to present all audio related information for a blind person. For another example, the system may reconstruct all audio signals into visual signals for a deaf person. In some embodiments, the functionalities here can also be performed by a representation module. In some embodiments, the reconstruction function can be implemented at the previous augmentation step.

At step 482, reconstructed information and knowledge can be translated into proper data with the proper format.

At step 484, visual data can be transformed into the proper format and delivered to; for example, a monitor or screen for display. At step 486, audio data can be transformed into a proper audio format and delivered to, for example, a speaker.

At step 488, sensor data can be transformed into proper control signals and delivered to corresponding sensors. For example, vibration signals can be delivered and cause one or more motors associated with the computer device to vibrate. For another example, the unit transfers the motion control signal can be delivered and cause one or more devices that are associated with the computer device to move.

As disclosed herein, each of the steps can itself be an iterative process including many rounds of analysis or processing. As such, many of the steps can be carried in real-time concurrently in parallel processes. For example, data un-package and delivery at steps 484 through 488 can take place at the same time. In fact, in some embodiments, the delivery of the data must be coordinated in timing to create certain desired effects. For example, the visual and audio data of a person saying Hi should take place at the same time when a handshake sensation is delivered. Also, for example, as soon as some data has been augmented at step 478, data reconstruction and/or data representation at steps 480 and 482 can be started while continuously receiving additional data from step 478.

In some embodiments, all aspects of data processing can take place in one device via a secure processor and a secure channel, with a secured storage including encryption to ensure data security. In some embodiments, part of the data processing can take place via a secure processor, secure channel, with secure storage including encryption to ensure security while other parts of the processing can take place via a processor, channel, and storage with a regular security level. In some embodiments, all aspects of the data processing can take place via a processor, channel, and storage with a regular security level. As disclosed herein, data processing includes processing of raw data or user input data, information, knowledge, and beyond.

As disclosed herein, intelligent, iterative and interactive processing can take place on multiple devices simultaneously to facilitate AR-based communication. On each device, the user can set user preferences concerning privacy, a preferred language, and a preferred data format or setting). Data are transmitted between user devices, directly or via an intermediate server device. Received data can be represented for optimized effects on the receiving device.

FIGS. 5A-5C illustrate intelligent learning of data can take place in an iterative manner. Here, the data include input data, partially processed data, extracted object or scene, even AR input data (not known illustration).

FIG. 5A depicts an example process for generating AR-based real-time data (e.g., image data). Exemplary embodiment 500 illustrates how real-time image data is processed in real-time via error compensation and adaptive learning before an object or a scene is extracted and subject to further processing. In particular, the real-time adaptive learning can be based on any intelligent learning and processing methods disclosed herein. Intelligent learning can take place in real-time and be iterative and interactive. In some embodiments, embodiment 500 also illustrates how the real-life objects and human objects are extracted in parallel in order to perform more accurate extraction of human objects while reserving more accurate relations between human objects and general objects extracted in real-time. The extracted and further processed data are then combined with AR input data to generate AR-based real-time image data based on projection parameters. Here, three separate kind of learnings were processed for human objects: one is performed at step 552, where human objects were treated as general objects; the second is performed at step 556, where specially designed human objected based learning and process is performed; the third is performed at step 558, where human gesture, body movement, and facial expression were learned and recognized. In projection process at step 536, the extraction data are fused and integrated into the projection process.

At step 502, image data is captured in real-time, for example, by a data capturing module 58 using a camera device. The captured image data can be saved in a local database or directly passed onto different functional module for processing. In some embodiments, the capture being captured comprises additional types of signals such as audio data or sensor data.

At step 504, the captured data undergo processing to improve data quality. At this step, data undergo special processing to compensate for errors. For example, a 3D camera may not provide accurate in depth information about dark colored objects. In another example, a 3D camera may not provide accurate in depth information about fast moving objects. Sometimes, depth-related errors can result in unknown depth value. Sometimes, errors can result in dramatic depth value variation from one pixel to another (or from one small group of clusters to another) in the region. In some embodiments, the processing at this step is carried out by an error compensation module. For example, the error compensation module can detect the camera depth errors based on these characteristics and then compensate the depth errors by bridging the gaps based on object characteristics, region continuity characteristics, or object moving characteristics. For example, some infrared cameras camera may not provide accurate data for a bright reflectance object. As a result, the image heat map can have unknown values or randomly value changing areas. The error compensation module can compensate the infrared information based on object characteristics or region continuity. For example, some RGB video cameras can have dramatic color/intensity change when the cameras sense some environmental light changes and perform automatic dynamic color/intensity adjustment on output images. However, the inconsistency of color/intensity in consecutive time-images often can result in errors in extraction. At step 504, the error correction module can detect this kind of camera errors via time-continuity of the data. The error correction module can compensate this kind of camera errors by compensating the unnecessary changes due to the automatic camera dynamic range change based on the scene characteristics and time and special-based continuity.

In some embodiments, the error compensated images can be used as references for further real-time object learning. Note the error compensation results would not change the original real-time data. Rather, the error compensated images are saved as a separate set of data. In some embodiment, error compensated images can be used as middle transitory results for the next iterative processing and are not saved in the system permanently. The purpose of this step is mainly data quality compensation; for example, by compensating false, inaccurate or faulty data to improve subsequent processing.

At step 510, data from the processing step 504 can be subjected to real-time adaptive learning. Real-time learning can include multiple aspects; such as object learning 512, object recognition 514, or segmentation 516.

At step 512, real-time object learning methods are applied to learn characteristics of the real-time data to detect objects and scene in real-time. In some embodiments, the processing at this step is carried out by a real-time intelligent learning module. For example, real-time learning comprises identifying boundaries between the object and its environment, based on their differences in relative locations within the image, contrast, light, color, thermal properties, and etc. In some embodiments, image data are collected using a depth-enabled camera and the depth information is used to divide the object into background and foreground for real-time learning. From there, the real-time learning module can learn about the object changes across the consecutive time line. In some embodiments, a depth-based approach can be acquired through 3D camera depth information. In some embodiments, using consecutive video images can construct 3D depth of the objects. In some embodiments, the real-time learning module can learn about the key feature points in the real-time data and from the key feature points to learn about the object characteristics. Example key-feature points/lines/region-based learning includes but is not limited to SIFT (scale-invariant feature transform) approach or SIFT-like approaches (e.g., SURF (speeded up robust features), Gabor feature points, etc.) Another example key feature points and line feature-based approach is SLAM (simultaneous localization and mapping) or SLAM-like approaches. In some embodiments, deep structure learning can be used. Sometimes, it can be challenging to interpret what is learned, what characteristics are more prominent, and/or how the learned characteristics would reflect the physical characteristics of an object using the deep structure learning approaches. As disclosed herein, the learned parameters are called learned object characteristics. In some embodiments, multiple recognition methods can be combined to improve the recognition results.

At step 514, the processed image data can be analyzed for object recognition. Steps 514 and 512 differ in that only object characteristics are learned at step 512, while at step 514, the learned object characteristics from step 512 are analyzed (e.g., classified, clusters, and/or recognition. Note in some embodiments, step 512 and step 514 can be combined to constitute object learning and recognition process or just simply called object recognition process.

As disclosed herein, object recognition at step 514 comprises separating an object (including a person) from the environment. In some embodiments, object recognition includes group multiple regions to be a candidate object area based on matching the data characteristics with the object characteristics. In some embodiments, characteristics learned at step 512 can be used to match the potential data to candidate objects for object recognition. For example, SIFT or SIFT-like feature points can be used to recognize objects. In some embodiments, simple region-based separation along with unsupervised learning can be used to perform object matching between consecutive-time images. In some embodiments, SLAM or SLAM like features can be used to match objects in the real-time data. In some embodiments, object recognition can include detection of human objects. In some embodiments, object recognition can also include associating certain characteristics with body parts of the person. For example, hands of a person can often associate with movements and tend to interact with other objects/people and the environment. As such, outlines of the hands are more likely to form boundaries of a person, in contrast to other body parts such as face, chest, or torso. In some embodiments, offline data (e.g., existing patterns of known objects) are used to facilitate object recognition. In some embodiments, infrared camera or near-infrared camera can be used to provide heat map-like image of the real-time data, which can provide information to separate human objects from environment projects since human objects often have a range of temperature, and human skins have special infrared or near-infrared light absorption/reflectance characteristics that can be used to separate human objects from other objects. At the same time, different kinds of objects may have different characteristics under infrared or near infrared light, which can be used to match the data characteristics acquired in real-time with object characteristics. In some embodiments, deep structure learning can be used in object recognition. In some embodiments, multiple recognition methods can be combined to improve the recognition results.

At step 516, the processed image data can be subjected to segmentation processing. For example, objects/people from the real-life environment can be segmented into portions or sections in real-time based on recognition results and/or pre-set criteria. For example, the pre-set criteria can include but are not limited to user preference, system default settings, and/or real-time learned criteria based the interactive feedback from the user. For example, it is possible to obtain recognized a human object at step 514. Segmentation can help prioritize analysis of data. For example, portions or sections that include a complete dark background can undergo quick cursive analysis, while the portions or sections including an object of interest would undergo more precise and detailed analysis.

In some embodiments, real-time adaptive learning 510 is an iterative and an interactive process. In some embodiments, learning results from a prior time point can be applied to a subsequent time point. In some embodiments, learning results from one aspect can affect the outcome of another aspect of the analysis.

In some embodiments, steps 502 through 520 can occur in parallel and affect each other's results. Additional details concerning iterative and interactive aspect are depicted in FIG. 5B and will be described in subsequent part of the disclosure.

The image error compensation block 504 will use the real-time learning result from the block 510 to compensate the camera error. At the same time, the image error compensation result can be used in object learning step 512, recognition step 514, and segmentation step 516. In some embodiments, the camera error correction step, object learning step 512, object recognition step 514, and segmentation step 516 can also be included into the same iteration process. For example, at iteration N, camera error correction can be the status N. This corrected result can be used in next iteration learning of step/process 510 and to provide (N+1)th learning status for the camera correction in (N+1)th iteration to generate the camera error correction status N+1. In some embodiments, camera error correction step 504 can be included a iteration process different from the object learning step 512, object recognition step 514, and segmentation step 516. For example, at iteration N, camera error correction can be the status N. This corrected result would be used in next X iterations of learning (X>1) of 510 and to provide (N+1)th learning status for the camera correction in (N+1)th iteration to generate the camera error correction status N+1. For another example, at iteration N, camera error correction can be the status N. This corrected result can be reiterated within the camera error compensation step for another Y iterations (Y>1) and output the N+Y iteration results for Real-time adaptive learning 510 in next X iterations of learning (X>=1) at step 510 and to provide next learning status for camera correction.

In some embodiments, object learning step 512, recognition step 514, and segmentation step 516 are focusing on learning the characteristics of the background environment.

At step 552, an object or scene can be extracted from the processed and learned image data. For example, a real life object can be extracted from images by separating image information of the real life object from its actual environment, based on a comprehensive characteristic-based mechanism, including artificial intelligence based mechanisms. The comprehensive characteristic-based mechanism recognizes one or more differences between a particular characteristic the real life object and that of the actual environment. For example, a characteristic can include and is not limited to a visual characteristic of the real life object or the actual environment captured in the images, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic. In some embodiments, step 552 and step 516 can differ significantly. For example, step 552 attends to much more details of the boundaries of extracting objects to ensure the extraction accuracy; for example, by taking into consideration boundary characteristics, region continuity, extraction parameters and etc. Step 556 can also differ from step 516; for example, in some embodiments, step 556 attends to much more details of the boundaries of extracting human objects to ensure the extraction accuracy by taking a lot of consideration of the human boundary characteristics, human region continuity, and the human extraction parameters. In some embodiments, step 552 and step 556 can differ significantly. For example, the method at step 556 focuses on human object characteristics and performs the learning, error compensation and extraction at a much more detailed level based on specially learned human related characteristics such as body, head, face, hair, hand, and etc.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. In some embodiments, a real-time learned characteristics may not be easily mapped to object physical characteristics due to the nonlinearity of the learning process, especially when deep structure learning approaches were used.

An extraction process as disclosed herein can be completed in one round or in multiple rounds. For example, rough extraction can trace an outline of the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, the objects/scene are extracted at step 552 based on extraction parameters that can be from a pre-defined user preference or system setting, such as objects within certain depth region, objects located within certain spatial areas, objects with certain characteristics, certain kinds of objects, certain objects, objects with certain relationship to the human object(s) in real-time data, etc.

In some embodiments, fine extraction can go to sub-pixel level. In some embodiments, edge detection was performed in proper separating the object boundaries. Example edge detection methods are Sobel edge detection, Canny edge detection, fuzzy logic-based edge detection methods, etc.

In some embodiments, the object extraction is based on the subtraction of the extraction of the learned background environments at step 510. In other words, in these embodiments, the adaptive learning in step 510 can be focused on learning the background environment (scene), and the step 552 is first to extract the background environment based on the learning results at step 510 and then subtract the real-data from the extracted background environment to get the extracted object areas.

Note, at step 552, the object can include one or more human objects. However, since step 552 uses generalized learning approach (or one-for-all extraction approach), the extracted human object can often be very rough and does not satisfy the accuracy requirements.

At step 556, the extracted data are further processed to recognize more detailed features such as face, body parts of human objects. Here, offline data of known features of human objects can be used. In some embodiments, face and/or body parts detection is based on object recognition results. In some embodiments, step 556 and step 552 can differ significantly. For example, the goal of step 556 is to focus on human objects extraction treatment. As disclosed herein, both step 556 and step 552 can have access to the original real-time data and adaptive learning results. However, step 556 would apply image error compensation to human objects. It can be understood that step 552 can include a one-for-all extraction method for all objects; while a much more refined and much more focused human object extract method is implemented at step 556. To further ensure the accuracy of human object extraction, the extraction of each part of the body of the human object can be treated differently at step 556 based on characteristics of each human object part and needs for image error compensation. For example, for face/head, hair is often the most challenging part in extraction. For example, hair characteristics including hair boundary characteristics are specially weighted in the extraction process of human head. Furthermore, the image error compensation results in the learning process would especially emphasize in human hair related error compensations. For another example, compared to hair, human hands are another challenging part for accurate extraction. This is often due to the fast movement of hands. In some embodiments, the image error compensation results in the learning process can especially emphasize in motion-related compensation. The much detailed learning and extraction of special human body part disclosed herein are far superior to the existing one-for-all extraction approaches. As a results, the method and system disclosed herein are much more accurate and much faster in processing to satisfy demand for speed and accuracy in the real-time holographic AR communication.

At step 556, one or more human objects are extracted based on human object extraction parameters that can be from a pre-defined user preference or system setting, such as human objects within certain depth region, human objects located within certain spatial areas, human objects with certain characteristics, certain kinds of human objects, certain human objects, objects with certain relationship to the human object(s) in real-time data, etc.

At step 558, the real-time data are subject to analysis for gesture and body language recognition, including facial expression. At step 558, the original real-time data, the adaptive real-time learning results from step 510, and the image error compensation from 504 can all be accessed. Body language is often related to certain cultural background. Here, additional information relating to cultural background are needed for interpretation of body language. For example, a person from India shakes her head when in agreement with someone. In some embodiments, recurrent neural networks are used to learn and recognize the gesture and body language. In some embodiments, time and spatial domain feature-point based approaches were used to learn and recognize the gesture and body language. Example feature-point based approaches are SIFT, SURF, HOG (histogram of oriented gradients), etc. In some embodiments, face/body parts extraction results from step 556 were used to improve the gesture and body language learning and recognition.

In some embodiments, the result of the gesture and body language recognition from step 558 was used to further refine the extraction of face/body parts of one or more human objects in step 556.

At step 530, movement and/or projection information is further interpreted from the processed image data such as the gesture and body language recognition information (e.g., obtained at step 556). The movement and/or projection information can be used to define relations between an extracted object and AR input data received, e.g., at step 532). In other words, at step 530, human behavior elements are analyzed to prepare the system to accept the interactive control and feedback from the users. In some embodiments, the interpretation can include matching the gesture, and/or body language (including facial expression) with system recognizable gestures and/or body languages to interpret their meaning. In some embodiments, artificial intelligence approach can be used to gradually learn and understand user behaviors to have intelligent interpretation of the human behaviors. In some embodiments, confirmation is requested from the user by the system after each interpretation to ensure the accuracy of interpretation and/or perform enforcement-based learning.

At step 532, AR input data are received. As disclosed, the AR input data can include a virtual environment, an altered version of the actual environment or scene, a person or object, or any other data that is not part of the data or signals that are being captured in real-time. In cases where the AR input data are unrelated to the data or signals that are being captured, step 532 is independent from other processing steps and can occur before any of steps 502 through 530. Here, the AR input data can be system pre-generated image, video, 3D data, etc. It can also be data sent from another computer/camera.

At step 534, projection input data can be received based a user preference or system setting. In some embodiments, projection parameters can be depth-related, for example, the parameters can provide absolute or related depth-relations between the extracted objects, the human objects, and AR input data. In some embodiments, the extracted objects, the extracted human objects, and AR input data can have their own internal depth information. In some embodiments, the project parameters can include transparency relations, through which transparency parameters are set for the extracted object, the extracted human objects, and the AR input data. In some embodiments, the projection parameters can include positional relation-based approach, where it sets the absolute or related spatial relations along with scales of the extracted objects, the human objects, and AR data. In some embodiments, the projection parameters can include a visual relation-based approach. In some embodiments, the approach sets the absolute or related visual projection relation between the extracted objects, the human objects, and AR data based on different view perspective. In some embodiments, the projection parameters can include human interactive control information from step 534. In some embodiments, the projection parameters can include combination of two or more above parameters.

At step 536, information extracted from real-time data is integrated with the AR input data to generated 2D/3D and still/time series data projection based on the projection parameters. Here the projection is obtained by projecting the input data along with the extracted data into the space based on the pre-set system criteria, real-time learned movements/projection information, or interactive control commands from the gesture/body language. For example, a novel 3-layer based pixel-by-pixel projection approach is developed to project the objects to the camera view very fast (see, for example, FIG. 3E).

At step 538, integrated or projected data are produced. As disclosed herein, the process illustrated in FIG. 5A occurs in real-time and continuously. It would be understood that outputting step 538 also takes place in real-time and continuously, such that original data captured at step 502 are processed and presented in real-time and continuously.

In some embodiments, the extracted objects and human objects output at step 538 can also be used as input to the next iteration of learning in step 510. In some embodiments, also outputs the background environment can be provided at step 538; for example, by subtracting of the extracted objects and human objects from real-time data and use it as input to the next learning in step 510. In some embodiments, step 538 can output the learned background environment based on accumulative learning continuously as starting material for step 510 of the next iteration of learning. Many different learning methods can be used. In some embodiments, a learning method can be simple weighted-addition of previously learned background environment and newly learned background environment. In some embodiments, deep learning can be applied.

FIG. 5B depicts example steps and system of iterative real-time learning for generating AR-based real-time image data. Exemplary embodiment 540 illustration data learning from when real-time data are first received at step 542 to when object results are output at step 576.

At step 542, real-time data are captured at the beginning of a real-time iterative learning process. The captured data can include but are not limited to audio, visual and sensor data.

In some embodiments, camera error compensation step 544, data processing step 546 and object processing step 248 can collectively form the initial real-time data processing stage 550. For example, during object processing step 548, depth-result can be used to roughly separate the objects into background and foreground. In some embodiments, possible errors in the depth separation can be detected and subsequently corrected, based on known depth characteristics. In some embodiments, an object or scene can be divided into segments and characteristics of the object or scene can be learned separately from the segments based on the color/intensity characteristics. In some embodiments, an object or scene can be divided into segments and characteristics of the object or scene can be learned separately from the segments based on the difference of infrared light response. In some embodiments, an object or scene can be divided into segments based on the learning results.

In some embodiments, an object processing module is used to implement object processing, in particular human object processing. The object processing module can extract a real life object from images by separating image information of the real life object from its actual environment. Separation is achieved based on information from a real-time learning module. In some embodiments, raw images captured by data capture module 126 are used. In some embodiments, images captured by a data capture module are first processed to improve data quality (e.g., through noise reduction by a data processing module). As disclosed herein, object extraction can take place concurrently with data processing, error compensation, real-time learning while image data are being continuously collected.

The extraction utilizes a comprehensive characteristic-based mechanism, including artificial intelligence based mechanisms. The comprehensive characteristic-based mechanism recognizes one or more differences between a particular characteristic of the real life object and that of the actual environment. For example, a characteristic can include and is not limited to a visual characteristic of the real life object or the actual environment captured in the video clip, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. The learning method can include linear regression, decision tree, support vector machine, K-nearest neighbors, K-means, Bayes network, logistic regression, feature point-based learning, neural network, hidden Markov chain, or combinations thereof. The learning can be supervised, partially supervised, or unsupervised.

In some embodiments, deep structure learning with multiple hidden layers can be used. The deep learning can be supervised, partially supervised, or unsupervised. Exemplary deep structure learning methods can include but are not limited to deep neural networks, deep belief networks, recurrent neural networks, hybrid of these deep structures, and hybrid of the deep structures with other pattern recognition methods. Due to its deep structure and highly non-linear characteristics, sometimes it is challenging to interpret what was learned, what characteristics are more prominent, how the learned characteristics would reflect the physical characteristics of an object. Here, learned parameters from the deep learning are also referred to as object characteristics.

An extraction process as disclosed herein can be completed in one round or in multiple rounds. In some embodiments, object processing module 134 performs a round of rough extraction first before carrying out one or more additional rounds of fine extraction. For example, rough extraction can trace an outline of the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, an object processing module can combine extracted object information with augmented reality input data to generate real-time AR-enhanced data content. As disclosed, the AR input data include virtual reality information or information that is processed from the data captured. The process for combining the extracted information with AR input data will be explained in more details in connection with FIGS. 5A and 5B. In the case of image data, the combination process is also called image integration. In some embodiments, a user device comprises a separate integration module. As illustrated in detail in connection with FIG. 3E, integration can occur on a pixel-by-pixel basis for both efficiency and accuracy.

In some embodiments, the object processing module can create and modify the AR input data (e.g., a virtual environment) for subsequent image integration. For example, the object processing module can construct a virtual environment based on one or more images stored in a local database. The object processing module can also receive a pre-constructed virtual environment from a server via network connection. The virtual environment can be two-dimensional or three-dimensional. A virtual environment can include features that are not present in the images on which the virtual environment is based. For example, the object processing module can alter or adjust one or more elements in the virtual environment by modifying the corresponding images. In some embodiments, such modifications or adjustments are made based on one or more features of the real life object such that the extracted real life object and virtual environment can be more effectively integrated. An exemplary modification or adjustment includes but is not limited to scaling, change of orientation, change of shape, change of color, image quality adjustment (e.g., exposure, brightness, shadow, highlight, or contrast), and etc. The modification or adjustment can be made locally on individual elements within the virtual environment or globally on the entire virtual environment. In some embodiments, a virtual environment can be different from the actual environment. In some embodiments, a virtual environment can be the same as the actual environment with one or more elements in the virtual environment being modification for subsequent image integration.

As disclosed herein, processes can take place simultaneously on multiple functional modules. The results from one particular step can affect the results of one or more other steps. For example, information (e.g., data or results of analysis) can be shared among a data capturing module, a data processing module, a real-time intelligent learning module, an error compensation module, and an object processing module. For example, after error compensation, image data obtained by the data capturing module affect the results from the real-time learning module, which can then affect the results from the objection processing module. For example, results associated with object learning, recognition, and segmentation can be improved due to improved image quality, which will improve the quality of object extraction.

In some embodiments, these steps can occur in an iterative manner until pre-defined criteria are met. For example, step 550 will be completed once a processing error falls below a threshold value, indicating convergence of processed data. Such data refinement techniques are widely known in the field. Additional details concerning error compensation, data processing and object processing (including e.g., object learning, object recognition, and segmentation) can be found in description in connection with FIGS. 1B and 5A.

At step 552, real-time learning results (used interchangeably with the term "learning results" unless otherwise noted) are produced. In some embodiments, output object results are not created at the initial stage of real-time real-time/processing until a threshold is met. The threshold can be a time limited. For example, output object results can be generated after data collected over about half second have been subjected to real-time learning. The time limitation can be arbitrarily set by the system or a user, for example, from seconds to minutes or tens of minutes. In practice, the system/method can include an initial calibration step before augmented data are generated and transmitted. In some embodiments, information learned during the initial calibration step can be saved and used to optimize subsequent operations, including, for example, to shorten the calibration step for the next real-time communication session using the methods/system disclosed herein.

At step 558, the system continues to receive data in real-time (e.g., at time point Tn).

At step 560, real-time learning steps (e.g., image error compensation step 562, data processing step 564, and object processing step 566) are applied to the data received at step 558. As disclosed herein, image error compensation step 562, data processing step 564, and object processing step 566 can take place in parallel, and results from one step can affect the outcome of one or more other steps and occur in an iterative manner. Additional details concerning error compensation, data processing and object processing (including e.g., object learning, object recognition, and segmentation) can be found in description in connection with FIGS. 1B and 5A.

At step 554, previously learning results are applied to real-time learning step 560; for example, in any of image error compensation step 562, data processing step 564, and/or object processing step 566.

At step 556, offline learned object data (e.g., data for human identification) can be applied to real-time learning step 560; for example, in any of image error compensation step 562, data processing step 564, and/or object processing step 566. Additionally or alternatively, a predefined user preference or system setting can be applied to real-time learning step 560. In some embodiments, during error compensation 562, possible errors in the depth separation can be detected and subsequently corrected, based on known camera characteristics. During data processing 564, noise reduction is applied. During object processing step 566, depth-result can be used to roughly separate the objects into background and foreground. In some embodiments, during object processing step 566, an object or scene can be divided into segments and characteristics of the object or scene can be learned separately from the segments.

In some embodiments, real-time learning step 560 can occur iteratively. For example, step 560 will be completed once a processing error falls below a threshold value, indicating convergence of processed data. Such data refinement techniques are widely known in the field.

In some embodiments, at real-time learning step 560 the extracted object and human object information is received from the previous time step and used for learning at this step. In some embodiments, at step 560 the background environment information is received from a previous step or time point and used for learning of the background information and object information at the current step.

At step 570, updated learning results are produced. As disclosed herein, the updated learning results are derived from previous learning results (e.g., at time point Tn−1) and offline learned object data (e.g., data for human identification). In some embodiments, learning results are updated by using both the current learning result and previous learning results (e.g., at time point Tn−1). In this way, noise impact to the learning result can be mitigated. At the same time, the system can better adapt to changes.

At step 572, the updated learning results are used to facilitate extraction of object or scene. As disclosed in FIGS. 1B and 5A, any or all of object learning, object recognition, and segmentation can be applied during the extraction. In some embodiments, additional information such as a user preference or system setting can be applied for the extraction of an object or a scene. In some embodiments, depth-based separation results are also used during object processing 572.

At step 574, the system checks if data are being collected at the next time point, if more data are being received, the method returns to step 558 to restart real-time learning and processing.

When no more data are being received, the method ends at step 576. In some embodiments, final object results are produced to conclude the method.

FIG. 5C depicts an overall example process for generating AR-based real-time image data. Exemplary embodiment 580 outlines key steps 582 through 598, most of which have been described in detail in connection with FIGS. 1B, 5A, and 5B.

At step 582, data (e.g., image, sound and/or sensor data) are received in real-time.

At step 584, the real-time image data are processed to improve data quality, for example, via noise reduction.

At step 586, real-time object learning is carried out; for example, through object learning, object recognition, and segmentation.

At step 588, both hardware and software adjustment such as camera and image error compensation can be performed based on the results from steps 584 and 586. In some embodiments, error compensation can be performed for software component as well. For example, depending on the initial learning results, the system may increase or decrease the duration of the calibration step (e.g., step 552 in FIG. 5B), depending on the calibration outcome.

At step 590, an object or a scene is extracted from the processed data based on real-time learning results and additional information (e.g., previous learning results, offline data, user preferences or system settings). In some embodiments, depth-related information in the image data can be used to roughly separate an object from its background.

At step 592, the extracted object or scene is subject to further processing; for example, such as those disclosed in steps S556 through 530 in FIG. 5A. Additional details can be found, for example, in description in connection with object processing.

At step 594, processed object or scene is combined with AR related input data. As disclosed herein the AR input data can be related or unrelated to real-time image data. Combination or integration of these two types of data, along with other additional data such as additional audio or text data for translation or advertisement related data), can be performed as disclosed in connection with FIG. 5A. A multi-layered and pixel-by-pixel integration process is described in detail in connection with FIG. 3E. For example, depth-related information in the image data can be used to roughly separate an object into multiple layers: partly into the background and partly into the foreground.

At step 596, real-time data projection/integration is carried out. In some embodiments, the projected data are transferred in real-time to another device (e.g., a user device or a server).

At step 598, when the system stops receiving real-time image data, the process is terminated.

Figure 6A:
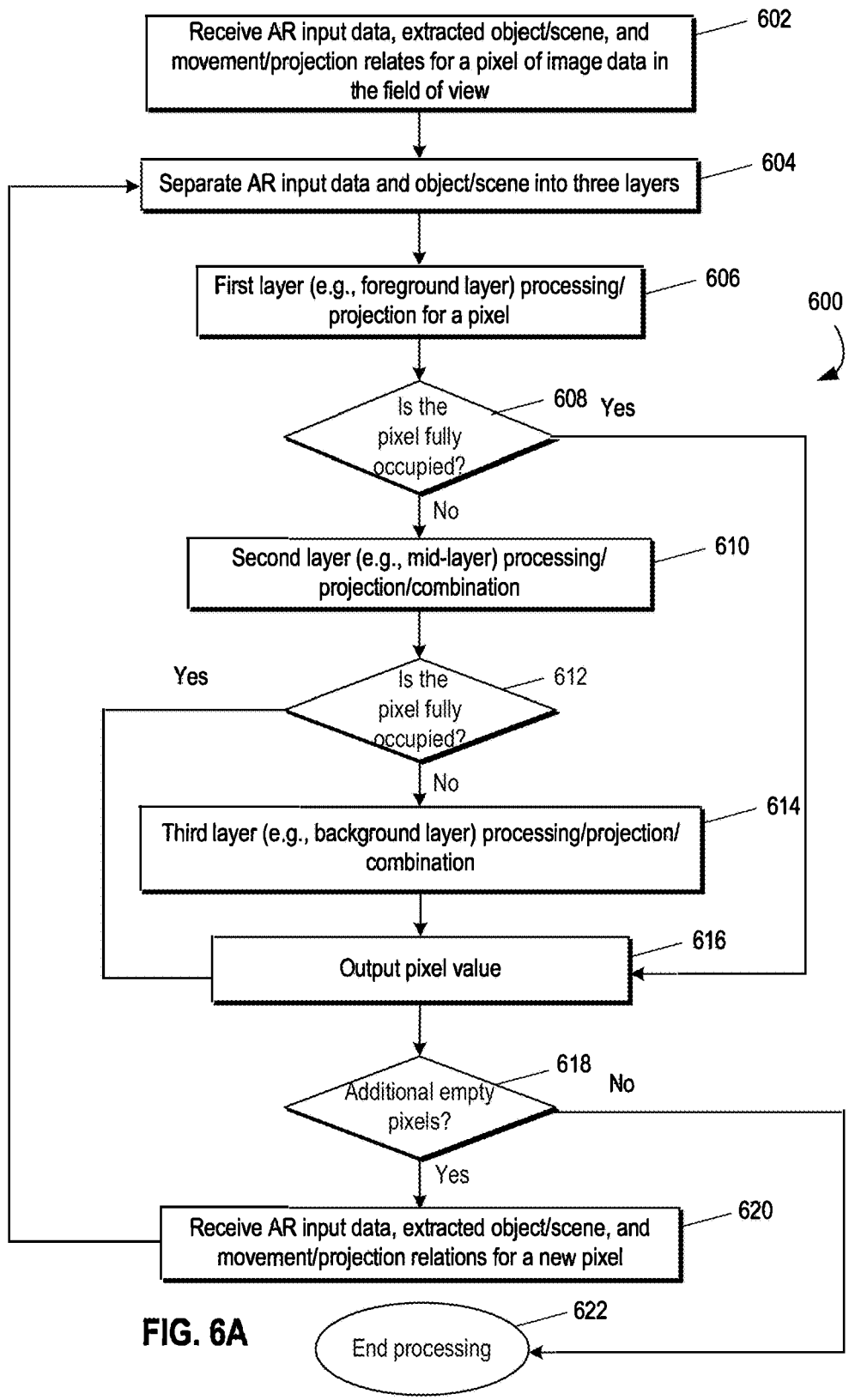
FIG. 6A depicts a sample process of multi-layered data integration.
Figure 6B:
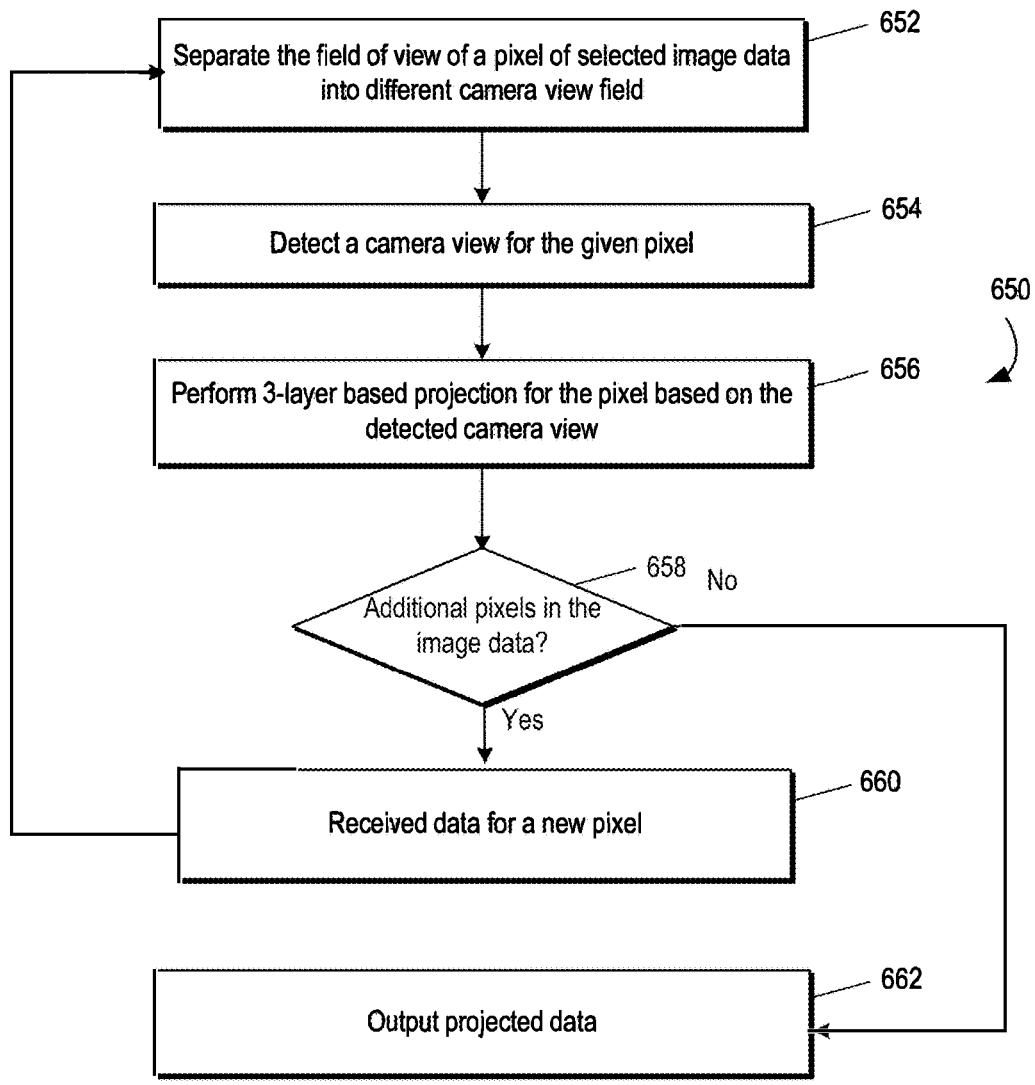
FIG. 6B depicts a sample process for creating real-time projected data with different perspective views.

FIGS. 6A and 6B provide additional details to illustrate the multi-layered integration process shown in FIG. 3E.

FIG. 6A depicts example steps for generating AR-based real-time image data from extracted data and AR input data. Exemplary embodiment 600 shows how extracted object or scene data and the AR input data are separated into multiple layers (e.g., 3 layers) and integrated/projected via a pixel-by-pixel process. The functionalities described herein can be performed by, for example, an object processing module.

At step 602, the AR input data and extracted object/scene for a field of view are received. Also received are movement/projection relations (e.g., as described in connection with FIG. 5A) that define the relations between corresponding pixels in the extracted object/scene and the AR input data.

At step 604, the AR input data and extracted object/scene are separated into three layers. In some embodiments, the separation takes place in a pixel-by-pixel process. In some embodiments, the separation takes place by groups of pixels. For example, in a certain group of pixels, the AR input data are mostly separated into the foreground layer. In another group of pixels, the extracted object/scene can be separated into the foreground layer.

At step 606, integration/projection begins with the first layer (e.g., the foreground layer for a pixel. For example, the AR input data and extracted object/scene for the particular pixel are allocated based on the integration relations to fill the pixel. In some embodiments, the total occupancy in a pixel is defined as 1. In some embodiments, occupancy is defined as opacity.

At step 608, the system examines whether the particular pixel is fully occupied. If it is, the method skips ahead to step 616 and produce a complete pixel output. In some embodiments, if the pixel from foreground or foreground combination has an opacity of 1 (i.e., alpha=1), the pixel will be considered fully occupied. The processing would skip to step 616. If the pixel is not fully occupied (or having occupancy level smaller than 1), the process moves to step 610, which performs integration/projection for the second layer (e.g., the mid-layer).

At step 610, first layer (or foreground) data are combined with second layer (or mid-layer) data.

At step 612, the system examines whether the particular pixel is fully occupied. If it is, the method skips ahead to step 616 and produce a complete pixel output. In some embodiments, the pixel from the foreground and mid-layer combination has an occupancy or opacity of 1 (i.e., alpha=1), the pixel is fully occupied. The processing would skip to step 616.

If the pixel is not fully occupied (or having occupancy level smaller than 1), the process moves to step 614, which performs integration/projection for the third layer (e.g., the background layer). By default, a pixel would be complete after three-layers of integration. At step 616, a complete pixel is produced.

As step 618, the system determines if there are additional pixels remaining empty or incomplete in the particular field of view. If there are, the method continues at step 620 to receive AR input data, extracted object/scene, and movement/projection relations for a new pixel, and goes back to step 604 to restart the integration process.

If there are no empty pixels left, the process ends at step 622.

FIG. 6B depicts example steps for generating AR-based real-time image data from extracted data and AR input data. Here, exemplary embodiment 650 shows how camera view can be implemented for each pixel.

At step 652, for each pixel in the field of view, the field of view the pixel is separated into different camera view field based on, for example, real-time learning results, user preferences, or system settings.

At step 654, the camera view associated with a given pixel is detected and a proper view is assigned to the pixel. Again, the assignment can be based on, for example, real-time learning results, user preferences, or system settings.

At step 656, a multi-layer based real-time projection approach (e.g., FIGS. 3E and 5B) is applied to generate an integrated pixel with a particular camera view.

At step 658, the system determines if there are additional pixels in the image data. If there are no additional pixels, the method skips to step 662. If there are, the process proceeds to step 660.

At step 660, data for a new pixel are received and the method returns to step 652.

Steps 652 through 658 are repeated for the new pixel.

At step 662, completely projected data for the particular field of view are produced.

Note, even though FIG. 5A provides a 2D view of the output image for the convenience of drawing, the description of the projection can be applicable to both 2D and 3D output. In general, a display can be separated into a 2D display and a 3D display. Here the 2D display can include a flat screen display, a curved screen display, or a cubic display. Some 2D screen display can show 3D effects through 3D glasses, or for naked eye. However, these are still called 2D displays in this patent application because viewers are seeing same view perspectives (2D or 3D view). Existing generation of view generation methods commonly performs 3D manipulation, then perform 3D to 2D projection at the display generation step. For the 2D screen 3D view, they just added disparity between left eye and right eye to create synthetic two slightly different 2D views for human brain to construct the 2D. However, this is very ineffective. As disclosed herein when the AR data are processed, they are directly projected based on the view perspective; and as a result, no additional 3D to 2D mapping is necessary. And the 3D manipulation process is greatly simplified. In this way, the current approach greatly simplified the processing and make it work much faster.

When the display is a truly 3D display, e.g., the display can show a cube of pixels and viewers from different angle can see different view perspective simultaneously, the existing generation systems and methods using 3D manipulation and then 2D projection approach would no longer work in this situation because existing processing methods could not provide pixel level resolution suitable for true 3D cube displays. The output disclosed herein can include a 3D pixel cube. The process will be similar as shown in FIG. 5A. Instead of processing pixel in 2D arrays, our system can process the pixel in 3D arrays. In this way, the current approach can support 3D cube-like displays.

Example System Architecture

Figure 7:
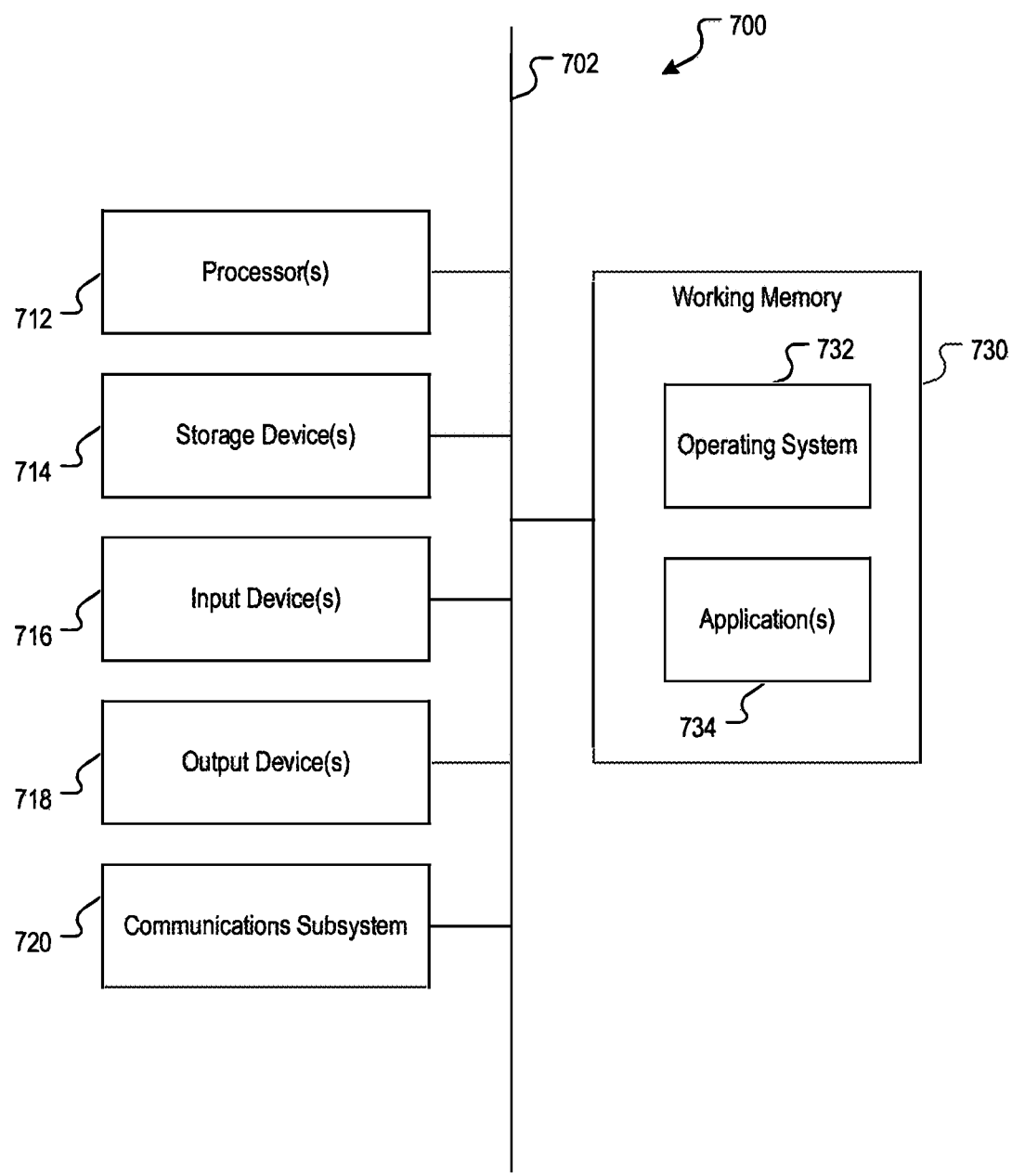
FIG. 7 depicts a diagram of an example system architecture for implementing the features and processes of FIGS. 1-6.

FIG. 7 depicts a diagram of an example system architecture for implementing the features and processes of FIGS. 1-6.

In one aspect, some embodiments can employ a computer system (such as the computer system 700) to perform methods in accordance with various embodiments of the invention. An exemplary embodiment of computer system 700, includes a bus 702, one or more processors 712, one or more storage devices 714, at least an input device 716, at least an output device 718, a communication subsystem 720, working memory 730 which includes an operating system 732, device drivers, executable libraries, and/or other code, such as one or more application(s) 734.

According to a set of embodiments, some or all of the procedures of such methods are performed by the computer system 700 in response to processor 712 executing one or more sequences of one or more instructions (which might be incorporated into operating system 732 and/or other code, such as an application program 734) contained in working memory 730. Such instructions can be read into the working memory 730 from another computer-readable medium, such as one or more of storage device(s) 714. Merely by way of example, execution of the sequences of instructions contained in working memory 730 might cause processor(s) 712 to perform one or more procedures of the methods described herein. Additionally or alternatively, portions of the methods described herein can be executed through specialized hardware. Merely by way of example, a portion of one or more procedures described with respect to the method(s) discussed above, such as method 270, method 300, method 380, method 390, method 430, method 450, method 470, method 500, method 540, method 580, method 600, method 650, and any variations of those illustrated in FIGS. 2-6, might be implemented by processor 712. In some instances, processor 712 can be an example of intelligence module 140 of user device 102. In some examples, application program 734 can be an example of an application performing the iterative real-time learning method depicted in FIGS. 5A and 5B.

In some embodiments, computer system 700 can further include (and/or be in communication with) one or more non-transitory storage devices 714, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices can be configured to implement any appropriate data stores, including without limitation, various file systems, database structures, and/or the like. In some embodiments, storage device 714 can be an example of memory 115 of device 102, local database 204 of user device 220, local database 2244 of user device 240, or server database 254 of server 250.

In some embodiments, computer system 700 can further include one or more input devices 716, which can comprise, without limitation, any input device that allows a computer device (e.g., user device 220 or 240) to receive information from a user, from another computer device, from the environment of the computer device, or from a functional component communicably connected with the computer device. Examples of input devices include but are not limited to a camera, a microphone, or a sensor. Exemplary camera devices include but are not limited to a network-enabled camera, a depth camera, a set of cameras, a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. A microphone can be any device that is capable of detecting and capturing audio signals. A sensor can be any component, module, or subsystem that can detect events or changes in its environment and send the signals to another device (e.g., a computer processor). Exemplary signals include but are not limited to those associated with heartbeat, blood pressure, orientation, temperature, motion, altitude, pressure, proximity, acceleration, and etc.

In some embodiments, computer system 700 can further include one or more input output devices 718, which can comprise, without limitation, any output device that can receive information from a computer device (e.g., device 102, 220 or 240) and communicate such information to a user, to another computer device, to the environment of the computer device, or to a functional component communicably connected with the computer device. Examples of input devices include but are not limited to a display, a speaker, a printer, a light, a sensor device, and etc. A sensor device can receive and exhibit data in forms that can result in sensory perception by a user. Such forms include but are not limited to heat, light, touch, pressure, motion, and etc.

It would be understood that any applicable input/output devices or components, such as those disclosed in connection with user device 220, user device 240, or server 250, can be applied to input device 716 and output device 718.

In some embodiments, computer system 700 might also include a communications subsystem 720, which can include without limitation a modem, an Ethernet connection, a network card (wireless or wired), an infrared communication device, a wireless communication device, and/or a chipset (such as a Bluetooth™ device, an 802.11 device, a WiFi device, a WiMax device, cellular communication facilities, etc.), a near-field communication (NFC), a Zigbee communication, a radio frequency (RF) or radio-frequency identification (RFID) communication, a PLC protocol, a 3G/4G/5G/LTE based communication, and/or the like. Communications subsystem 720 can include one or more input and/or output communication interfaces to permit data to be exchanged with a network, other computer systems, and/or any other electrical devices/peripherals. In many embodiments, computer system 700 will further comprise a working memory 730, which can include a RAM or ROM device, as described above.

In some embodiments, computer system 700 also can comprise software elements, shown as being currently located within the working memory 730, including an operating system 732, device drivers, executable libraries, and/or other code, such as one or more application(s) 734, which can comprise computer programs provided by various embodiments, and/or can be designed to implement methods, and/or configure systems, provided by other embodiments, as described herein. Merely by way of example, a portion of one or more procedures described with respect to the method(s) discussed above, such as the methods described in relation to FIGS. 2-6, can be implemented as code and/or instructions executable by a computer (and/or a processing unit within a computer); in an aspect, then, such code and/or instructions can be used to configure. In some embodiment, a general purpose computer (or other device) can be adapted to perform one or more operations in accordance with the described methods. In some instances, working memory can 730 can be an example of the memory of device 102, 220 or 240.

A set of these instructions and/or code might be stored on a non-transitory computer-readable storage medium, such as storage device(s) 714 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by computer system 700 and/or might take the form of source and/or installable code, which, upon compilation and/or installation on the computer system 700 (e.g., using any of a variety of generally available compilers, installation programs, compression/decompression utilities, etc.), then takes the form of executable code. In some instances, storage device(s) 730 can be an example of the memory of device 102, 220 or 240.

It will be apparent to those skilled in the art that substantial variations can be made in accordance with specific requirements. For example, customized hardware might also be used, and/or particular elements might be implemented in hardware, software (including portable software, such as applets, etc.), or both. Further, connection to other computing devices such as network input/output devices can be employed.

The terms "machine-readable medium" and "computer-readable medium," as used herein, refer to any medium that participates in providing data that causes a machine to operate in a specific fashion. In an embodiment implemented using computer system 700, various computer-readable media might be involved in providing instructions/code to processor(s) 712 for execution and/or might be used to store and/or carry such instructions/code. In many implementations, a computer-readable medium is a physical and/or tangible storage medium. Such a medium can take the form of a non-volatile media or volatile media. Non-volatile media include, for example, optical and/or magnetic disks, such as storage device(s) 714. Volatile media include, without limitation, dynamic memory, such as working memory 730.

Common forms of physical and/or tangible computer-readable media include, for example, a floppy disk, a flexible disk, hard disk, magnetic tape, flash disk, flash drive, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media can be involved in carrying one or more sequences of one or more instructions to processor(s) 712 for execution. Merely by way of example, the instructions can initially be carried on a magnetic disk and/or optical disc of a remote computer. A remote computer might load the instructions into its dynamic memory and send the instructions as signals over a transmission medium to be received and/or executed by computer system 700.

Communications subsystem 720 (and/or components thereof) generally will receive signals, and bus 702 then might carry the signals (and/or the data, instructions, etc. that are carried by the signals) to working memory 730, from which processor(s) 712 retrieves and executes the instructions. The instructions received by working memory 730 can optionally be stored on non-transitory storage device 714 either before or after execution by processor(s) 712.

Exemplary Embodiments of Applications

Examples of possible applications of the methods/systems of the current disclosure are provided. As disclosed herein, all methods steps and processes take place in real-time unless otherwise specifies.

Video Conferencing

The methods and systems of the current disclosure can be used to conduct video conferences with augmented reality. The following are examples of features that can be made available using the current methods/systems.

In some embodiments, a user can select standard background offered by the methods/systems or specify a personally prepared background. For example, a user can choose to replace a real background with a virtual one such as a stationary image (e.g., using an image of a professional office to replace a real messy hotel bedroom view captured by the camera), a video (e.g., using a pre-recorded video as the background to replace the actual background), or a real-time video from another camera (e.g., using the surveillance camera view of Time Square to replace the current user background).

In some embodiments, users can choose to augment their own physical appearances during the video conference. For example, users can make themselves look thinker/fatter, shorter/taller, change their skin color (e.g., to depict more tan or remove obvious defects in the skin such as dark visible warts or birthmark), adding accessories (e.g., adding earrings, hats, necklace, glasses, tattoo, putting on virtual makeup, and etc.).

In some embodiments, users can each choose an avatar to represent themselves and let the avatar to copy their expressions, body movements, and/or gestures.

In some embodiments, users can augment their voices to make them sound better, have fun, or hide their identities.

In some embodiments, users can make them appeared in the same virtual space with a remote party while they are communicating with one another remotely.

In some embodiments, the systems/methods can also allow users at the same physical space to appear remotely through an intelligent augmented reality (IAR) based communication system.

In some embodiments, a user can choose to appear with another person or object that is not part of her actual environment. The other person or object is not part of the communication, and can be a real life person or object captured previously or concurrently on camera. For example, a person can choose to appear with a video of her favorite pop singer idle. The video can be a pre-recorded footage or a concurrently broadcasted video of a live concert.

In some embodiments, methods/systems can perform real-time monitoring of the communication content and can provide alert to the users if some culture/social improper content (such as gesture, words, etc.) is detected and let users decide whether to retract the communication content. In the meantime, the system sends a pause signal to remote users to halt communication.

In some embodiments, the methods/system disclosed herein can provide just one-sided communications, for the entertainment of the user him- or herself or for advertisement applications. There is no remote party in another side of the communication.

In some embodiments, the methods/systems can provide automatic language translation to help users with different languages to communicate with one another.

In some embodiments, the methods/systems can provide real-time analysis and provides the intelligence of the user expression, intent, and culture implication during the communication.

In some embodiments, the methods/systems can provide real-time intelligence and explanation of some special terms that require expertise in a certain field to understand. Additionally, the system can also provide real-time intelligence, explanation, and background of specific cultural background to the users to make the communication more effective.

Real-Time Interactive Controls

In some embodiments, the current methods/systems can be used to provide marketing and ecommerce information to the users during the communication.

For example, a user can click on the dresses/accessory/background objects of the video screen during the communication and the system provides price information and real-time merchandise recommendation information to the user about the similar products or related products.

In some embodiments, the methods/systems can be used to provide virtual reality experience to the users for travel, trying new products, training skill, experiencing new things, showcasing new real-estate (offices, homes, buildings, shopping malls, and etc.), explore new equipment design, touring new facility, and attending classes, and etc.

In some embodiments, the methods/systems can be used for users to express emotions and love with augmented reality. For example, users can send their love with heart rate data, breath patterns, and temperature changes to others with augmented sensor control. Such as they can use heart rate increase to control the light color change in other sides of the communication. They can use breath pattern changes to cause one or more motors associated with a remote communication unit to vibrate. Temperature changes can be used to control the sound changes of the other side of the communication system.

In some embodiments, the methods/systems can be used to augment remote sex and help improve the sex experience. For example, the system can use gestures, body movements, and biological responses to control sex toys, devices, equipment, and images of the others.

In another example, the methods/systems can use users' bio-status, expressions, voices, behaviors, etc. according to one or more user preferences and system settings to provide augmented sex with light, audio, vibration, sex toys, images, videos, etc.

Remote Medical Services

In one aspect, methods and systems disclosed herein can be used for real-time remote medical services.

In some embodiments, a patient can use the system to provide bio-status to a medical service provider from the comfort of their home, while hiding the background to have more privacy. In some embodiments, a medical service provider (e.g., a doctor or a nurse) can also work from home with augmented reality to hide background to get more privacy and maintain a professional appearance.

In some embodiments, the methods/systems can provide better visualization and data presentation of the patient's current bio-status data along with the patient's past health information. The system can provide intelligent digest of the patient's current bio-status and past health information to provide the service provider a more personized and holistic view of the user's health situation to help the service provider to provide better customized medical service.

In some embodiments, the methods/systems can also use the patient's bio-status information (such as heart rate, breath pattern, temperature, etc.) to control some remote sensors (such as alarm, lights, vibration, audio, video, etc.) to alert remote medical service providers of any abnormal health situation associated with the user.

In some embodiments, the methods/systems can also translate a doctor's commands, gestures, body movements into one or more sensor controls for the patients' side to help control the sensors (such as heart rate monitor, temperature monitoring, and/or some medical devices controls).

In some embodiments, the system can also provide real-time translation for medical terms to the patient to help the patient to have better understanding.

Remote Education and Training

In one aspect, methods and systems disclosed herein can be used to provide remote education and training.

Education providers (e.g., professors, teachers, lecturers, teaching assistants, and etc.) can use the system to deliver augmented education content to users. For example, for teaching human anatomy, the system can overlay human anatomy with a student's real body in the scene to help students to relate the anatomy information with their own body. The students can get more interested and be more motivated to work on the subject. This can also help the education providers to explain the content more vividly and make it easier for students to understand.

In some embodiments, the methods/systems can also be used to help students to collaborate on projects and participate in class discussions remotely but they can appear to work at the same virtual classroom to facilitate better collaboration and learning experience.

In some embodiments, the methods/systems can help the students to explore space, unknown places easier by provide immersive AR environment.

In some embodiments, the methods/systems can also help to better train students, professionals, troops with intelligent AR data to provide immersive and interactive training environment.

Communication with Internet of Things (IoTs)

The methods and systems disclosed herein can be used for smart home, smart office, smart building, smart vehicle, smart space station, etc.

In some embodiments, the methods/systems can represent the user data (e.g., expression, behavior, body movement, gestures, and bio-status) into other forms, such as sensor control signals. These control signals can be received by IoTs (internet of things) for real-time controls for a smart home, a smart office, a smart building, and a smart vehicle.

For example, the bio-status of a user can be re-presented and intelligently analyzed to understand the user's environmental needs and these needs are then translated into augmented information to control conditions (e.g., room temperatures, light condition, humidity, and etc.) of the user's home, office, building, space station, etc.

In another example, the system can control a smart vehicle based on the user's gestures, body movement and/or commands remotely.

In some embodiments, the methods/systems can be used for users to try clothes, and accessories. The AR capability of the system lets the users to try clothes and accessories virtually before they buy them.

In some embodiments, the methods/systems can be used for users to practice sports. The AR capability of the system lets the users practice sports and records their motions for users to study/analyze and learn. The intelligence of the system can also provide users the guidelines to how to better practice sports actions.

In some embodiments, the methods/systems can be used as a game counsel for the users for gaming.

In some embodiments, the methods/systems can be used for the users to use their commands, body movements, gestures, bio-status, etc. to control remote machines, space shuttles, space controllers, ships, underwater machines, unmanned vehicles, unmanned aviation vehicles and send them control signals, etc. The remote side of the communication unit can be connected with local/remote machines, space shuttles, space controllers, ships, underwater machines, unmanned vehicles, unmanned aviation vehicles and send them control signals. The methods/systems can represent and augment the users' commands, body movements, gestures, bio-status, and etc. to be control signals.

Additional Communication Examples

The methods and systems disclosed herein can be used to communicate with animals, plants, and aliens interactively and intelligently. For example, the methods/systems can learn the language, behaviors, and expressions of animals, plants, and possibly aliens using Big Data, science principles using machine learning and pattern recognition methods; e.g., deep learning, principal component analysis (PCA), linear discriminant analysis (LDA), and etc.

In some embodiments, the methods/systems can also learn the relationship between human language, behaviors, and expressions and those of animals, plants and possibly aliens.

During the communication, the methods/systems can translate human language, behaviors, and expressions into language, behaviors, and expressions for animals, plants and possibly aliens, and vice versa.

In some embodiments, the methods/systems can be used by one group of humans, animals, plants, and possibly aliens to communicate with another group (or multiple groups) of humans/animals/plants/aliens with AR and intelligence-based analysis.

Additional Utilities

The intelligent and interactive augmented reality (AR) cloud platform as disclosed herein have numerous utilities. Exemplary embodiments described herein illustrate that utilities can be implemented through, for example, comprehensive understanding and analysis of input data at multiple levels, intelligent and iterative machine learning, interactive user controls, and etc. Additional examples are provided to further illustrate the broad range utilities made possible by the intelligent and interactive AR cloud platform.

Intelligent Communication Assistant: The current intelligent platform can be used as a communication tool (e.g., for teleconferencing, teaching, consultation and etc.). Advantageously, the intelligent platform allows the user to choose a background suitable for the time and nature of the communication.

For example, the intelligent platform provides a user the option to conduct a professional meeting anytime and anywhere. Depending on the nature of the communication, the intelligent platform can provide the right background, suitable outfit and even makeup through the real-time integration of user data and virtual elements. The interactive nature of the intelligent platform allows meeting presentations to be more effective and dynamic, thus more engaging for the users at the receiving end. Thus, the intelligent platform can be used as an effective teaching tool.

The current intelligent platform makes it easy to deliver professional speeches and lectures at any time and in any places.

As disclosed herein, the augmented reality background can be used as a branding solution to the business. The intelligent platform is also flexible for the users/business to add a logo and other edited messages. The current intelligent platform and method can be used for TV/movie making and can significantly reduce the production costs.

This intelligent platform can be used for consumers for conference meetings at home. This intelligent platform can be used to communicate with smartphones/devices, conference meetings phones, teleconference phones, etc.

Intelligent Administrative Assistant: The current intelligent platform can also function as an administrative tool. For example, the intelligent platform can function as an organization assistant and help to manage a user's meeting schedule. The intelligent platform would automatically update the user's calendar and provide notification to the users. If the user could be late for a meeting, the intelligent platform would send a late notice to the host or other people who attend the meeting with the user's consent. If for some reason, the user may not be able to attend a meeting, the intelligent platform would provide cancellation notice.

In some embodiments, the intelligent platform can help handle many trivial tasks for the user, such as help to record and organize user's thoughts during the design phase, provide organized news information to the user based on the user preference, help user setup/cancel meetings, draft emails (such as thank you emails, congratulation emails, condolence emails, response to farewell emails, interview invitation emails, interview rejection emails, meeting invites, etc.), help user with phone/video conference connections, etc.

In some embodiments, the intelligent platform can function as a health assistant. For example, the intelligent platform can monitor the bio status of the user, remind the user to relax or exercise when necessary. The intelligent platform can also acquire data from a smart chair (e.g., as part of an IoT network) to verify whether the user has correct posture and provide recommendation/guidance to the user have correct sitting posture. If a user needs to take medicine periodically or have regular checkups, the intelligent platform would provide automatic notification. The intelligent platform would provide the user the health report.

In some embodiments, the intelligent platform can function as an emotional quality assistant. For example, the intelligent platform can monitor the user's bio status and emotional changes; e.g., via one or more sensors. When the intelligent platform determines that the user is very frustrated, it would provide recommendations to the user to calm down. For example, the intelligent platform can provide meditation options to the user.

In connection with any of functionalities, the intelligent platform can learn the user's preference and adapt to the changes over time, for example, through the iterative and interactive learning process provided by the intelligent platform.

Smart Home Applications: The current intelligent platform can also be used as a part of a smart home, such as an intelligent alarm. In some embodiments, the intelligent platform can help set an alarm intelligently. For example, the intelligent platform can check the user's calendar and notify the user if there is a possible conflict. The intelligent platform can provide the user with options to change the alarm time. This helps the user to avoid missing important events due to improper alarm time.

In some embodiments, the intelligent alarm can let the user set up a critical wake-up time if the user has the habit of hitting the snooze button after an alarm has gone off. At the same, the intelligent alarm can check the user's calendar and notify the user if there is a possible conflict.

In some embodiments, the intelligent platform can let the user make the decision whether to change the critical wake-up time.

In some embodiments, the intelligent alarm utilizes multimedia and multiple functional wakeup approaches to help wake up a user, for example, by controlling or changing the setting of one or more apparatuses that are communicatively connected with the intelligent alarm. The multimedia and multiple functional wakeup approaches can include light, sound, opening curtain, temperature change, humidity change, smell, vibration of a wearable device, and etc.

As disclosed herein, the intelligent alarm can have two levels of alarm setting: a progressive alarm setting before it is close to the critical wake-up time; and an aggressive alarm setting when is close to the critical wake-up time.

In some embodiments, the intelligent alarm cannot be stopped because a user accidentally pushes a button. It would continuously monitor the user's bio status, movement, sound, heart rate, EEG, temperature, etc. to verify whether the user is truly awake. On the other hand, the user also does not need to push a button to shut the alarm up. One or more monitored bio status, such as heart rate, temperature, EEG, and etc., can provide information whether the user is awake and the alarm can then automatically stop. This would avoid the frustration that user could not find the alarm button and get very annoyed.

In some embodiments, the intelligent platform has also automatic learning capability to improve the intelligence. It would automatically collect information of effectiveness of each alarm setting and alarming event to improve the process. In some embodiments, the intelligent platform also synchronizes with user's email and calendar to get most updated meeting invites and notify the user for possible alarm/wake-up time change.

The following is a typical an intelligent alarming setting process. This includes two stages: intelligent alarm setting and intelligent alarming.

An exemplary intelligent alarm setting process is outlined below.

Step 1. Every night, the intelligent platform would notify the user to set a wake-up alarm. A user can choose not to set up alarm and there will be no alarm. In this case, the Intelligent Alarm Setting Process would finish.

Step 2. The intelligent platform would also check the user's calendar (in the cloud and synchronized in the local intelligent platform) to see whether the alarm time is in conflict with the user's calendar. If there is no conflict, the method goes to Step 5.

Step 3. If there is a conflict, the intelligent platform would notify the user of the possible missed events based on the calendar and let user decide whether to reset the alarm time.

Step 4. If the user decides to reset the alarm time, the intelligent platform would go back to the Step 2. Otherwise, it would go to the Step 5.

Step 5. the intelligent platform recommend the critical wake-up time based on the calendar and user past wake-up pattern.

Step 6. If the user does not like the recommended wakeup time, goes to Step 7, otherwise, goes to Step 8.

Step 7. The user modifies the critical wake-up time.

Step 8. Set up the alarm. And provide feedback of the entire process to the intelligent platform to improve the alarm setting intelligence.

The following is a typical an intelligent alarming process.

Step 1. Alarm Start

Step 2. If the user wakes up, Alarm ends. If not, the method goes to next step.

Step 3. Check whether the time is close to the critical alarm time. If the time has not passed the critical alarm time, the method goes to the Step 4. If it passes the critical alarm time, goes to the Step 5.

Step 4. Using progressive alarming approaches to wake up the users. The progressive alarming approaches can comprise of light intensity and color adjustment of the mirror interface light and room light intensity/color change through controlling smart light in the room, the curtain opening, alarm sound with music, voice, or alarm noise with progress sound intensity, frequency change, temperature change, the wearable band vibration on user's hand, smell, etc. The intelligent platform continuously monitors the status of the user and goes to Step 2.

Step 5. If it is closer to the critical alarm time, the intelligent platform would perform aggressive alarming approaches, such as high-intensity light, higher intensity sound with less pleasing music/voice/alarm, alarming in higher frequency, stronger vibration on user's wearables, aggressive temperature change, stronger smell, etc.

Step 6. The intelligent platform continuously monitors the status of the user. If the user wakes up, Alarm ends. If not, goes to Step 5.

In some embodiments, the intelligent platform can provide intelligent room setup. For example, during the morning after a user gets up, the intelligent platform can automatically open the curtain, adjust the lighting, adjust the humidity, turn on the music/radio. In some embodiments, if the weather permits, the intelligent platform can also open the window to help get in fresh air into the house. The intelligent platform can also work with an intelligent bed to make the bed.

In some embodiments, the intelligent platform can provide intelligent weather information to the user. For example, the intelligent platform (e.g., a mirror or a display) would provide user up-to-date weather and weather forecast information locally and other locations as user preferred. If the user is going to travel, the intelligent platform will also automatically display the travel destinations weather and weather forecast information. If there is possible severe weather, it would provide warning to the user.

In some embodiments, the intelligent platform can provide assistance to the user for the morning routines (e.g., grooming, putting on makeup). Before the grooming/makeup, if user requests, the intelligent platform can recommend groom/makeup options to the user based the user's facial structure, the user's past choices, the user's preference, the day's activity needs of the day, other people's groom/makeup who are similar to the user in some way, and/or the user's favorite person's groom/makeup. If the user requests, the intelligent platform can also connect the user to the user's friends or a professional groom/makeup artists to provide advice. The intelligent platform can illustrate the groom/makeup effect on the user's face and display it by superimposing them onto the user's face with a 3D view. If the user selects particular groom/makeup, the intelligent mirror would provide step by step making up instructions to the users to follow based on the user's request. The intelligent mirror can provide guidance for the user during the grooming/making up process to help the user achieve satisfactory makeup results.

In some embodiments, the intelligent platform can organize intelligent daily activities. The intelligent platform can update a user's calendar automatically based on email invites/cancellation. It can notify the user of any new updates while providing information to get user's consent for confirmation or rejection of new invites. The intelligent platform can change or cancel any user started meetings. The organization can take place while the user is performing the morning routines, e.g., grooming, attending to personal hygiene, putting on makeup, dressing and etc.

In some embodiments, the intelligent platform can provide intelligent morning phone/message/social network assistance. If any phone calls/video meetings have been blocked during the user's sleep time as the user preferred, the intelligent platform can provide the list to the user and receive input from the user to initialize calls/meetings immediately or to set up appointments for the calls and meetings. In some embodiments, the intelligent platform can go through new emails, social media messages, text messages, and other important information with the user. Based on the user's input, it can either mark the information as read, unread, important, or other categories as the user prefers. If the user decides to return some messages/emails or initialize some new email/message, the platform would provide user multiple choices: voice dictated messages/emails, voice to text messages/emails, video conferencing, voice call, etc. As disclosed herein, these activities can be done while the user is performing morning routines.

In some embodiments, the intelligent platform can present news to the user. The intelligent platform can present the most important news to the user based on the user's interests and preferences. This can be done while the user is performing morning routines. In some embodiments, the intelligent platform can provide intelligent dressing recommendations. If the user requests, the intelligent platform can recommend proper dresses for the day based on a number of factors, including but not limited to the weather condition, the user's activities of the day, the user's past dressing habit, the user's available clothes in the wardrobe, the user's social circle dress styles, the user's favorite people's dresses, the current trend, and the dresses of people similar to the user. If the user requests, the intelligent platform can directly connect the user to a friend, a random person with similar dressing preferences or similar style or physique to the user, and/or a professional advisor for recommendations. During the dressing process, if the user wants, the intelligent platform can also assist the user to purchase new clothes online and make the transaction seamless.

In some embodiments, the intelligent platform can help cook coffee and prepare breakfast for the user while he or she is performing the morning routines. The intelligent platform would predict the proper time to cook coffee/bake bread/cook egg/prepare other breakfast for the user based on the user's past habit, calendar and allow user to confirm/modify the time and items. The intelligent platform can then start a variety of devices connected via an IoT network, for example, a coffee machine, a toaster oven, a rice cooker, an egg cooker, and etc. The cooking/brewing starts automatically and the machines are stopped afterwards. And it would notify the user when they are ready.

In some embodiments, the intelligent platform can intelligently prepare an automobile for the user before the user leaves home. For example, on very hot summer days or very cold winter days, the automobile can be pre-cooled or pre-warmed before the user enters the vehicle. More importantly, after a night, the air inside the vehicle may not be fresh and it would be good to exchange the air to get some fresh air in. In some embodiments, the intelligent platform can get the car ready by anticipating the time when the user will enter the car while the user is performing the morning routines. In some embodiments, the user's confirmation and or adjustment can be used to prepare the vehicle. When the vehicle is ready, the intelligent platform can send notification to the user.

In some embodiments, the intelligent platform can intelligently reserve Taxi/Uber for the user. If the user does not have a car, or does not want to drive, the intelligent platform can predict the time that the user needs to use a car when the user is performing the morning routines and get the user's confirmation and/or adjustment of time/car type to send reservation requests to a taxi or ride-sharing. The platform can also send the user notification when the vehicle arrives. When user is ready and gets out of the door, the vehicle is there to pick up the user.

In some embodiments, the intelligent platform can intelligently set the room in proper mode to save energy after user leaves. After detecting that the user has left the home, the intelligent platform can set the room temperature and humidity into proper level, adjust the curtain position, open/close window to save energy based on the weather condition, and user preference.

In some embodiments, the intelligent platform can intelligently provide location of things for the user and provide smart reminder. Sometimes, we may forget where we put our keys, phone, IDs, wallet, and some other things that we need to take with us for the day. The intelligent mirror would provide location notification of these things to the user and also provide a reminder list to the user.

Intelligent Health Assistant: As discussed hereinabove, the augmented communication capability can be extended to providing remote health care for the patients to directly communicate with the caregivers remotely. In this scenario, the intelligent platform would not augment the patients' body/face but it can augment the background to help protect the patients' privacy.

In some embodiments, the intelligent platform is communicably connected with a spectrum meter which can provide accurate and rich information about the patients' skin, and can be used to acquire ear, nose, throat, mouth, eye images (which provide more spectrum information and analysis than traditional person-to-person eye-ball checking by caregivers). The spectrum meter with proper spectrum setup can penetrate the skin to provide rich information about the patient's subdermal information, blood flow, blood information, etc.

In some embodiments, the intelligent platform can automatically monitor the patient's heart beats, body temperature, breathing patterns, other bio-status, a psychological status, and an emotion status. In some embodiments, the intelligent platform can automatically send the patient's history information of these statuses, patterns to a caregiver with analytical information upon the patient's permission. The intelligent platform would automatically highlight an abnormal status, and detect data patterns for the caregiver to review at any time based on the care giver's request and needs without bothering the patient.

For patients with special needs, the intelligent platform can also connect with special medical devices/systems to measure, monitoring, track, and diagnose the patients.

In some embodiments, the intelligent platform can also automatically alert the patient if the patient should take certain required tests, or if the patient needs to take some actions at certain time (e.g., to attend physical therapy), etc.

In some embodiments, the intelligent platform can make the physical therapy more interactive by showing the physical therapy activities on the screen while allowing the patient to see his/her own image; and at the same time, it can provide real-time feedback to the patient whether the patient followed the instructions correctly and also provides encouragement.

In some embodiments, the intelligent platform can be used to facilitate meditation practice. In some embodiments, the intelligent platform can provide a pleasant meditation environment. For example, the intelligent platform can provide suitable background sound (e.g., music, natural sounds, etc.), adjust lights and humidity, close/open curtains, and provide a proper scent of the environment, and etc.

In some embodiments, the intelligent platform can monitor and learn the user's status during meditation and provide guidance. The intelligent platform can continuously monitor a user bio status (e.g., heart rate, temperature, breath patterns, EEG, blood flow, etc.) and provide meditation guidance accordingly to the user.

In some embodiments, the intelligent platform can provide user feedback. For example, the intelligent platform can provide the user with data before and after a mediation. The data can include but are not limited to, for example, one or more measurements of the user's bio status, emotion status, psychological status, and etc. In some embodiments, the intelligent platform can provide accumulative data to allow the user to view and analyze trends.

Smart Car Applications: In some embodiments, the intelligent platform can be used in connection with smart cars. In some embodiments, the intelligent platform can provide a biometrics-based access control to avoid using keys and improve security. For example, the intelligent platform can automatically recognize the driver and open the door when the driver is approaching and lock the door when the user leaves. This would avoid the trouble of finding or losing of keys, and improve the security.

In some embodiments, the intelligent platform can provide a personalized setting for the driver. For example, once the door opens, the intelligent platform can recognize the user, and program the vehicle based on user preferences, including, for example, setting up seat height, mirror location, temperature, humidity, music option, and etc.

In some embodiments, the intelligent platform can predict the driving destiny and present it to the user for confirmation. For example, based on activities on the driver's calendar or user past driving behaviors, the intelligent platform can predict the user's driving destination and provide one or more options for the user to confirm. Based on the GPS and traffic info, the can platform would automatically identify the optimal route for the user. This can save a lot of time in comparison to the user input based navigation system that is currently available on the market. When the vehicle is on the way to a particular destination, if there is possible calendar change (cancellation, meeting location change, etc.), the intelligent platform can automatically notify the driver and ask for confirmation whether to continue the current route or update the destination based on the updated information.

In some embodiments, the intelligent platform can monitor and learn the driver's status before and during a drive to improve driving safety. For example, the intelligent platform can monitor the driver's bio status, emotion and psychological status before and during the drive.

In some embodiments, the intelligent platform can avoid drunk driving or unsafe driving by monitoring the driver's bio-status. For example, if the intelligent platform detects that the driver may be drunk, too fatigued to drive, or some other status that would render the driver incapable to drive, the intelligent platform would notify the driver to have mitigation strategy.

In some embodiments, the intelligent platform can avoid fatigue driving, distracted driving, or road rage. For example, the intelligent platform can keep monitoring the driver's bio-status, psychological status, and behaviors during the driving process. If the intelligent platform detects the driver is fatigued, the intelligent platform can warn the user to take a rest. If the intelligent platform detects the driver is careless (e.g., looking away, checking text message, engaging in some other tasks other than driving which distracted the user from driving), the intelligent platform can warn the user to pay attention to the driving. If the intelligent platform detects the user engaging in a road rage, the intelligent platform can provide calm down mechanism to sooth the feeling of the user and remind the user about his/her schedules of today or destination of the drive, and etc. to help user avoid road rage.

In some embodiments, the intelligent platform can be integrated with the existing rear-view mirror or included as part of a new intelligent rear-view mirror designed.

In some embodiments, the intelligent platform can provide notifications for meetings based on possible driving related issues. For example, there can be unexpected traffic or delay. Also, there can be mechanical issues associated with the vehicle itself. If the intelligent platform predicts a potential delay and determines that the delay can impact the user's schedule for the next meetings, the intelligent platform can notify the meeting hosts/participants (with user's approval or confirmation) about the possible delay, cancellation, or re-arrangement.

In some embodiments, the intelligent platform associated with a vehicle can collaborate with the user's other intelligent platforms at home and office, and perform correlated settings for the home, office, and car. The intelligent platform can work seamlessly with the intelligent platforms in the office and home. When the user is approaching office or home, the intelligent platform would notify the office/home intelligent platforms respectively to set up the rooms as user's preference, (temperature, humidity, lighting, music, entertainment, office machine, etc.). At the same time, when the user is leaving the office/home, the intelligent platform would also notify the office/home intelligent platforms respectively to set up in another status, e.g., setting up to save energy, etc., and vice versa, the office/home intelligent platforms can also notify the car intelligent platform to be ready when they detect the user's leaving the office or home.

One of skill in the art would understand that an intelligent platform can adopt any applicable designs. For example, sometimes the intelligent platform can also function without mirror display function. In some embodiments, the intelligent platform can be designed with subsets of modules. In some embodiments, the intelligent platform can be designed with more add-on modules.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features, and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still, further variations and alternate elements will be apparent to one of skill in the art.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A non-transitory computer-readable medium including one or more sequences of instructions that, when executed by one or more processors, cause the processors to perform operations comprising:
receiving, at a remote server, real-time visual input data from a camera, wherein at least a portion of the input data comprise visual input data of a user;
conducting, a comprehensive interpretation of real-time input data of a user, wherein at least a portion of the input data comprise visual input data of the user that is combined with augmented reality (AR) related input data to create real-time AR data in which the user is immersed into an AR world, wherein the visual input data is collected in real-time of the user using a camera, and wherein the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combi nations thereof;
executing, a user input command based on one or more results of the comprehensive interpretation and additional information accessible by the server using artificial intelligence; and
in response to executing the user input command, causing one or more events to occur comprising:
changing the content of the real-time AR data, wherein the real-time AR data are created in real-time based on the visual input data and AR-related input data; and
causing a physical device communicably connected to the server to change a status.

2. The non-transitory computer-readable medium of claim 1, wherein the additional information accessible by the remote server comprises user biometric data, user personal data, other people's information that the user has permission to access, existing search records, information stored in the server, information stored in the user device, system information of the computer device the user uses, information that is extracted through real time network communication at the time when the search query is modified, or any combinations thereof.

3. The non-transitory computer-readable medium of claim 1, wherein the causing one or more events to occur comprises:
presenting data content associated with the input command in real-time to the user.

4. The non-transitory computer-readable medium of claim 1, wherein the input data further comprise audio input data or sensory input data.

5. The non-transitory computer-readable medium of claim 4, wherein the sensory input data comprise bio-status data of the user, behavior data of the user, environmental data, or status data of an object in the proximity of the user.

6. The non-transitory computer-readable medium of claim 1, wherein the physical device forms a part of the internet of things (IoT) network.

7. The non-transitory computer-readable medium of claim 1, where the status of the physical device comprises a binary status, a continuous value adjustment status, or a discrete value adjustment status.

8. The non-transitory computer-readable medium of claim 1, wherein the physical device comprises a piece of furniture, a vehicle, an appliance, an electronic appliance, a building, a sensor, a fixture, a toy, or another computer device.

9. The non-transitory computer-readable medium of claim 1, where the operations further comprise:
providing, at a remote server, the real-time AR data based on real-time user input data and the AR-related input data, the user input data comprising the visual input data, the real-time AR data comprising one or more advertisement elements, the one or more advertisement elements being determined according to a comprehensive content matching mechanism;
wherein the comprehensive content matching mechanism is based on one or more factors comprising advertisement content, information extracted from the user input data, knowledge learned from the extracted information, a user interactive control, a user preference, context or combinations thereof.

10. The non-transitory computer-readable medium of claim 9, wherein the context comprises date and time information, communication context, content context, advertiser context, geolocation context, presentation context, or combinations thereof, and wherein the advertiser context comprises advertiser-specified content matching criteria including favored or disfavored presentation forums or pricing information.

11. The non-transitory computer-readable medium of claim 9, wherein the server further receives additional data corresponding to a real-life event, and the real-time AR data comprise at least a visual representation associated with the real-life event.

12. The non-transitory computer-readable medium of claim 1, where the operations further comprise:
providing, at a computer device operated by a first user, real-time AR data of a second user who is not accessible by the computer device, wherein the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof, wherein:
the input data of the second user are collected at a second device and comprise visual data of the second user;
the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input; and representing at least a portion of the real-time AR data of the second user with a plurality sets of data parameters suitable for presenting the real-time AR data of the second user, wherein each set of data parameters comprises text, one or more codes, one or more numbers, one or more matrixes, one or more images, one or more audio signals, one or more sensor signals; or combinations thereof.

13. A system for providing real-time augmented reality (AR) data, the system comprising:

one or more processors; and a nontransitory computer readable medium, the nontransitory computer-readable medium including one or more sequences of instructions that, when executed by the one or more processors, cause the one or more processors to perform operations comprising:

receiving, at a remote server, real-time visual input data from a camera, wherein at least a portion of the input data comprise visual input data of a user;

conducting, a comprehensive interpretation of real-time input data of a user, wherein at least a portion of the input data comprise visual input data of the user that is combined with augmented reality (AR) related input data to create real-time AR data in which the user is immersed into an AR world, wherein the visual input data is collected in real-time of the user using a camera, and wherein the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combinations thereof;

executing, a user input command based on one or more results of the comprehensive interpretation and additional information accessible by the server using artificial intelligence; and in response to executing the user input command, causing one or more events to occur comprising:

changing the content of the real-time AR data, wherein the real-time AR data are created in real-time based on the visual input data and AR-related input data; and causing a physical device communicably connected to the server remotely to change a status.

14. The system of claim 13, wherein the causing one or more events to occur comprises:

presenting data content associated with the input command in real-time to the user;

changing the content of the real-time AR data, wherein the real-time AR data are created in real-time based on the visual input data and AR-related input data; or causing a physical device communicably connected to the server to change a status.

15. The system of claim 13, where the operations further comprise:

Providing the real-time AR data based on real-time user input data and the AR-related input data, the user input data comprising the visual input data, the real-time AR data comprising one or more advertisement elements, the one or more advertisement elements being determined according to a comprehensive content matching mechanism;

wherein the comprehensive content matching mechanism is based on one or more factors comprising advertisement content, information extracted from the user input data, knowledge learned from the extracted information, a user interactive control, a user preference, context or combinations thereof.

16. The system of claim 13, where the operations further comprise:

providing, at a computer device operated by a first user, real-time AR data of a second user who is not accessible by the computer device, wherein the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof, wherein:

the input data of the second user are collected at a second device and comprise visual data of the second user;

the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input; and representing at least a portion of the real-time AR data of the second user with a plurality sets of data parameters suitable for presenting the real-time AR data of the second user, wherein each set of data parameters comprises text, one or more codes, one or more numbers, one or more matrixes, one or more images, one or more audio signals, one or more sensor signals; or combinations thereof.

17. A method for providing interactive and intelligent cloud platform, comprising:

receiving, at a remote server, real-time visual input data from a camera, wherein at least a portion of the input data comprise visual input data of a user;

conducting a comprehensive interpretation of real-time input data of a user, wherein at least a portion of the input data comprise visual input data of the user that is combined with augmented reality (AR) related input data to create real-time AR data in which the user is immersed into an AR world, wherein the visual input data is collected in real-time of the user using a camera, and wherein the comprehensive interpretation is based on one or more criteria comprising a user preference, a system setting, an integration parameter, a characteristic of the user, an object or a scene of the visual input data, information extracted from the visual input data, knowledge learned from the extracted information, a previous interactive user control, or combinations thereof;

executing a user input command based on one or more results of the comprehensive interpretation and additional information accessible by the server using artificial intelligence; and in response to executing the user input command causing one or more events to occur comprising:

changing the content of the real-time AR data, wherein the real-time AR data are created in real-time based on the visual input data and AR-related input data; and causing a physical device communicably connected to the computer device to change a status.

18. The method of claim 17, wherein the causing one or more events to occur comprises:

presenting data content associated with the input command in real-time to the user at the computer device or another device;

changing the content of the real-time AR data, wherein the real-time AR data are created in real-time based on the visual input data and AR-related input data; or causing a physical device communicably connected to the computer device to change a status.

19. The method of claim 17, further comprising:

Providing the real-time AR data based on real-time user input data and the AR-related input data, the user input data comprising the visual input data, the real-time AR data comprising one or more advertisement elements, the one or more advertisement elements being determined according to a comprehensive content matching mechanism;

wherein the comprehensive content matching mechanism is based on one or more factors comprising advertisement content, information extracted from the user input data, knowledge learned from the extracted information, a user interactive control, a user preference, context or combinations thereof.

20. The method of claim 17, further comprising:

providing, at a computer device operated by a first user, real-time AR data of a second user who is not accessible by the computer device, wherein the real-time AR data of the second user are based on input data of the second user, AR input data, information input, and knowledge input according to one or more criteria associated with the second user comprising a user preference, a system setting, an integration parameter, a characteristic of an object or a scene of the input data, an interactive user control, or a combination thereof, wherein:

the input data of the second user are collected at a second device and comprise visual data of the second user, the information input is extracted in real-time from the input data of the second user or a variant thereof at one or more time points based on one or more criteria associated with the second user comprising a user preference, a system setting, an integration parameter, a characteristic of an object or a scene of the input data, an interactive user control, or a combination thereof, the knowledge input is learned based on information extracted from multiple time points, and the real-time AR data of the second user comprise information data corresponding to the information input and knowledge data corresponding to the knowledge input; and representing at least a portion of the real-time AR data of the second user with a plurality sets of data parameters suitable for presenting the real-time AR data of the second user on the computer device, wherein each set of data parameters comprises text, one or more codes, one or more numbers, one or more matrixes, one or more images, one or more audio signals, one or more sensor signals; or combinations thereof.

* * * * *